(12) United States Patent
Waite et al.

(10) Patent No.: US 11,982,880 B2
(45) Date of Patent: May 14, 2024

(54) ACCOMMODATING CAVITY LENS SHAPED WITH PHOTOCLEAVABLE INSERT

(71) Applicant: OneFocus Vision, Inc., Fernandina Beach, FL (US)

(72) Inventors: Steven B. Waite, Fernandina Beach, FL (US); Amitava Gupta, Roanoke, VA (US); Gamil Alhakimi, Oakville (CA); Lisa Studnicki, Oakville (CA); Musa Alhakimi, Oakville (CA)

(73) Assignee: OneFocus Vision, Inc., Fernandina Beach, FL (US)

( * ) Notice: Subject to any disclaimer, the term of this patent is extended or adjusted under 35 U.S.C. 154(b) by 1286 days.

(21) Appl. No.: 16/403,837

(22) Filed: May 6, 2019

(65) Prior Publication Data

US 2020/0012124 A1 Jan. 9, 2020

Related U.S. Application Data

(63) Continuation of application No. PCT/US2017/060950, filed on Nov. 9, 2017.
(Continued)

(51) Int. Cl.
*G02C 7/04* (2006.01)
*C08G 18/38* (2006.01)
(Continued)

(52) U.S. Cl.
CPC .......... *G02C 7/049* (2013.01); *C08G 18/384* (2013.01); *C08G 18/7621* (2013.01);
(Continued)

(58) Field of Classification Search
CPC .......... G02C 7/04; G02C 7/041; G02C 7/045; G02C 7/049; G02C 7/048; G02C 7/047;
(Continued)

(56) References Cited

U.S. PATENT DOCUMENTS 3,246,941 A   4/1966  Moss
3,697,629 A  10/1972  Bronstein
(Continued)

FOREIGN PATENT DOCUMENTS

CN   103038699 A   4/2013
CN   103676197 A   3/2014
(Continued)

OTHER PUBLICATIONS

International Search Report and Written Opinion for corresponding International Application No. PCT/US2017/060950, 16 pages (dated Feb. 9, 2018).

*Primary Examiner* — Marin Pichler
(74) *Attorney, Agent, or Firm* — FISHERBROYLES, LLP; John K. Shimmick

(57) ABSTRACT

A lens comprises an internal cavity structure formed by dissolution of a soluble insert material. The internal soluble material may dissolve through a body of a lens such as a contact lens in order to form the cavity within the contact lens. The cavity within the lens can be shaped in many ways and corresponds to the shape of the dissolved material, such that many internal cavity shapes can be readily fabricated within the contact lens. The insert can be placed in a mold with a pre-polymer material, and the pre-polymer material cured with the insert placed in the mold to form the lens body. The polymerized polymer may comprise a low expansion polymer in order to inhibit expansion of the lens when hydrated. The polymer may comprise a hydrogel when hydrated. The soft contact lens material comprises a sufficient amount of cross-linking to provide structure to the lens and shape the cavity.

18 Claims, 50 Drawing Sheets

Related U.S. Application Data

(60) Provisional application No. 62/505,017, filed on May 11, 2017, provisional application No. 62/421,121, filed on Nov. 11, 2016.

(51) Int. Cl.

| | | |
|---|---|---|
| *C08G 18/76* | (2006.01) | |
| *C08G 18/79* | (2006.01) | |
| *C08G 63/685* | (2006.01) | |
| *C08G 69/44* | (2006.01) | |
| *G02B 1/04* | (2006.01) | |
| *G02B 3/12* | (2006.01) | |

(52) U.S. Cl.
CPC .......... *C08G 63/685* (2013.01); *C08G 69/44* (2013.01); *G02B 1/043* (2013.01); *G02B 3/12* (2013.01); *G02C 7/045* (2013.01)

(58) Field of Classification Search
CPC .......... G02C 7/043; G02C 7/042; G02C 7/08; G02C 7/02; C08G 18/384; C08G 18/7621; C08G 63/685; C08G 69/44; G02B 1/043; G02B 3/12
See application file for complete search history.

(56) References Cited

U.S. PATENT DOCUMENTS

| | | | |
|---|---|---|---|
| 4,141,941 A | 2/1979 | Travnicek | |
| 4,169,119 A | 9/1979 | Covington | |
| 4,174,156 A | 11/1979 | Glorieux | |
| 4,477,158 A | 10/1984 | Pollock | |
| 5,764,339 A | 6/1998 | Horton | |
| 6,092,899 A | 7/2000 | Wanders | |
| 6,367,929 B1 | 4/2002 | Maiden | |
| 6,743,438 B2 | 6/2004 | Thakrar | |
| 6,860,601 B2 | 3/2005 | Shadduck | |
| 7,322,695 B2 | 1/2008 | Wooley | |
| 7,452,075 B2 | 11/2008 | Iuliano | |
| 7,479,247 B2 | 1/2009 | Joyner | |
| 7,503,652 B2 | 3/2009 | Menezes | |
| 7,517,084 B2 | 4/2009 | Wooley | |
| 7,559,650 B2 | 7/2009 | Iuliano | |
| 7,699,464 B2 | 4/2010 | Iuliano | |
| 7,810,925 B2 | 10/2010 | Evans | |
| 8,348,424 B2 | 1/2013 | Pugh | |
| 8,431,669 B2 | 4/2013 | McCabe | |
| 8,940,219 B2 | 1/2015 | Spoor | |
| 9,046,699 B2 | 6/2015 | Caldarise | |
| 9,310,628 B2 | 4/2016 | Barre | |
| 9,910,296 B2 | 3/2018 | Harant | |
| 10,018,855 B2 | 7/2018 | Waite | |
| 10,302,968 B2 | 5/2019 | Waite | |
| 10,761,348 B2 | 9/2020 | Harant | |
| 2006/0001186 A1 | 1/2006 | Richardson | |
| 2006/0079597 A1 | 4/2006 | Muratoglu | |
| 2006/0290882 A1 | 12/2006 | Meyers | |
| 2007/0035054 A1 | 2/2007 | Brame | |
| 2007/0052886 A1 | 3/2007 | Fan | |
| 2007/0138692 A1 | 6/2007 | Ford | |
| 2008/0001317 A1 | 1/2008 | Tokarski | |
| 2008/0097600 A1 | 4/2008 | Hare | |
| 2008/0231799 A1 | 9/2008 | Iuliano | |
| 2008/0231801 A1 | 9/2008 | Iuliano | |
| 2009/0039535 A1* | 2/2009 | Nicolson | C08G 18/61 264/1.1 |
| 2010/0063240 A1 | 3/2010 | Graham | |
| 2012/0026457 A1 | 2/2012 | Qiu | |
| 2012/0026458 A1 | 2/2012 | Qiu | |
| 2012/0172294 A1* | 7/2012 | Bar-Or | A61P 3/04 514/4.8 |
| 2012/0268712 A1 | 10/2012 | Egan | |
| 2013/0041064 A1 | 2/2013 | Graham | |
| 2013/0195952 A1 | 8/2013 | Byrne | |
| 2014/0002790 A1 | 1/2014 | Pugh | |
| 2014/0088381 A1 | 3/2014 | Etzkorn | |
| 2014/0235553 A1* | 8/2014 | Petrash | C07K 14/47 536/23.1 |
| 2014/0262004 A1 | 9/2014 | Pugh | |
| 2014/0371558 A1 | 12/2014 | Etzkorn | |
| 2014/0371559 A1 | 12/2014 | Etzkorn | |
| 2015/0126970 A1 | 5/2015 | Thompson | |
| 2015/0138499 A1 | 5/2015 | Spoor | |
| 2015/0219925 A1 | 8/2015 | Hare | |
| 2015/0258195 A1 | 9/2015 | Almutairi | |
| 2015/0331255 A1 | 11/2015 | Sankaridurg | |
| 2015/0370093 A1 | 12/2015 | Waite | |
| 2016/0004098 A1 | 1/2016 | Waite | |
| 2016/0018671 A1 | 1/2016 | Waite | |
| 2016/0054589 A1 | 2/2016 | Otts | |
| 2016/0109726 A1 | 4/2016 | Tai | |
| 2016/0377887 A1 | 12/2016 | Waite | |
| 2017/0131570 A1 | 5/2017 | Thompson | |
| 2017/0131571 A1 | 5/2017 | Waite | |
| 2017/0371180 A1 | 12/2017 | Harant | |
| 2018/0173010 A1 | 6/2018 | Harant | |
| 2019/0048180 A1 | 2/2019 | Harant | |
| 2019/0064546 A1 | 2/2019 | Waite | |

FOREIGN PATENT DOCUMENTS

| | | |
|---|---|---|
| CN | 103764070 A | 4/2014 |
| CN | 104508540 A | 4/2015 |
| FR | 1279252 | 12/1961 |
| GB | 2401954 | 11/2004 |
| JP | 63144841 | 6/1988 |
| JP | 04327913 | 11/1992 |
| JP | 10193385 | 7/1998 |
| JP | 3393542 | 4/2003 |
| JP | 2009267272 | 11/2009 |
| WO | 9110154 A1 | 7/1991 |
| WO | 2008115251 A1 | 9/2008 |
| WO | 2014117173 A2 | 7/2014 |
| WO | 2014120928 A2 | 8/2014 |
| WO | 2014161002 A2 | 10/2014 |
| WO | 2015095891 A1 | 6/2015 |
| WO | 2016019346 A1 | 2/2016 |
| WO | 2016019351 A1 | 2/2016 |
| WO | 2016019359 A1 | 2/2016 |
| WO | 2016048941 | 3/2016 |
| WO | 2017083770 A1 | 5/2017 |
| WO | 2017083771 A1 | 5/2017 |
| WO | 2017083774 A1 | 5/2017 |
| WO | 2018089699 A1 | 5/2018 |

* cited by examiner

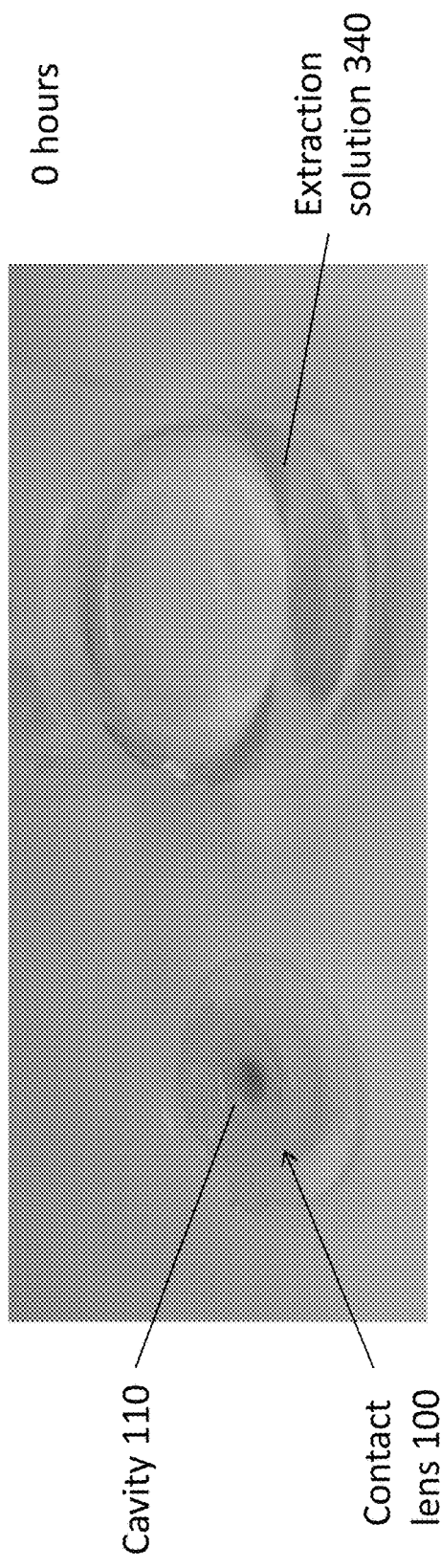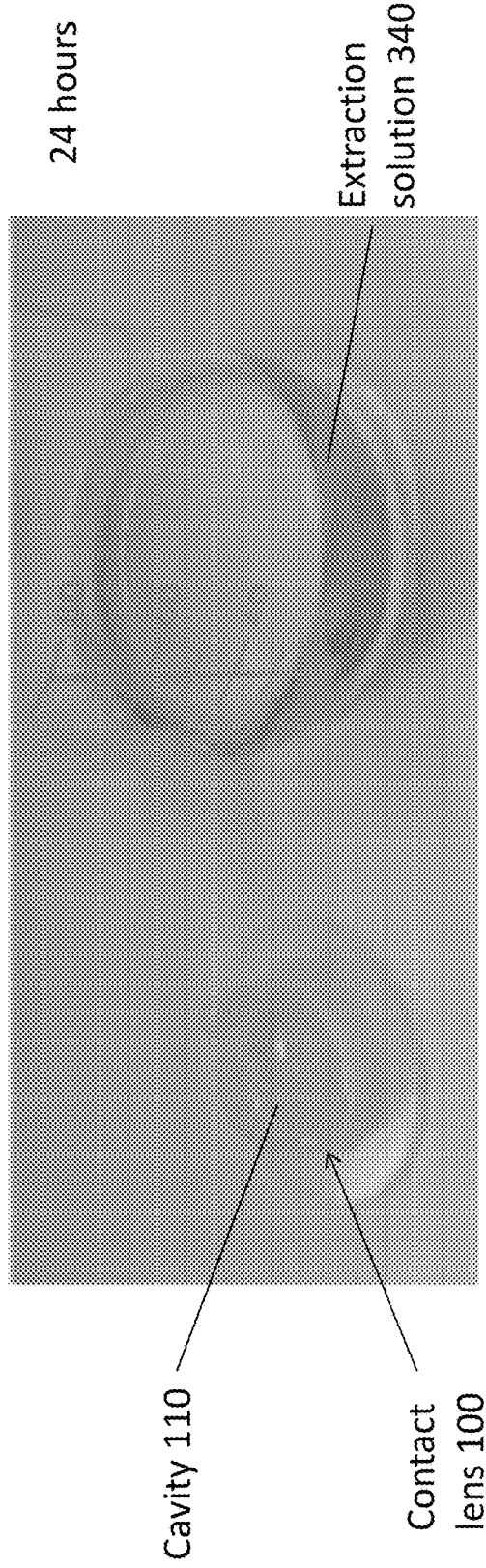

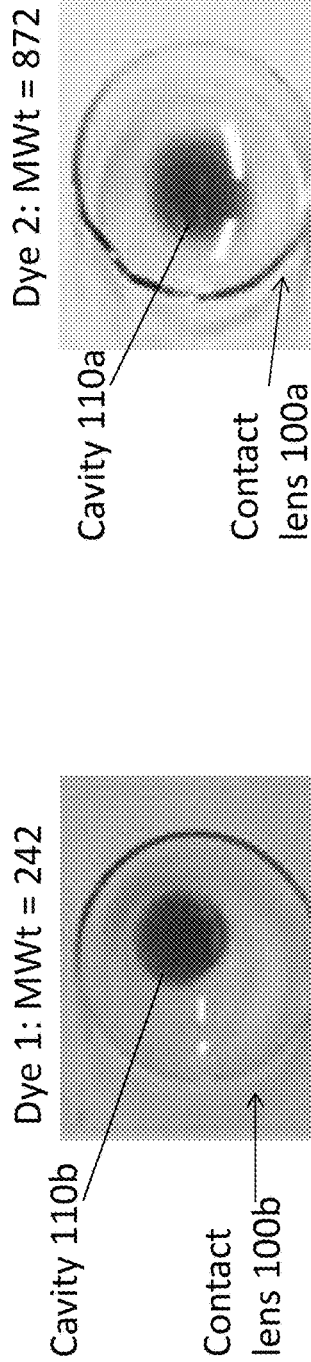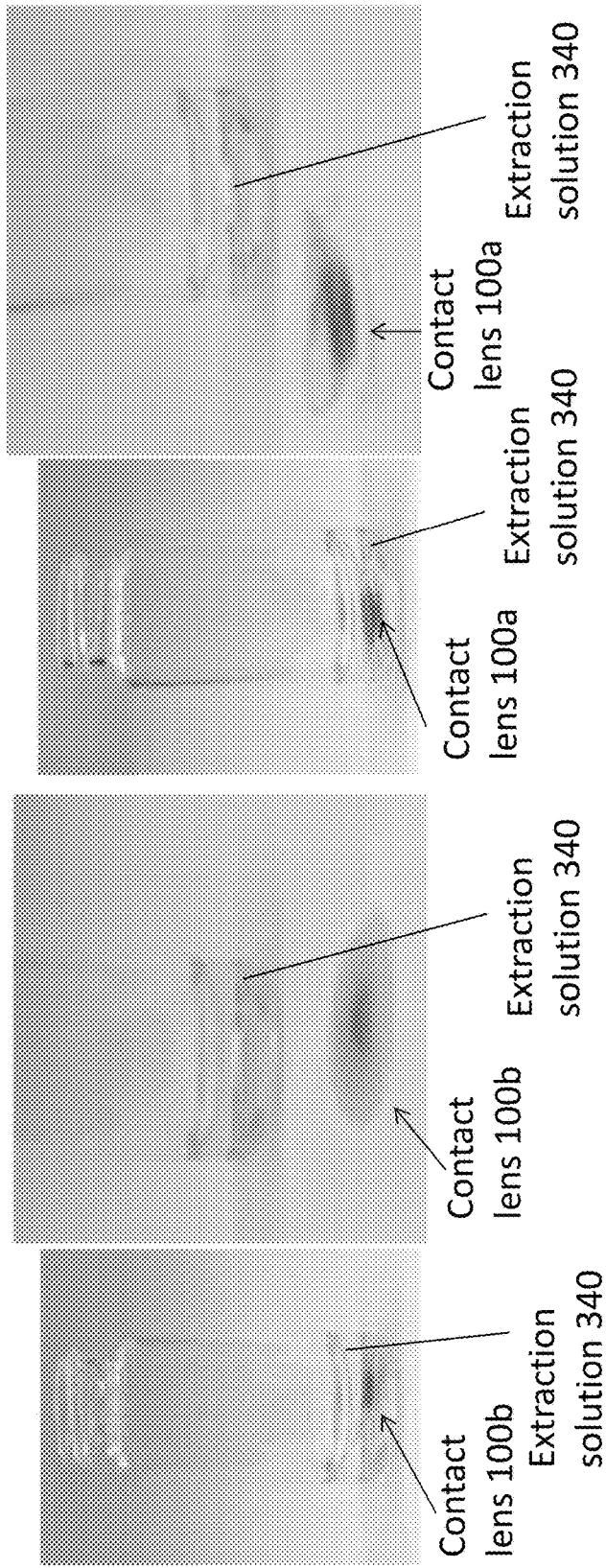

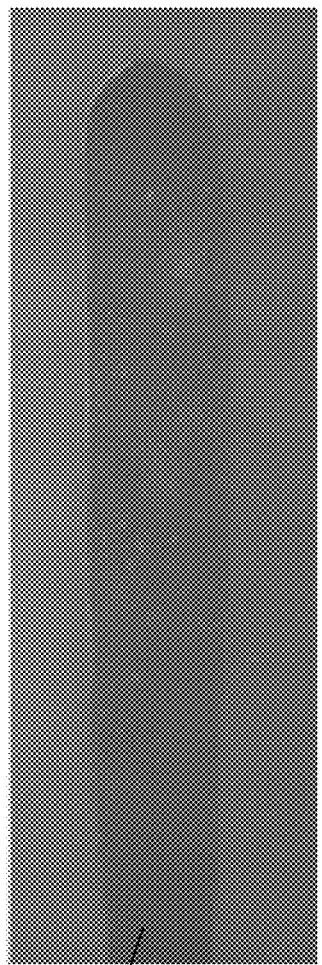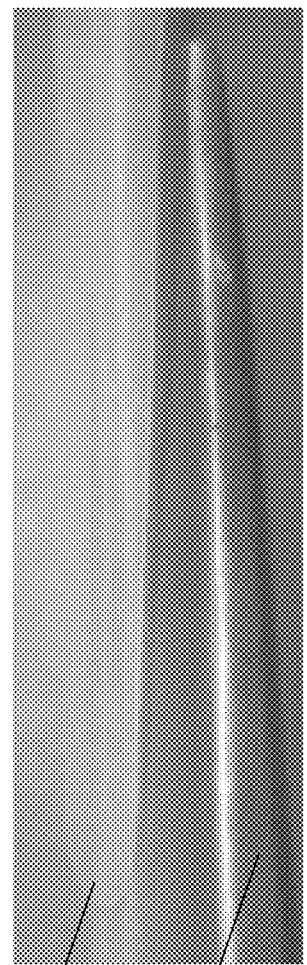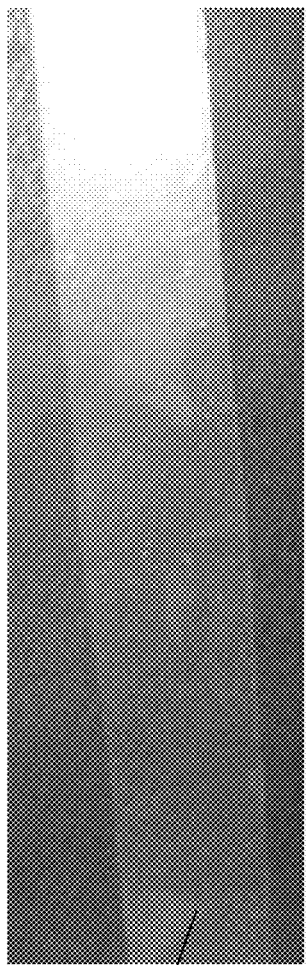
FIG. 35A
FIG. 35B
FIG. 35C

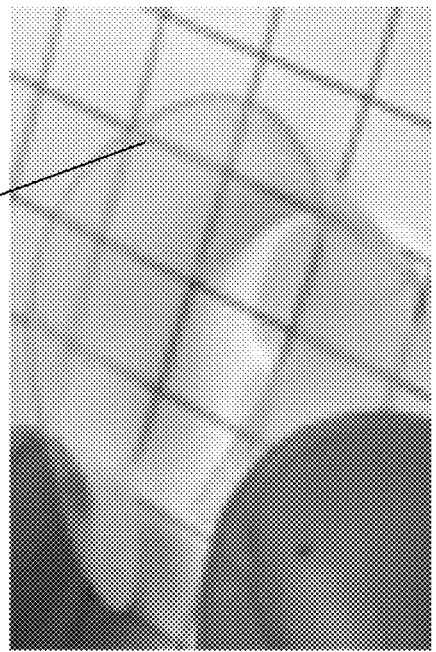
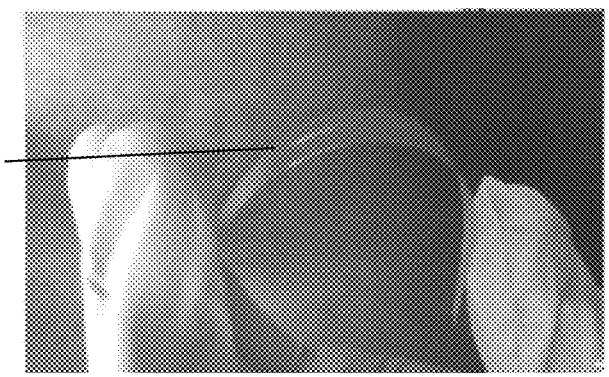
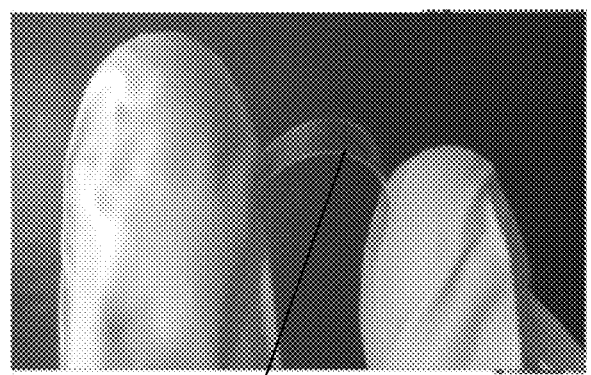
FIG. 36A — Sucrose film, 22 microns
FIG. 36B — Glucose films, 55 microns
FIG. 36C — Isomalt films, 50 microns

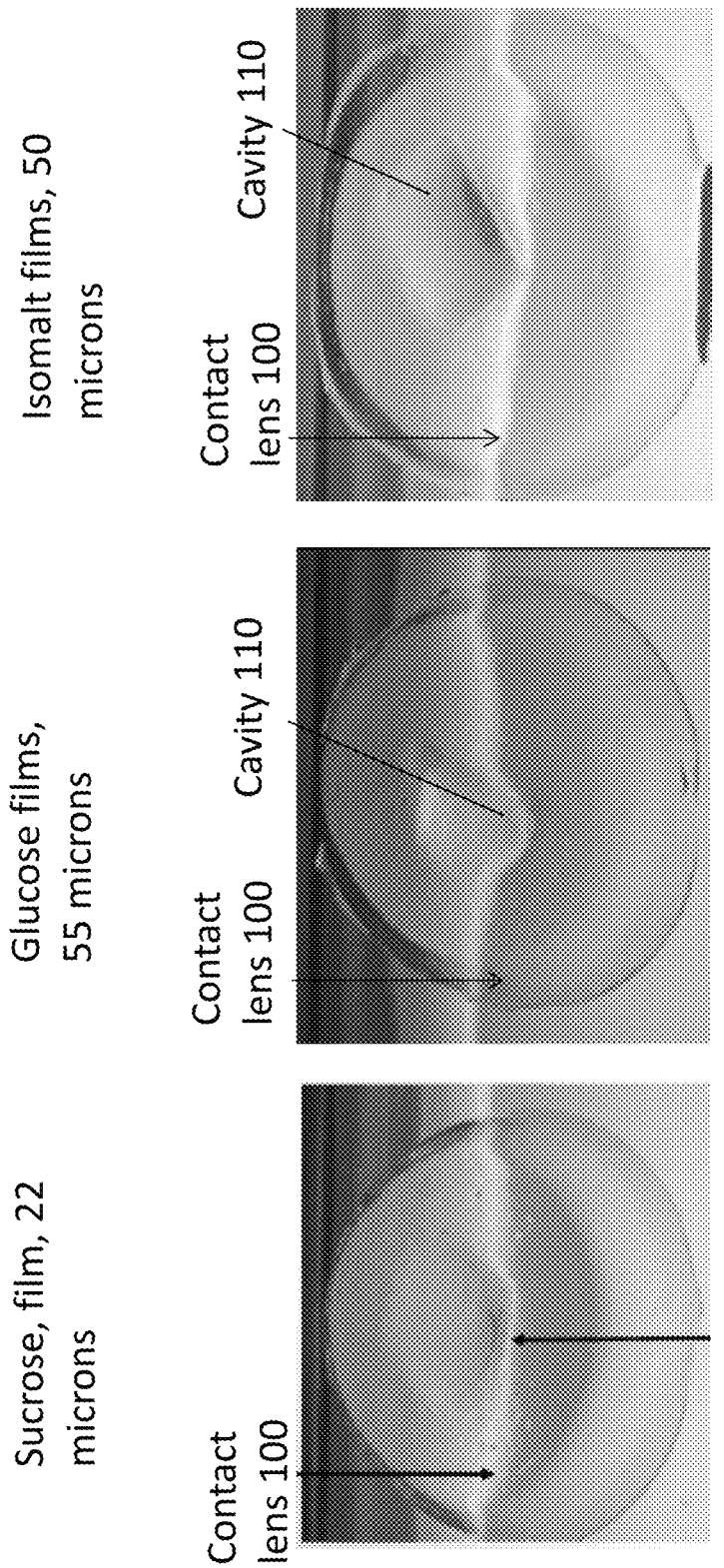

NaCl Insert (200 μm)

No swelling noticeable – 24 h

Entrapped air bubble 370: Moves when cavity is Squeezed

Surface imperfections due to NaCl irregular surface imprinting on the inner walls of the lens cavity 360

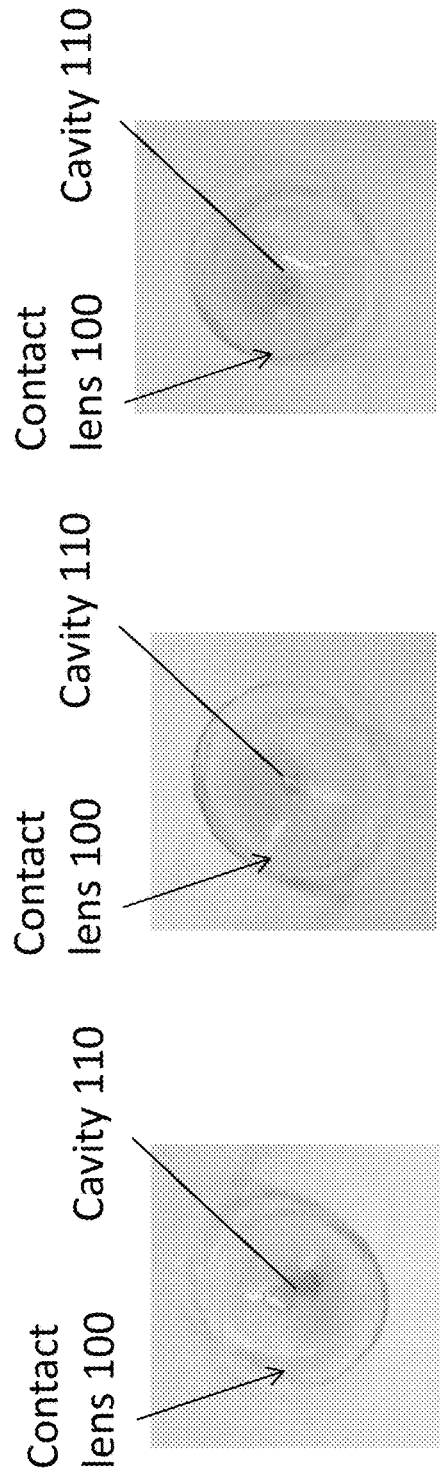
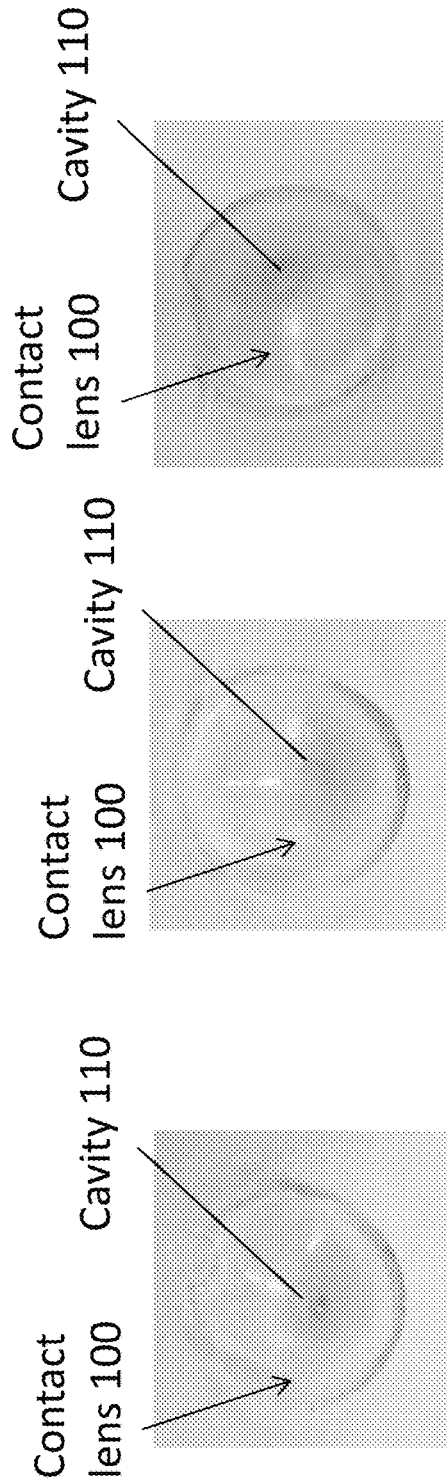

ACCOMMODATING CAVITY LENS SHAPED WITH PHOTOCLEAVABLE INSERT

RELATED APPLICATIONS

This application is a continuation of International Application No. PCT/US2017/060950, filed Nov. 9, 2017, published as WO/2018/089699 on May 17, 2018, which claims priority to U.S. Provisional Application No. 62/505,017, filed May 11, 2017, and to U.S. Provisional Application No. 62/421,121, filed Nov. 11, 2016, the entire disclosures of which are incorporated herein by reference.

The subject matter of the present application is related to following provisional patent application: U.S. Provisional Application No. 62/421,121, filed Nov. 11, 2016, the entire disclosure of which is herein incorporated by reference.

The subject matter of the present application is related to the following patent applications: International Application NO. PCT/US2014/013427, filed Jan. 28, 2014; International Application No. PCT/US2014/013859, filed Jan. 30, 2014; International Application No. PCT/US2014/071988, filed Dec. 22, 2014; U.S. Provisional Application No. 62/031,324, filed Jul. 31, 2014; International Application No. PCT/US2015/0433307, filed Jul. 31, 2015; International Application No. PCT/US2016/061696, filed Nov. 11, 2016; International Application No. PCT/US2016/061697, filed Nov. 11, 2016; and International Application No. PCT/US2016/061700, filed Nov. 11, 2016; the entire disclosures of which are incorporated herein by reference.

The subject matter of the present application is also related to the following provisional patent applications: U.S. Provisional Application No. 62/254,048, filed Nov. 11, 2015; U.S. Provisional Application No. 62/254,080, filed Nov. 11, 2015; and U.S. Provisional Application No. 62/255,242, filed Nov. 13, 2015; U.S. Provisional Application No. 62/327,938, filed Apr. 26, 2016; and U.S. Provisional Application No. 62/254,093, filed on Nov. 11, 2015; the entire disclosures of which are incorporated herein by reference.

BACKGROUND

The prior methods and apparatus for forming manufacturing lenses such as contact lenses can be less than ideal in at least some respects. For example, contact lenses with internal fluidic structures such as chambers can be challenging to manufacture in at least some instances. Although structures such as balloons or modules can be embedded within contact lenses, such structures can make the manufacturing process somewhat more involved than would be ideal.

Multifocal contact lenses may be of two types of designs: those which provide simultaneous vision (U.S. Pat. Nos. 7,517,084, 7,322,695, both by Wooley, et al) and those that provide alternating vision (U.S. Pat. Nos. 7,503,652, 6,092,899, 7,810,925, by Evans, et al). Both types of contact lenses may have at least two or more optical zones of different focal lengths. Simultaneous vision can be provided by multifocal contact lenses that have optical zones of different focusing power disposed radially symmetrically about the optical center of the lens which is also frequently its geometrical center. Alternating vision can be provided by designs in which the optical zones are separated from each other, typically along the vertical meridian, so that the optical center of each zone comes in alignment with the pupillary center as the lens is translated upwards during downward gaze. Neither approach is well accepted by wearers of contact lenses, and there is a continuing unmet need for an accommodating contact lens with a dynamically variable optic that has a single variable focal length, which is easily worn and used. The image quality provided by an accommodating contact lens that can be easily adjusted by the wearer should be much better than multifocal lenses.

A prior contact lens design has been described by Iuliano (U.S. Pat. No. 7,699,464 B2). The manufacture of such a device can be more complicated than would be ideal. Earlier, Elie disclosed an accommodating contact lens (WO 1991010154 A1).

Accommodating contact lenses have been proposed in which a central chamber increases curvature when an eyelid engages a lower chamber coupled to the central chamber. The prior lenses may have less than ideal optical performance, and can be more difficult to use and manufacture than would be ideal. In some instances, the prior contact lenses may provide less than ideal responses to eyelid pressure, and may not change shape in response to eyelid pressure as readily as would be ideal. Also, portions of the lens can be formed in stages and different pieces brought together to form the lens, which results in additional steps in the manufacturing process. Although modules embedded in accommodating contact lenses can be effective, such modules can result in greater complexity and cost than would be ideal. Also, embedded modules may provide non-ideal amounts of resistance to movement of the structures of an accommodating contact lens, depending upon the stiffness of the tensile modulus of the membrane comprising the module.

In light of the above, improved contact lenses and methods of manufacture are needed. Ideally, such contact lenses and methods of manufacture would provide contact lenses that change shape with decreased amounts of pressure, involve fewer steps and allow contact lenses to be produced in large quantities with internal cavity structures.

SUMMARY

Although reference is made to accommodating contact lenses, the lenses, methods and apparatus disclosed herein can be used with many lenses, such as intraocular lenses, and accommodating intraocular lenses. The material having a cavity as described herein will have many applications in many fields, such as implants for sensors and drug delivery. The cavity can be formed in a body comprising polymer material that allows the contents of the cavity to be in equilibrium with an external solution prior to use, and can allow an exchange of fluid between the cavity and external liquid when placed on a subject.

The lens comprises an internal cavity structure formed by dissolution of a soluble insert material. The internal soluble material may dissolve through a body of a lens such as a contact lens in order to form the cavity within the contact lens. The cavity within the lens can be shaped in many ways, and corresponds to the shape of the dissolved material, such that many internal cavity shapes can be readily fabricated within the contact lens. The insert can be placed in a mold with a pre-polymer material, and the pre-polymer material cured with the insert placed in the mold to form the lens body. The polymerized polymer may comprise a low expansion polymer in order to inhibit expansion of the lens when hydrated. The polymerized material can be hydrated and the insert dissolved in order to form the cavity with the desired shape within the lens body. The polymer may comprise a hydrogel when hydrated. The soft contact lens material comprises a sufficient amount of cross-linking to provide structure to the lens and shape the cavity, and allows water and solutes to diffuse in and out of the cavity in order to establish equilibrium of the cavity with the external environment of the lens body. The insert comprises one or more materials having a molecular weight sufficiently low to diffuse out of the lens body when hydrated, and sufficiently high to provide strength to the insert for handling and placement in the lens mold. The diffusion of the dissolved insert material away from the cavity may inhibit osmotic pressure and expansion of the cavity as the material dissolves, such that the structural integrity of the contact lens and cavity can be preserved. After dissolution of the insert, the shape of the cavity corresponds to the three dimensional shape profile of the insert material, such that the cavity can be shaped in many ways.

The internal cavity may comprise an inner optical chamber and a lower chamber of an accommodating contact lens, with a channel extending there between. When the lower eyelid engages the lower chamber, fluid is passed to the optical chamber so as to increase the curvature of the optical chamber and provide optical power for near vision.

The chamber of the contact lens can be configured in many ways. The chamber may provide hydration to the eye with release of water through the lens body to the eye in order to hydrate the eye. The chamber may comprise a drug to treat the eye, and the drug can be released from the chamber through the lens body to treat the eye. The cavity can be formed over at least a portion of a sensor embedded within the contact lens in order to improve coupling of the sensor to the external environment of the lens.

The contact lens can be provided with a sterile package in which a sterile fluid contained in the sterile package and the contact lens immersed in the fluid. The cavity of the contact lens can be in equilibrium with the fluid in which the contact lens is immersed.

In a first aspect, a soft contact lens for correcting vision of an eye is provided. The soft contact lens comprises a hydrogel contact lens body comprising water and cross-linked polymer. The contact lens body defines an internal cavity shaped with a photo-decomposable material and comprising a fluid.

In many embodiments, the cross-linked polymer may allow water to diffuse in and out of the contact lens body to the cavity from an external surface of the body. The cavity may be shaped to correct vision when in equilibrium with tear fluid of the eye.

In many embodiments, the hydrogel contact lens body and cavity may be configured together to increase optical power by at least 2 D with an increase in internal pressure within a range from about 20 Pascals (Pa) to about 50 Pa. The cavity may comprise a volume containing the fluid within a range from about 0.5 mm$^3$ to about 5 mm$^3$. The hydrogel contact lens body may comprise a modulus within a range from about 0.25 MPa to about 2 MPa. A hydrogel material of the contact lens body may comprise an equilibrium water content within a range from about 30% to about 70%.

In many embodiments, hydrogel contact lens body may comprise internal surfaces defining the cavity. The internal surfaces may comprise internal surface structures defined with erosion of a material from within the cavity.

In many embodiments, the hydrogel contact lens body may comprise a first portion on a first side of the cavity and a second portion of the second side of the cavity with the cavity extending therebetween, the first portion bonded to the second portion away from the cavity to contain fluid within the cavity. An interface of the first material bonded to the second material may optionally be detectable by dark field microscopy.

In many embodiments, the cross-linked polymer may directly contacts liquid of the cavity.

In many embodiments, the polymer may comprise sufficient stiffness to retain a shape of an insert dissolved from within the lens body to form the cavity.

In many embodiments, the cavity may comprise a dissolved material having a molecular weight within a range from about 3 to 7 kDaltons. The dissolved material may be capable of diffusing through said polymer of said contact lens body. Said dissolved material may further comprise a material of an insert dissolved to form the cavity. Said dissolved material may alternatively or in combination comprise a material of an insert photo-decomposed to form the cavity. Said cavity may comprise a shape profile corresponding to the dissolved insert.

In many embodiments, the cavity may comprise an optical portion configured to correct vision of the eye and a lower portion fluidically coupled to the optical portion. The optical portion may be configured to provide near vision correction when an eyelid engages the lower portion. The polymer may comprise a sufficient amount of cross-linking to retain fluid in the optical portion when the lower portion engages the eyelid to correct near vision of the eye. Alternatively or in combination said contact lens body may comprise one or more hinges coupled to said optical portion and said lower portion.

In many embodiments, the cavity may comprise one or more internal structures shaped with an erodible material.

In many embodiments, the polymer may comprise hydrogel.

In many embodiments, the cavity may be filled with a liquid and not hermetically sealed. The contact lens body may be permeable to a fluid in which the lens is packaged and the cavity may be in equilibrium with the fluid.

In many embodiments, the polymer may comprise a homogeneous polymer.

In many embodiments, the polymer may comprise a homopolymer.

In many embodiments, the polymer may comprise hydrogel.

In many embodiments, the polymer may comprise channels sized to permit diffusion of water between the cavity and outside the lens body and to inhibit bacteria from entering the cavity from outside the lens body.

In many embodiments, the polymer may allow molecules having a radius of gyration of no more than 50 nm to diffuse through said polymer of the lens body. The polymer may allow molecules having a radius of gyration of no more than 15 nm to diffuse through the polymer of said lens body.

In many embodiments, the cavity may comprise a dissolved material having a molecular weight within a range from about 3 to 10 kDaltons. The dissolved material may be capable of diffusing through said polymer of said contact lens body.

In many embodiments, the cavity may comprise a volume within a range from about 1 to 5 μL.

In many embodiments, the contact fluid may comprise a refractive index within a range from about 1.31 to about 1.37 and the contact lens body may comprise an index of refraction within a range from about 1.37 to about 1.48.

In many embodiments, the hydrogel contact lens may have an anterior side with an anterior thickness defined between an anterior surface of the contact lens body and an anterior surface of the internal cavity. The hydrogel contact lens may have a posterior side with a posterior thickness defined between a posterior surface of the contact lens body and a posterior surface of the inner cavity. The anterior thickness may be less than the posterior thickness. The anterior thickness may be within a range defined between any two of the following values: about 10 microns, about 25 microns, about 50 microns, about 100 microns, about 150 microns, and 200 microns. The posterior thickness may be within a range defined between any two of the following values: about 10 microns, about 100 microns, and about 200 microns. A thickness of the internal cavity from the anterior surface to the posterior surface thereof may be within a range defined between any two of the following values: about 0.5 microns, about 15 microns, about 50 microns, and about 100 microns. A thickness of the contact lens body from the anterior surface to the posterior surface thereof may be in a range from about 80 microns to about 250 microns.

In many embodiments, a shape changing portion of the lens used to correct vision may have RMS optical path difference aberrations of about 0.4 microns or less in a far vision configuration when placed on an eye.

In many embodiments, an inner surface of the polymer defining the cavity comprises a shape profile corresponding to a solid material dissolved to form said cavity. The inner surface of said polymer defining said cavity may further comprise structure corresponding to the solid material dissolved to form said cavity. Alternatively or in combination, the inner surface of the cavity comprises an optically smooth surface over an inner portion of the cavity through which light passes to correct vision. The optically smooth surface may have a wavefront distortion of about 0.3 microns or less measured through the optically smooth surface. The optically smooth surface may comprise no visually perceptible artifacts when worn by a patient. The optically smooth surface may have an RMS value of about 0.2 microns or less. The inner surface of the cavity may comprise a residual surface structure from the solid material dissolved to form said cavity. The inner surface of the cavity may have an RMS value of about 50 nm or less. The inner surface of the cavity may have an RMS value in a range defined between any two of the following values: about 5 nm, about 10 nm, about 15, nm, about 300 nm, about 500 nm, and about 1000 nm.

In a second aspect, a soft contact lens package is provided. The soft contact lens package comprises a sterile package, an aqueous fluid contained within the package, and a soft contact lens. The soft contact lens comprises a contact lens body. The contact lens body comprises a hydrogel material contained within the package. The contact lens body is immersed in the fluid contained within the package. The contact lens body defines a cavity within said body, said cavity shaped with a photo-decomposable material and comprising a liquid.

In many embodiments, the contact lens body may be permeable to the liquid and the fluid in which the contact lens is immersed such that the cavity is in equilibrium with the fluid outside the lens body.

In many embodiments, at least a portion of the fluid may have diffused into said cavity.

In many embodiments, the contact lens body may be permeable to water such that said contact lens hydrates an eye with fluid from the cavity when placed on the eye.

In many embodiments, the contact lens body may comprise an index of refraction within a range from about 1.31 to about 1.37. The contact lens body may comprise an index of refraction within a range from about 1.37 to about 1.48.

The fluid may comprise an index of refraction within a range from about 1.31 to about 1.37.

In many embodiments, the contact lens body may comprise an amount of cross-linking sufficient to inhibit bacteria entering the cavity from outside the contact lens body.

In another aspect, an accommodating soft contact lens is provided. The lens comprises an embedded cavity shaped with a photo-decomposable material and filled with the fluid of hydration of said lens.

In many embodiments, the lens may generate an addition plus power on eye upon down-gaze when viewing near objects. The range of said add power may be 0.5 D to 6.0 D. Alternatively or in combination, said down-gaze may be in the range of 10 degrees to 40 degrees. Alternatively or in combination, said object distance may be in the range 15 cm to 200 cm.

In many embodiments, the lens may comprise a cross-linked hydrogel network formed from a photo-polymerizable pre-polymer formulation. The hydrogel may have an amount of water within a range from about 28% to 65%.

In many embodiments, the cavity may comprise a drug.

In many embodiments, the cavity may comprise timolol.

In many embodiments, the lens may further comprise a sensor. At least a portion of the sensor may be located within the cavity.

In many embodiments, the lens may further comprise a sensor. At least a portion of the sensor may be located within the cavity. The sensor may comprise one or more of a pressure sensor, a glucose sensor, a biomarker sensor, an electrical sensor, or a sensor having ion specific microelectrodes. The sensor may comprise a volume of no more than about 0.001 $mm^3$.

In another aspect, a method of manufacturing a lens is provided. The method comprises dissolving an insert comprising a photo-decomposable material from within a polymerized lens material to form a cavity within the polymerized lens material. In many embodiments, the method further comprises polymerizing a pre-polymer material to form the polymerized material and hydrating the polymerized lens material with the insert contained therein.

In many embodiments, the pre-polymer material may be polymerized with light.

In many embodiments, the method further may comprise placing the insert and the pre-polymer material to cure the pre-polymer with the insert placed in the mold.

In many embodiments, the insert may comprise a biocompatible water soluble polymer. The biocompatible water soluble polymer may comprise one or more of polyvinyl alcohol, polyvinyl acetate, polyethylene oxide, propylene oxide, copolymer of ethylene and propylene oxides (Pluronic acids), poly vinyl pyrollidone, polyethylene imine, polyacrylamide, or polysaccharide.

In many embodiments, the insert may comprise a biocompatible water soluble polymer. The biocompatible water soluble polymer may comprise one or more of polyvinyl alcohol, polyvinyl acetate, polyethylene oxide, propylene oxide, copolymer of ethylene and propylene oxides (Pluronic acids), poly vinyl pyrollidone, polyethylene imine, polyacrylamide, polysaccharide, polyethylene glycol (PEG) in the molecular weight range of about 600 g/mol to about 6000 g/mol, hydrophilic ionic polyacrylates, polymethacrylates, or copolymers of hydrophilic ionic polyacrylates and polymethacrylates.

In many embodiments, the pre-polymer may comprise one or more of a monomer or an oligomer.

In many embodiments, the polymerized lens material may comprise a homopolymer.

In many embodiments, the polymerized lens material may comprise a low expansion polymer.

In many embodiments, the insert may comprise a substantially uniform thickness.

In many embodiments, the insert may comprise a substantially uniform thickness and curved upper and lower surfaces having a curvature corresponding to a curvature of a mold defining a base curvature of the contact lens.

In many embodiments, the insert may comprise a thickness and a shape profile corresponding to the cavity.

In many embodiments, the insert may comprise a material having a molecular weight within a range from about 3 kDaltons to about 10 kDaltons and wherein said material dissolves and diffuses through said polymerized lens material to form the cavity within said polymerized lens material.

In many embodiments, the insert may comprise a material having a molecular weight of at least about 3 kDaltons to add stiffness to the material to retain a shape. The cavity may correspond to the shape of the insert.

In many embodiments, the lens may comprise a cross-linked hydrogel network formed from a photo-polymerizable pre-polymer formulation. The hydrogel may comprise an amount of hydration within a range from about 28% to about 65%.

In another aspect, a soft contact lens for correcting vision of an eye is provided. The soft contact lens comprises a hydrogel contact lens body comprising water and cross-linked polymer. The contact lens body defines an internal cavity shaped with a photo-decomposable material and comprising a fluid. The cross-linked polymer allows water to diffuse in and out of the contact lens body to the cavity from an external surface of the body. The contact lens body comprises an anterior surface and a posterior surface. The posterior surface, anterior surface, and cavity are shaped to correct vision with said cavity in equilibrium with tear fluid of the eye.

In another aspect, an erodible insert for use in manufacturing a soft contact lens is provided. The insert comprises a photo-decomposable material composed of a first material configured to photo-decompose and pass through channels of a hydrogel contact lens and a second material configured with one or more of particle size or solubility to remain within a cavity formed by photo-decomposition of the first material.

In another aspect, an erodible insert for use in manufacturing a soft contact lens is provided. The insert comprises a photo-decomposable material composed of a first material configured to photo-decompose and pass through channels of a hydrogel contact lens and a second material configured with one or more of particle size or solubility to remain within a cavity formed by photo-decomposition of the first material. The second material comprises an amount sufficient to provide an osmolality of the cavity within a range from about 200 milliosmoles to about 290 milliosmoles when the first material has passed through the channels.

In another aspect, an erodible insert for use in manufacturing a soft contact lens is provided. The insert comprises a photo-decomposable material composed of a first polymer material configured to photo-decompose and pass through channels of a hydrogel contact lens and a second less soluble polymer material configured to remain within a cavity formed by photo-decomposition of the first material. The first polymer material comprises a water soluble material and the second polymer material comprises a water insoluble material.

In another aspect, an erodible insert for use in manufacturing a soft contact lens is provided. The insert comprises a photo-decomposable material composed of a first polymer material comprising a first amount of acetate and configured to dissolve and pass through channels of a hydrogel contact lens and a second less soluble polymer material comprising a greater amount of acetate to remain within a cavity formed by dissolution of the first material.

In another aspect, an erodible insert for use in manufacturing a soft contact lens is provided. The insert comprises a photo-decomposable material composed of a first water soluble polymer material having a first molecular weight and configured to dissolve and pass through channels of a hydrogel contact lens and a second polymer material having a second molecular weight greater the first molecular weight to remain within a cavity formed by dissolution of the first material.

In another aspect, an erodible insert for use in manufacturing a soft contact lens is provided. The insert comprises a photo-decomposable material shaped to have front and back surfaces each having curvature corresponding to one or more surfaces of the soft contact lens, a circular region shaped to define an inner optical chamber, an outer region, and an extension extending between the inner region and the outer region, the extension comprising a maximum dimension across sized less than a diameter of the circular region.

In another aspect, an erodible insert for use in manufacturing a soft contact lens is provided. The insert comprises a photo-decomposable material shaped to have front and back surfaces each having curvature corresponding to one or more surfaces of the soft contact lens, the front and back surfaces sufficiently smooth to impart optical quality to correct vision with the contact lens, a circular region shaped to define an inner optical chamber, an outer region, and an extension extending between the inner region and the outer region, the extension comprising a maximum cross-sectional dimension sized less than a diameter of the circular region, the outer region comprising a maximum dimension across sized greater than the maximum cross-sectional dimension of the extension.

In many embodiments, the insert may comprise a biocompatible water soluble polymer. The biocompatible water soluble polymer may comprise one or more of polyvinyl alcohol, polyvinyl acetate, polyethylene oxide, propylene oxide, copolymer of ethylene and propylene oxides (Pluronic acids), poly vinyl pyrollidone, polyethylene imine, polyacrylamide, polysaccharide, polyethylene glycol (PEG) in the molecular weight range of about 600 g/mol to about 6000 g/mol, hydrophilic ionic polyacrylates, polymethacrylates, or copolymers of hydrophilic ionic polyacrylates and polymethacrylates.

In another aspect, an insert for use in manufacturing a soft contact lens is provided. The insert comprises a polymer. The polymer comprises one or more a linker groups. The linker group is cleavable upon exposure to radiation of a wavelength.

In many embodiments, the radiation may be selected from ultraviolet radiation. The radiation may be selected from near-infrared radiation. In many embodiments, the wavelength may be selected from about 350 nm to about 450 nm.

In many embodiments, the linker group may be selected from an optionally substituted nitrobenzyl group, an optionally substituted nitrophenyl group, and an optionally substituted bromoquinoline.

In many embodiments, the linker group may be an optionally substituted nitrobenzyl group.

In many embodiments, the optionally substituted nitrobenzyl group may be represented by Formula (I):

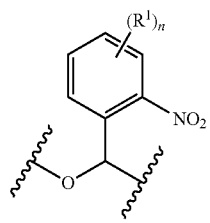

(I)

wherein R¹ may be independently selected at each occurrence from alkyl, alkoxy, aryl, halo, heteroaryl, nitro, cyano, haloalkyl, and hydroxyl; and wherein n may be selected from 0 to 4. For a linker of Formula (I), n may for example be 0. For a linker of Formula (I), R¹ may for example be alkoxy and n may be 1.

In many embodiments, the linker of Formula (I) may be represented by Formula (Ia):

Formula (Ia)

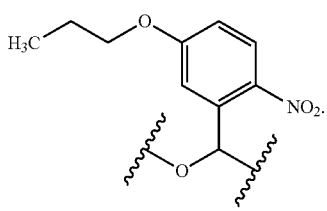

In many embodiments, the linker of Formula (I) may be represented by Formula (Ib):

Formula (Ib)

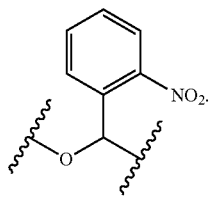

In many embodiments, the optionally substituted nitrobenzyl group may be represented by Formula (II):

Formula (II)

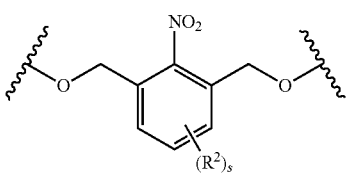

wherein R² may be independently selected at each occurrence from alkyl, alkoxy, aryl, halo, heteroaryl, nitro, cyano, haloalkyl, and hydroxyl; and wherein s may be selected from 0 to 3. For a linker of Formula (II), s may for example be 0.

In many embodiments, the insert may comprise a polymer comprising a repeating group selected from 20 to 100 atoms. The repeating group may comprise one or more cleavable linkers.

In many embodiments, the insert may comprise a polymer comprising a repeating group selected from 20 to 100 atoms. The repeating group may comprise one or more linker groups.

In many embodiments, the repeating group may comprise one or more chains selected from: optionally substituted heteroalkylene chain, optionally substituted alkylene chain, heteroarylene, and arylene.

In many embodiments, the insert may comprise a polymer comprising a repeating group selected from 20 to 100 atoms. The repeating group may comprise two linker groups. The repeating group of the insert polymer may for example be represented by Formula (III):

Formula (III)

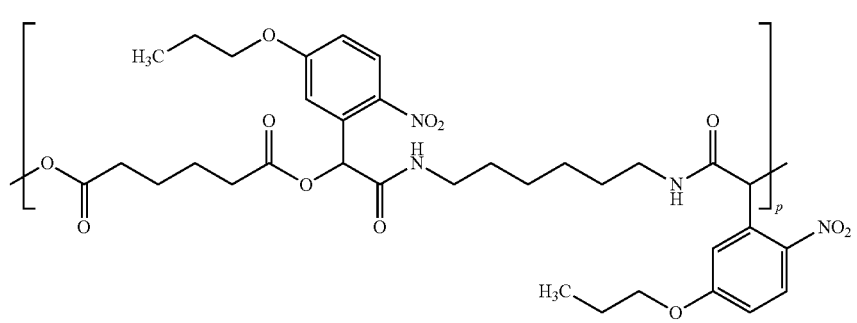

wherein p may be selected from 4 to 30.

In many embodiments, the insert may comprise a polymer comprising a repeating group selected from 20 to 100 atoms. The repeating group may comprise one linker group. The repeating group of the insert polymer may for example be represented by Formula (IV):

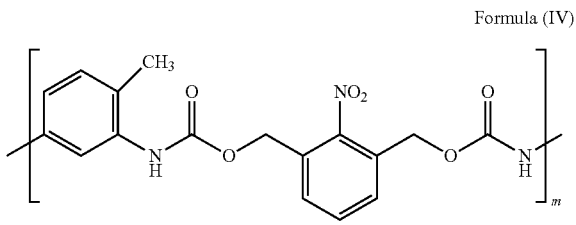

Formula (IV)

wherein m may be selected from 4 to 30.

In many embodiments, the insert may comprise a polymer comprising a repeating group selected from 20 to 100 atoms. The repeating group may comprise one linker group. The repeating group of the insert polymer may for example be represented by Formula (V):

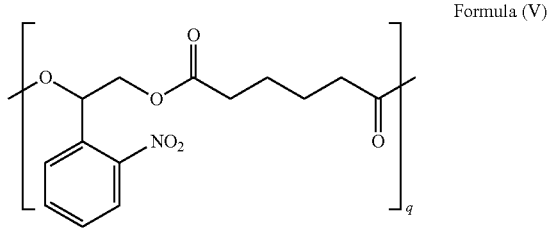

Formula (V)

wherein q may be selected from 4 to 30.

In many embodiments, the polymer may comprise from about 20 to about 30 repeating groups.

In another aspect, the use of any of the photo-cleavable inserts described herein in preparation of a contact lens is provided.

In another aspect, a method of manufacturing a lens is provided. The method comprises providing a polymerized lens material around an insert selected from any of the photo-cleavable inserts described herein, decomposing said insert into a plurality of polymer fragments by exposing said insert to a radiation at a wavelength, and diffusing said plurality of polymer fragments from within the polymerized lens material to form a cavity within the polymerized lens material.

In many embodiments, the method may further comprise polymerizing a pre-polymer material to form said polymerized lens material around said insert. Polymerizing the pre-polymer material to form the polymerized lens material around said insert may comprise exposing the pre-polymer material to the radiation at the wavelength.

In many embodiments, the method further may comprise hydrating the polymerized lens material with the insert contained therein.

In another aspect, a soft contact lens for correcting vision of an eye is provided. The lens comprises a hydrogel contact lens body comprising water and cross-linked polymer. The contact lens body defines an internal cavity comprising a fluid. The cavity comprises a photo-decomposed material.

In many embodiments, the fluid may comprise a photo-decomposed material.

In many embodiments, the photo-decomposed material may comprise a material of an insert used to shape the cavity.

In many embodiments, the photo-decomposed material may comprise a residual of a nitrobenzyl material.

In many embodiments, the photo-decomposed material may comprise an aromatic ring.

In many embodiments, the cavity may have been formed from an insert with an optically smooth surface. Upper and lower portions of the lens body defining the optical chamber may comprise optically smooth surfaces in order to allow vision correction.

In many embodiments, the cavity may have been formed from an insert with an optically smooth surface. Upper and lower portions of the lens body defining the optical chamber may comprise optically smooth surfaces in order to allow vision correction. The surfaces may have an RMS value or about 50 nm or less.

In many embodiments, the cavity may comprise particles contained within said cavity.

In many embodiments, the cavity may comprise particles comprising dimensions greater than dimensions of channels of a hydrogel polymer defining the cavity to contain the particles within the cavity.

In many embodiments, the cavity may comprise one or more of soluble, partially soluble or insoluble particles contained within the cavity. The particles may comprise dimensions greater than dimensions of channels of a hydrogel polymer defining the cavity to contain the particles within the cavity.

In many embodiments, the cavity may comprise polymer comprising acetate.

In many embodiments, the cavity may comprise a refractive index gradient. The refractive index gradient may comprise a greater index of refraction near the boundary of the cavity and a lesser index of refraction in an interior of the cavity away from the boundary.

In many embodiments, the insert may comprise hydrogen bonds between at least a portion of the insert with the hydrogel contact lens material in order to provide the cavity with a refractive index gradient. The refractive index gradient may comprise a greater index of refraction near the boundary of the cavity and a lesser index of refraction in the interior of the cavity away from the boundary.

In many embodiments, the cavity insert may comprise a tapered edge in order to inhibit prism related to an abrupt change in refractive index near a boundary of the cavity formed in the hydrogel contact lens material.

In many embodiments, the cavity may comprise solubilized polymer particles having insoluble pendant groups. The hydrogel may comprise channels made of a hydrophilic material to allow water to pass when hydrated while the insoluble pendant groups maintain the polymer particles within said chamber when hydrated.

In many embodiments, the hydrogel polymer enclosing said cavity may be configured to replace at least a portion of the liquid contained within the cavity with tear fluid when placed on the eye of a wearer.

In many embodiments, the hydrogel polymer enclosing the cavity may be configured to release liquid from within the cavity to an exterior of the soft contact lens to provide the liquid to the eye.

In many embodiments, the material within the cavity may comprise an index of refraction less than an index of refraction of the hydrogel material encapsulating the cavity when hydrated. The cavity may be shaped to add negative optical power to the lens with the material contained therein.

In many embodiments, the inner cavity providing optical correction may be encapsulated on an anterior side and a posterior side with the contact lens body within an optically used portion of the cavity. The anterior side of the contact lens body may comprise an anterior thickness and the posterior side may comprise a posterior thickness. The anterior thickness may be less than the posterior thickness in order to facilitate deflection of the anterior surface of the lens when the contact lens comprises a presbyopia correcting near vision configuration with inflation and increased optical power of the inner portion of the chamber.

In many embodiments, the inner cavity providing optical correction may be encapsulated on an anterior side and a posterior side with the contact lens body within an optically used portion of the cavity. The anterior side of the contact lens body may comprise an anterior thickness and the posterior side may comprise a posterior thickness. The anterior thickness may be less than the posterior thickness and the anterior and posterior surfaces may deflect with inflation of the optical inner portion of the chamber. The anterior surface may deflect more than said posterior surface with inflation to correct presbyopia.

In many embodiments, the inner cavity providing optical correction may be encapsulated on an anterior side and a posterior side with the contact lens body within an optically used portion of the cavity. The anterior side of the contact lens body may comprise an anterior thickness and the posterior side comprises a posterior thickness. The anterior thickness may be at least about 50 µm.

In many embodiments, the inner cavity providing optical correction may be encapsulated on an anterior side and a posterior side with the contact lens body within an optically used portion of the cavity. The anterior side of the contact lens body may comprise an anterior thickness and the posterior side comprises a posterior thickness. The anterior thickness may be no more than about 100 µm.

In many embodiments, the inner cavity providing optical correction may be encapsulated on an anterior side and a posterior side with the contact lens body within an optically used portion of the cavity. The anterior side of the contact lens body may comprise an anterior thickness and the posterior side may comprise a posterior thickness. The anterior thickness may be within a range defined between any two of the following values: about 10 microns, about 25 microns, about 50 microns, about 100 microns, about 150 microns, and 200 microns.

In many embodiments, the inner cavity providing optical correction may be encapsulated on an anterior side and a posterior side with the contact lens body within an optically used portion of the cavity. The anterior side of the contact lens body may comprise an anterior thickness and the posterior side may comprise a posterior thickness. The posterior thickness may be at least about 100 µm.

In many embodiments, the inner cavity providing optical correction may be encapsulated on an anterior side and a posterior side with the contact lens body within an optically used portion of the cavity. The anterior side of the contact lens body may comprise an anterior thickness and the posterior side may comprise a posterior thickness. The posterior thickness may be no more than about 200 µm.

In many embodiments, channels of a material of the hydrogel contact lens body may be sized to allow a disinfectant to flow from the chamber to the eye and to inhibit bacteria from entering the chamber from an exterior of the lens body into the chamber.

In many embodiments, the cavity may comprise a different refractive index than a hydrogel material of the contact lens body encapsulating the cavity.

In many embodiments, the cavity may comprise a different refractive index than a hydrogel material of the contact lens body encapsulating the cavity. The refractive index of the cavity may be different by at least about 0.03 from the refractive index of the material encapsulating the cavity.

In many embodiments, the cavity may comprise a different refractive index than a hydrogel material of the contact lens body encapsulating the cavity. The refractive index of the cavity may be different by at least about 0.05 from the refractive index of the material encapsulating the cavity.

In many embodiments, the cavity may comprise a different refractive index than a hydrogel material of the contact lens body encapsulating the cavity. The refractive index of the cavity may be different by at least about 0.10 from the refractive index of the material encapsulating the cavity.

In many embodiments, the cavity may comprise a similar refractive index as a hydrogel material of the contact lens body encapsulating the cavity. The refractive index of the cavity may be within about 0.03 of the refractive index of the material encapsulating the cavity.

In many embodiments, the cavity may comprise a similar refractive index as a hydrogel material of the contact lens body encapsulating the cavity. The refractive index of the cavity may be within about 0.05 of the refractive index of the material encapsulating the cavity.

In many embodiments, the cavity may comprise a negative optical power refracting light in a far vision configuration. Anterior and posterior surfaces of said lens body may each be configured with a radius of curvature with the cavity to provide far vision correction.

In many embodiments, the cavity may comprise an inner optical chamber to provide optical correction and a first outer chamber and a second outer chamber connected with one or more channels extending there between. The first outer chamber may be located inferior to the inner chamber. The first outer chamber may comprise an amount of fluid to provide intermediate vision correction to the inner optical chamber. The second outer chamber may comprise an amount of fluid to provide near vision correction when combined with fluid from the first outer chamber. The first outer chamber may be located inferiorly to the second outer chamber to engage the first outer chamber with the eyelid to provide intermediate vision correction and to engage with the eyelid both the first outer chamber and the second outer chamber to provide near vision correction.

In many embodiments, the liquid contained within the cavity may comprise an osmolality within a range from about 200 (two hundred) to about 290 mOsmol/L (two hundred ninety milliosmoles per liter).

In many embodiments, the liquid contained within the cavity may comprise an osmolality within a range from about 250 to about 290 mOsmol/L (two hundred ninety milliosmoles per liter).

In many embodiments, the liquid contained within the cavity may comprise particles composed of a hydrophobic material to inhibit release of the particles through the hydrogel material encapsulating the cavity.

In many embodiments, the liquid contained within the cavity may comprise particles composed of a hydrophobic material comprising acetate to inhibit release of the particles through the hydrogel material encapsulating the cavity.

In many embodiments, the lens body may comprise side chains of polymer extending into said cavity in order to provide a gradient refractive index.

In many embodiments, the lens body may comprise side chains of polymer comprising acetate extending into the cavity in order to provide a gradient refractive index.

In many embodiments, an interface of the cavity with the contact lens body may comprise a HEMA hydrophilically bonded with polyvinyl alcohol (PVA).

In many embodiments, the insert may comprise polyvinyl alcohol (PVA) and acetate (Ac).

In many embodiments, the insert may comprise a copolymer of polyvinyl alcohol (PVA) and polyvinyl acetate (PVAc).

In many embodiments, the insert may comprise a copolymer of polyvinyl alcohol (PVA) and polyvinyl acetate (PVAc) with vinyl acetate groups interspersed among vinyl alcohol groups.

In many embodiments, the insert may comprise a solid material composed a plurality of polymer chains comprising of polyvinyl alcohol (PVA) and vinyl acetate (VAc) along said each of the plurality of chains.

In many embodiments, the insert may comprise a solid material composed a plurality of polymer chains, the polymer chains comprising vinyl alcohol (PVA) and vinyl acetate (VAc) along said each of the plurality of chains. Each of the plurality of chains may have from about 1000 to about 1500 pendant groups comprising a combination of alcohol and acetate.

In many embodiments, the insert may comprise a solid material composed a plurality of polymer chains comprising of polyvinyl alcohol (PVA) and poly vinyl acetate (VAc) along said each of the plurality of chains. Each of the plurality of chains may be configured to erode from the insert. The plurality of polymer chains may have an average molecular weight of within a range from about 50 kD to about 150 kD.

In many embodiments, the insert may comprise a solid material composed a plurality of polymer chains comprising of polyvinyl alcohol (PVA) and poly vinyl acetate (VAc) along said each of the plurality of chains. Each of the plurality of chains may be configured to separate from other chains and erode from the insert. The plurality of polymer chains may have an average molecular weight of within a range from about 50 kD to about 110 kD.

In many embodiments, the insert may comprise a solid material composed a plurality of polymer chains comprising of polyvinyl alcohol (PVA) and poly vinyl acetate (VAc) along said each of the plurality of chains. Each of the plurality of chains may be configured to separate from other chains and erode from the insert. The plurality of polymer chains may have an average molecular weight of within a range from about 100 kD to about 110 kD.

In many embodiments, the insert may comprise a solid material composed of a plurality of polymer chains comprising of polyvinyl alcohol (PVA) and polyvinyl acetate (PVAc) along said each of the plurality of chains. Each of the polymer chains may comprise PVAc within a range from about 0.05% to about 10% and PVA within a range from about 90% to about 99.5%. The vinyl acetate groups may be interspersed among vinyl alcohol groups.

In many embodiments, the insert may comprise a solid material composed of polyvinyl alcohol (PVA) polymer and polyvinyl acetate (PVAc). The PVAc may comprise an amount by weight of the material within a range from about 1% to about 20%. The PVA may comprise an amount by weight within a range from about 99% to about 80%.

In many embodiments, the cavity may comprise a therapeutic agent selected from the group consisting of: anti-infectives, including, without limitation, antibiotics, antivirals, and antifungals; antiallergenic agents and mast cell stabilizers; steroidal and non-steroidal anti-inflammatory agents; cyclooxygenase inhibitors, including, without limitation, Cox I and Cox II inhibitors; combinations of anti-infective and anti-inflammatory agents; decongestants; anti-glaucoma agents, including, without limitation, adrenergics, β-adrenergic blocking agents, α-adrenergic agonists, parasympathomimetic agents, cholinesterase inhibitors, carbonic anhydrase inhibitors, and prostaglandins; combinations of anti-glaucoma agents; antioxidants; nutritional supplements; drugs for the treatment of cystoid macular edema including, without limitation, non-steroidal anti-inflammatory agents; drugs for the treatment of ARMD, including, without limitation, angiogenesis inhibitors and nutritional supplements; drugs for the treatment of herpetic infections and CMV ocular infections; drugs for the treatment of proliferative vitreoretinopathy including, without limitation, antimetabolites and fibrinolytics; wound modulating agents, including, without limitation, growth factors; antimetabolites; neuroprotective drugs, including, without limitation, eliprodil; and angiostatic steroids for the treatment of diseases or conditions of posterior segment, including, without limitation, ARMD, CNV, retinopathies, retinitis, uveitis, macular edema, and glaucoma.

In many embodiments, the insert may comprise a material capable of being bent to a radius of curvature within a range from about 5 mm to about 1 meter. The material may optionally comprise an elastic material.

In many embodiments, the cavity may comprise one or more channels to facilitate removal of the residual insert material. The one or more channels may be formed by puncturing the lens body with a syringe, needle, or laser. Alternatively or in combination, the one or more channels may be formed by chemical erosion of a pre-determined portion of the lens body. Alternatively or in combination, the one or more channels may be formed by erosion of the insert. The insert may comprise one or more protrusions correspondingly shaped to the one or more channels. Alternatively or in combination, the one or more channels may be formed outside of the optical zone to reduce visual aberrations of the lens. Alternatively or in combination, the one or more channels may be formed towards an outer edge of the lens, the posterior surface of the lens, or the anterior surface of the lens. Alternatively or in combination, the one or more channels may be one or more of filled in, plugged, sealed, sealed with polymer comprising a polymer of the contact lens, or welded, following erosion of the insert and formation of the cavity.

In many embodiments, the insert may comprise one or more protrusions shaped so as to define one or more channels in the lens body from the cavity to one or more external sides of the lens after formation of the lens around the insert and erosion of the insert.

In many embodiments, the cavity may comprise residual insert material. An inner surface of the cavity may comprise a residual surface structure comprising the residual insert material. The residual surface structure may be optically smooth. The residual surface structure may optionally comprise no visually perceptible artifacts.

In many embodiments, the insert may have a thickness within a range defined between any two of the following values: about 0.5 microns, about 15 microns, about 50 microns, about 75 microns and about 100 microns.

In many embodiments, the insert may have a thickness of greater than about 100 microns.

In many embodiments, the insert may comprise an insert material that is selected from the group consisting of dissolvable, erodible, degradable, and solulizable, by an aqueous solution, alcohol, or solvent.

In many embodiments, the insert may comprise an insert material that is selected from the group consisting of moldable, extrudable, and photo-curable.

In many embodiments, the insert material may comprise material selected from the group consisting of a sugar or sugar alcohol. The insert material may comprise a sugar. The sugar may be selected from the group consisting of a mono-saccharide, di-saccharide, and poly-saccharide. Alternatively or in combination, the sugar may be selected from the group consisting of fructose, galactose, glucose, glyceraldehyde, lactose, maltose, ribose, sucrose, cellulose, and methylcellulose. Alternatively or in combination, the insert material may comprise a sugar alcohol. The sugar alcohol may be selected from the group consisting of arabitol, D-sorbitol, erythritol, fucitol, galactiol, glycerol, iditol, inositol, isomalt, lactitol, maltotetraitol, maltitol, maltotritol, mannitol, myo-inositol, polyglycitol, ribitol, sorbitol, threitol, and xylitol.

In many embodiments, the insert material may comprise a material selected from the group consisting of dimethyl sulfoxide (DMSO), N-vinylpyrrolidone (NVP), polyethylene glycol (PEG), poly sodium methacrylate, Methocel™ E6, polyvinyl alcohol (PVA), polyvinyl acetate (PVAc), and a copolymer of PVA and PVAc.

In many embodiments, the insert material may comprise a material selected from the group consisting of sodium chloride, sodium carbonate, and potassium chloride.

In many embodiments, the lens may be formed by one or more of casting, extrusion, molding, or lamination.

In many embodiments, the lens may comprise a material selected from the group consisting of acofilcon A, acofilcon B, alfafilcon A, altraficon A, atlafilcon A, balafilcon A, bufilcon A, comfilcon A, crofilcon, deltafilcon A, dimefilcon A, droxifilcon A, efrofilcon A, enfilcon, epsifilcon A, etafilcon A, focofilcon A, galyfilcon A, heflicon A, heflicon B, hefilcon C, hilafilcon A, hilafilcon B, hioxifilcon A, hioxifilcon B, hioxifilcon D, isofilcon, lidofilcon A, lidofilcon B, lotrafilcon A, lotrafilcon B, mafilcon, methafilcon A, methafilcon B, narafilcon B, nelfilcon A, nescofilcon A, netrafilcon A, ocufilcon A, ocufilcon B, ocufilcon C, ocufilcon D, ocufilcon E, ocufilcon F, ofilcon A, omafilcon A, phemfilcon, phemfilcon A, polymacon, perfilcon A, samfilcon A, scafilcon A, senofilcon A, sifilcon A, surfilcon A, teflicon, tetrafilcon A, tetrafilcon B, vasurfilcon A, vilfilcon A, and xylofilcon A.

In many embodiments, the cavity may be defined by the interior walls of the lens body.

In many embodiments, the inner cavity providing optical correction may be encapsulated on an anterior side and a posterior side with the contact lens body within an optically used portion of the cavity. The anterior side of the contact lens body may deflect when the contact lens comprises a presbyopia correcting near vision configuration with inflation providing increased optical power of the inner portion of the cavity. The deflection may provide uniform changes in optical power of the inner portion of the cavity.

In many embodiments, the inner cavity providing optical correction may be encapsulated on an anterior side and a posterior side with the contact lens body within an optically used portion of the cavity. The anterior side of the contact lens body may deflect when the contact lens comprises a presbyopia correcting near vision configuration with inflation and may provide increased optical power of the inner portion of the cavity. The deflection may provide uniform changes in optical power of the inner portion of the cavity.

In many embodiments, the contact lens may comprise a multifocal profile with distinct regions of differing optical power. The contact lens may optionally comprise the multifocal profile in a near vision configuration.

In many embodiments, the contact lens may comprise a multifocal profile with a continuously varying region of optical power. The contact lens may optionally comprise the multifocal profile in a near vision configuration.

In many embodiments, the cavity may comprise cross-linked insert material. The cavity may comprise insert material cross-linked to the lens body and extending from the lens body into said cavity. Alternatively or in combination, the cavity may comprise insert material cross-linked to the lens body and extending from a surface of the lens body into said cavity to another surface of the lens body.

In many embodiments, the insert may comprise a UV blocker or absorber to prevent or modify the extent or location of insert cross-linking within the cavity. Alternatively or in combination, the insert may comprise an insert material which does not cross-link under exposure to UV light.

In many embodiments, the cavity may comprise a therapeutic agent. The therapeutic agent may have a half-life within a range of about 1 day to about 7 days. The hydrogel polymer enclosing the cavity may be configured to release liquid containing a therapeutic agent from within the cavity to an exterior of the soft contact lens to provide the therapeutic agent to the eye. Alternatively or in combination, the insert may comprise a therapeutic agent which remains in the cavity after the insert has dissolved. Alternatively or in combination, the cavity may be in equilibrium with an external solution comprising a therapeutic agent such that the cavity comprises said therapeutic agent.

In many embodiments, an amount of therapeutic agent within the cavity may be controlled by concentration, size of the therapeutic agent, molecular weight of the therapeutic agent, temperature, pore size of the lens body, thickness of the posterior side of the lens, or thickness of the anterior side of the lens.

In many embodiments, the posterior side of the lens may comprise a thickness within a range defined between any two of the following values: about 10 microns, about 25 microns, about 50 microns and about 100 microns, and about 200 microns.

In many embodiments, the therapeutic agent may have a molecular weight within a range of about 18 Daltons to about 10 kilodaltons.

In many embodiments, the anterior side of the lens may comprise a thickness within a range of defined between any two of the following values: about 10 microns, about 25 microns, about 50 microns, about 100 microns, about 150 microns, and 200 microns In many embodiments, the cavity may comprise a therapeutic amount of a therapeutic agent. The therapeutic amount may change the refractive index of the cavity within a range of about 0.01 to about 0.02 such that vision is not significantly altered by the presence of the therapeutic agent in the cavity.

In many embodiments, the cavity may comprise a therapeutic agent. The cavity may be located near a posterior lens surface, near an anterior lens surface, or near the center of the lens to control release of the therapeutic agent to the eye. Alternatively or in combination, the cavity may be located outside the optical zone.

In many embodiments, the soft contact lens may comprise a first cavity located within the optical zone of the lens and a second cavity located outside the optical zone. The first cavity may provide optical correction to the lens when deflected. The second cavity may comprise a therapeutic agent and provide the therapeutic agent to the eye through the lens body.

In another aspect a method is provided. The method comprises providing any of the contact lens embodiments described herein. Alternatively or in combination, the method comprises providing any of the erodible insert embodiments described herein.

Incorporation by Reference

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 33A shows a lens comprising a low molecular weight dye prior to incubation in an extraction solution, in accordance with embodiments;

FIG. 33B shows the lens of FIG. 33A after 24 hours incubation in an extraction solution, in accordance with embodiments;

FIG. 34A a lens comprising a low molecular weight dye prior to incubation in an extraction solution, in accordance with embodiments;

FIG. 34B shows the lens of FIG. 34A after 5 hours incubation in an extraction solution, in accordance with embodiments;

FIG. 34C shows the lens of FIG. 34A after 5 hours incubation in an extraction solution, in accordance with embodiments;

FIG. 34D a lens comprising a low molecular weight dye prior to incubation in an extraction solution, in accordance with embodiments;

FIG. 34E shows the lens of FIG. 34D after 5 hours incubation in an extraction solution, in accordance with embodiments;

FIG. 34F shows the lens of FIG. 34D after 5 hours incubation in an extraction solution, in accordance with embodiments;

FIG. 35A shows a sucrose film generated using a cast-free method, in accordance with embodiments;

FIG. 35B shows a sucrose film generated using a cast-free method, in accordance with embodiments;

FIG. 35C shows a free-standing sucrose film generated using a cast-free method, in accordance with embodiments;

FIG. 36A shows the flexibility of a sucrose insert film, in accordance with embodiments;

FIG. 36B shows the flexibility of a glucose insert film, in accordance with embodiments;

FIG. 36C shows the flexibility of an isomalt insert film, in accordance with embodiments;

FIG. 36D shows the results of cavity formation after diffusion of a sucrose insert, in accordance with embodiments;

FIG. 36E shows the results of cavity formation after diffusion of a glucose insert, in accordance with embodiments;

FIG. 36F shows the results of cavity formation after diffusion of an isomalt insert, in accordance with embodiments;

FIGS. 42A-42C show the results of cavity formation with a photo-cleavable insert material, in accordance with embodiments; and FIGS. 43A-43C show the results of cavity formation with a photo-cleavable insert material, in accordance with embodiments.

DETAILED DESCRIPTION

The cavity lenses disclosed herein are well suited for combination with many prior art lenses, such as contact lenses. The cavity lens can be combined with accommodating soft contact lenses or accommodating intraocular lenses, for example.

A soft contact lens comprising a cavity filled with a liquid functions as a dynamic accommodating contact lens that provides the required refractive correction to presbyopes at all distances from far to near. The cavity comprises an optical chamber aligned with the optical center of the lens itself, and a peripheral chamber positioned vertically below the optical chamber and connected to the optical chamber by means of a channel. When fitted on an eye, the optical chamber of the cavity is positioned over the center of the pupil while the peripheral chamber is positioned to interact with the lower eyelid at down-gaze. Pressure from the lower eyelid forces fluid from the peripheral chamber into the optical chamber, causing the cavity to inflate and push out the anterior surface of the contact lens, thus causing its curvature to steepen. Consequently, the center of the lens undergoes an increase in plus power to correct near vision that persists as long as the peripheral chamber of the cavity remains compressed by the lower eyelid. The design and process of fabrication of such a soft contact lens is disclosed herein.

The accommodating soft contact lenses described in the following patent applications are well suited for combination with the cavity contact accommodating contact lenses described herein: WO/2015/095891, entitled "FLUIDIC MODULE FOR ACCOMMODATING SOFT CONTACT LENS", and WO/2014/117173, entitled "ACCOMMODATING SOFT CONTACT LENS", the entire disclosures of which are incorporated herein by reference.

The inventors have designed and fabricated a spherical soft contact lens containing an embedded cavity that functions as an accommodating contact lens. The cavity may have a clearly defined circular optical chamber and a lower peripheral chamber connected to the optical chamber with a channel. The cavity is formed by placing an insert made of an erodible (e.g. photo-decomposable) polymer of appropriate shape and thickness inside a mold cavity used to form the contact lens. The lens is hydrated after being cured. The insert material decomposes into smaller particles in response to irradiation which then dissolve in the hydration medium, typically physiological saline leaving a cavity filled with saline. Preferably, a low expansion polymer is used to form the contact lens, so that the cavity does not change in size as the lens is hydrated. The accommodating contact lens can be configured in many ways, including a monofocal aspheric design, a monofocal, and stabilized lenses for enhanced rotational stability. The present inventors have manufactured lenses and conducted experiments as described herein.

As used herein, "PVA" refers to poly vinyl alcohol.

As used herein, "PVAc" refers to poly vinyl acetate.

Figure 1:
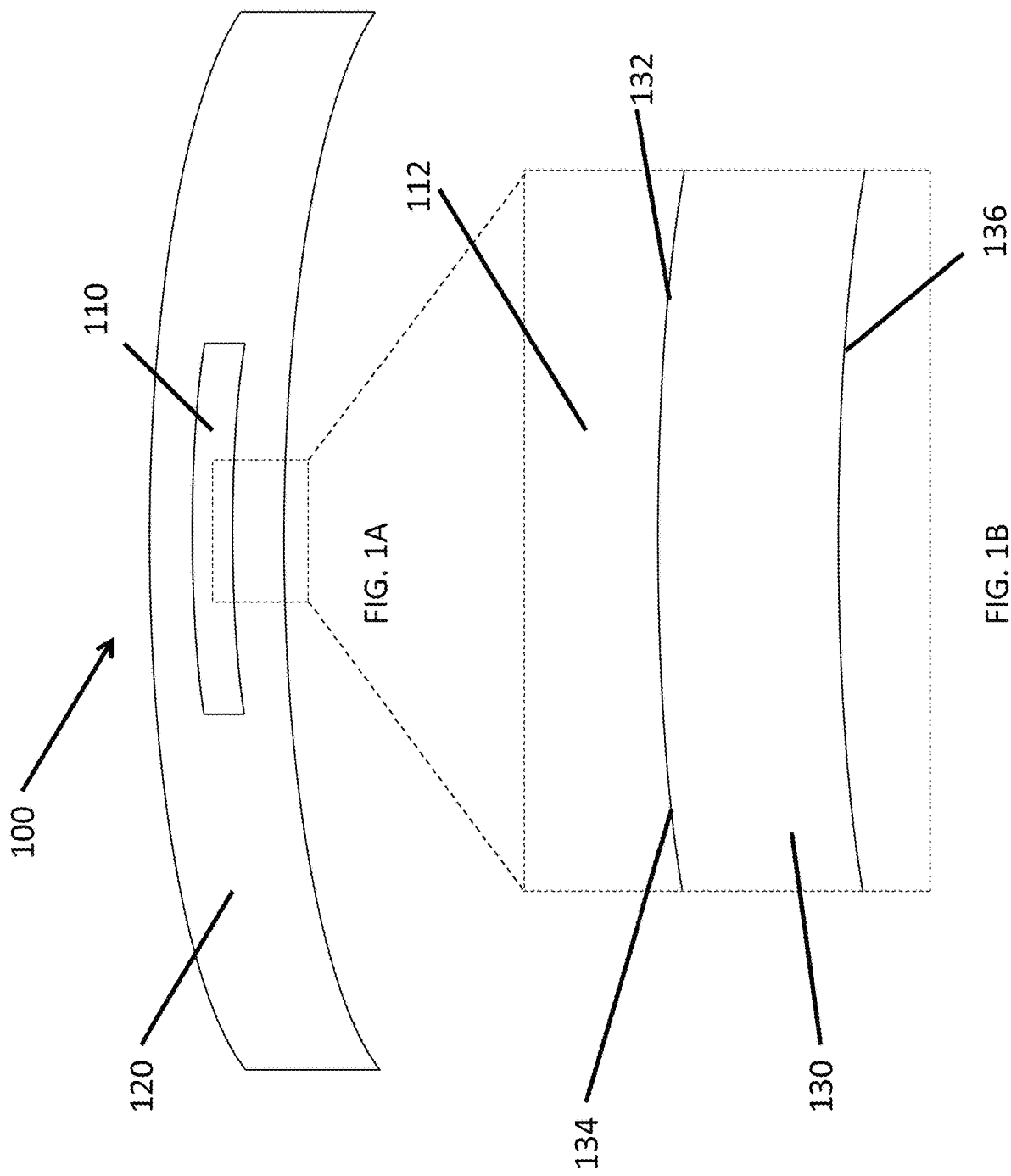
FIG. 1A shows a cross-sectional view of a contact lens comprising an internal cavity, in accordance with embodiments.
FIG. 1B shows an enlarged section of the contact lens as in FIG. 1A, in accordance with embodiments.

FIG. 1A shows a cross-sectional view of a hydrogel contact lens 100 comprising an internal cavity 110. Although a contact lens is shown, the body with the cavity could be many things besides or in addition to the contact lens. Cavity 110 may be formed by the dissolution of a solid material, for example an insert, thereby giving the cavity 110 a shape profile and structure corresponding to that of the dissolved insert. Lens 100 comprises a lens material 120 of sufficient stiffness so as to retain the shape of a dissolvable insert following hydration and insert dissolution. The inner surface of cavity 110 may comprise an optically smooth surface through which light may pass in order to correct vision. Cavity 110 may comprise one or more internal structures formed by dissolving an erodible material. One embodiment of a dissolvable insert is described in greater detail in FIG. 3. The lens cavity 110 may be shaped in numerous ways, as defined by the shaped of the dissolvable insert, allowing for ready fabrication of a cavity 110 within the contact lens 100.

FIG. 1B shows an enlarged section of contact lens 100 depicting cavity 110 with a portion 130 of contact lens body 120. Cavity 110 is filled with a volume of cavity liquid 112, comprising for example residual dissolved insert material or the fluid used to hydrate the lens 100, within a range from about 14 to 54. The residual insert material 112 may have a molecular weight within one or more of many ranges such that the residual insert material 112 is able to diffuse through the polymer of the contact lens body 120. The range of molecular weights can be from about 3 kDaltons (kD) to about 10 kD, and can be from about 3 kD to about 7 kD. The upper contact lens surface 132 which forms the base of cavity 110 comprises exposed polymer 134 in contact with cavity liquid 112. The lower contact lens surface 136 comprises a posterior lens surface which may contact the eye.

Figure 2:
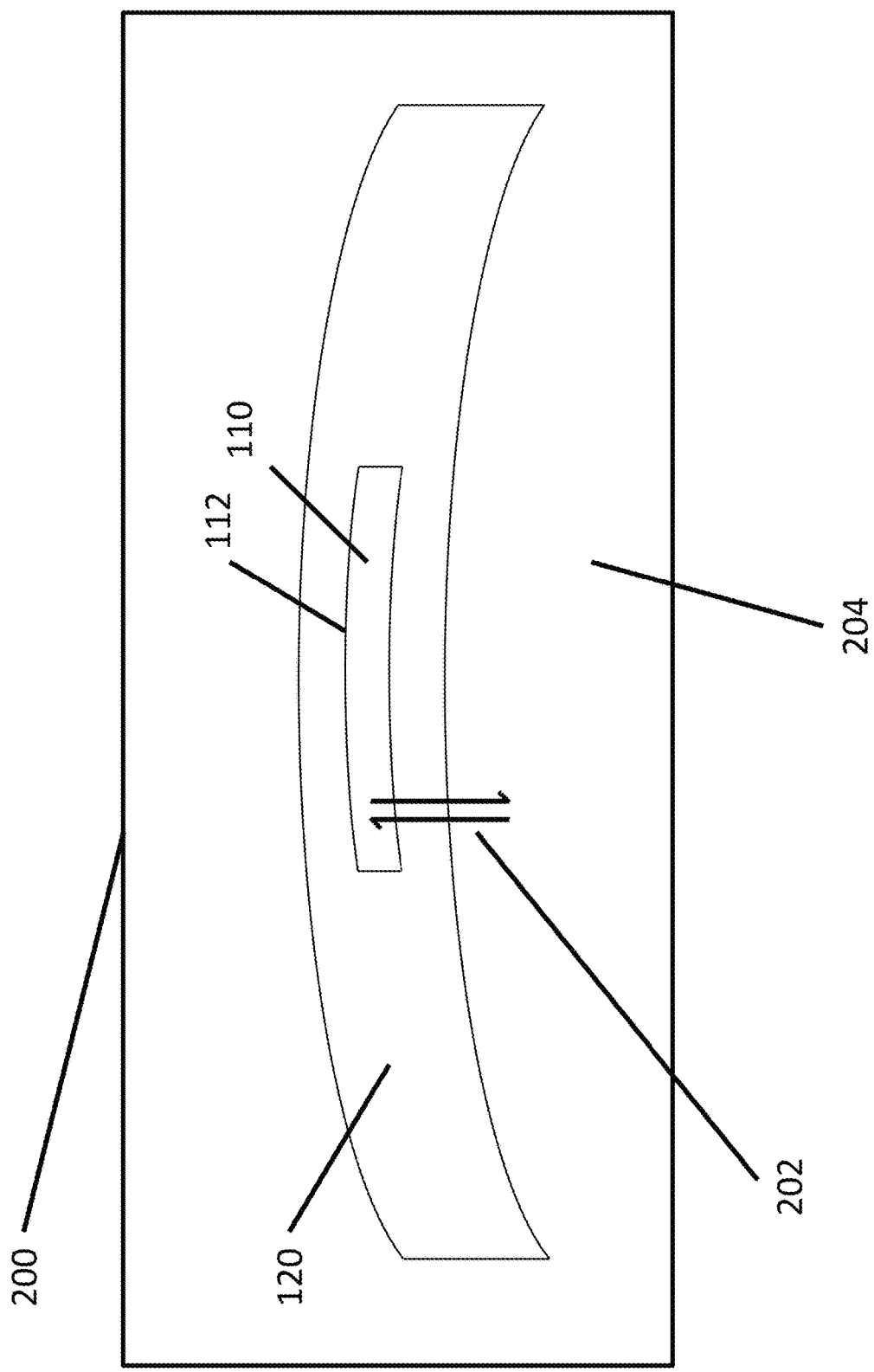
FIG. 2 shows a cross-sectional view of a contact lens in sterile packaging with cavity in equilibrium with the fluid in which the lens in packaged, in accordance with embodiments.

FIG. 2 shows a cross-sectional view of a contact lens 100 in sterile packaging 200 with the cavity 110 in equilibrium 202 with the fluid 204 in which the lens is packaged. The contact lens 100 may be immersed in a sterile fluid 204 within the sterile packaging. Cavity 110 is filled with a liquid 112 and is permeable to the aqueous fluid 204 in which the lens is packaged, such that the cavity 110 is in equilibrium 202 with the fluid 204 outside the lens body 120. At least a portion of the fluid 204 may diffuse into cavity 110. When placed on the eye, the contact lens 100 permeability allows the lens 100 to hydrate the eye with cavity liquid 112.

Figure 3A:
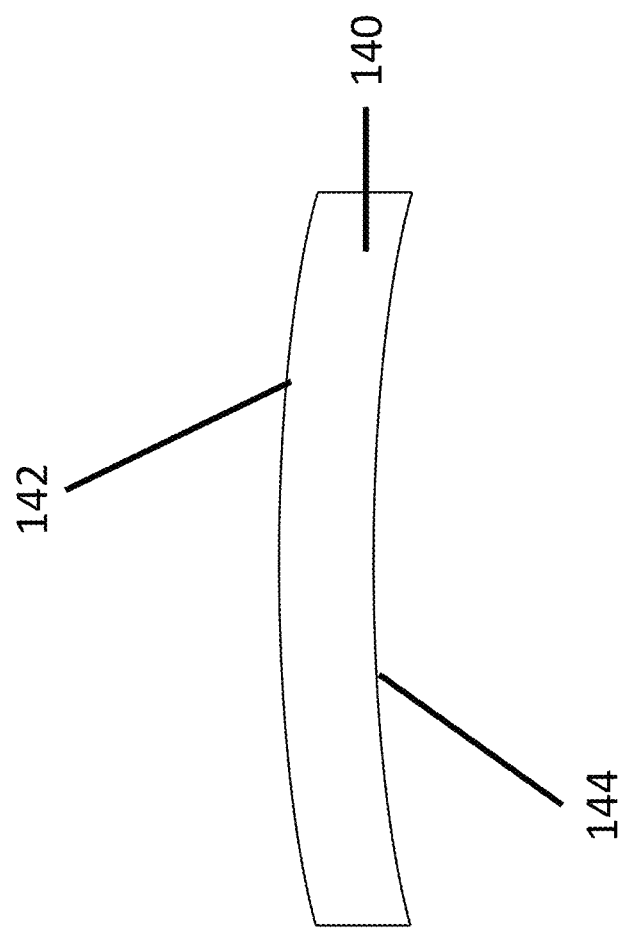
FIG. 3A shows a cross-sectional view of a curved insert comprising a soluble polymer, in accordance with embodiments.
Figure 22B:
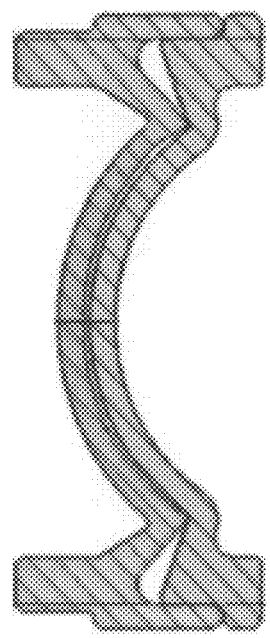
FIGS. 22A-22B show casting cups used to cast an accommodating contact lens, in accordance with embodiments.
Figure 22A:
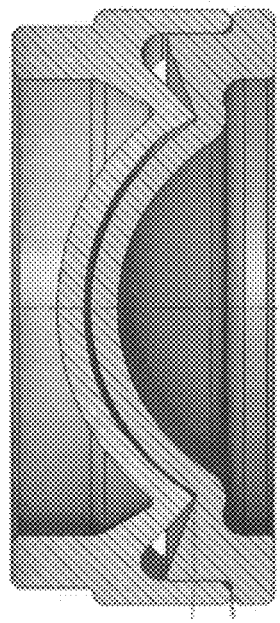

FIG. 3A shows a cross-sectional view of an insert 140 made of a soluble polymer. The insert 140 comprises a three-dimensional shape profile of substantially uniform thickness which, after dissolution, corresponds to the shape of the cavity 110. The insert 140 may comprise a material having a molecular weight of at least 3 kDaltons so as to add sufficient stiffness to the material to retain a given shape at a processing temperature that may range from 10° C. to 45° C. Insert 140 preferably comprises a low expansion polymer, such that hydration of the lens does not alter the size of the cavity 110. The upper surface 142 and lower surface 144 of an insert 140 may also have a curvature corresponding to the curvature of a mold used to define a base curvature of the lens 100. One example of such a mold is shown in FIGS. 22A-22B.

The contact lens material may comprise a low amount of expansion upon hydration. The lens material can be cured in a mold with an insert and then hydrated as described herein. Low expansion hydrogel materials are described in U.S. Provisional Application No. 62/254,048, filed Nov. 11, 2015, entitled "SOFT CONTACT LENS MATERIAL WITH LOW VOLUMETRIC EXPANSION UPON HYDRATION", the entire disclosure of which is incorporated herein by reference.

Figure 3B:
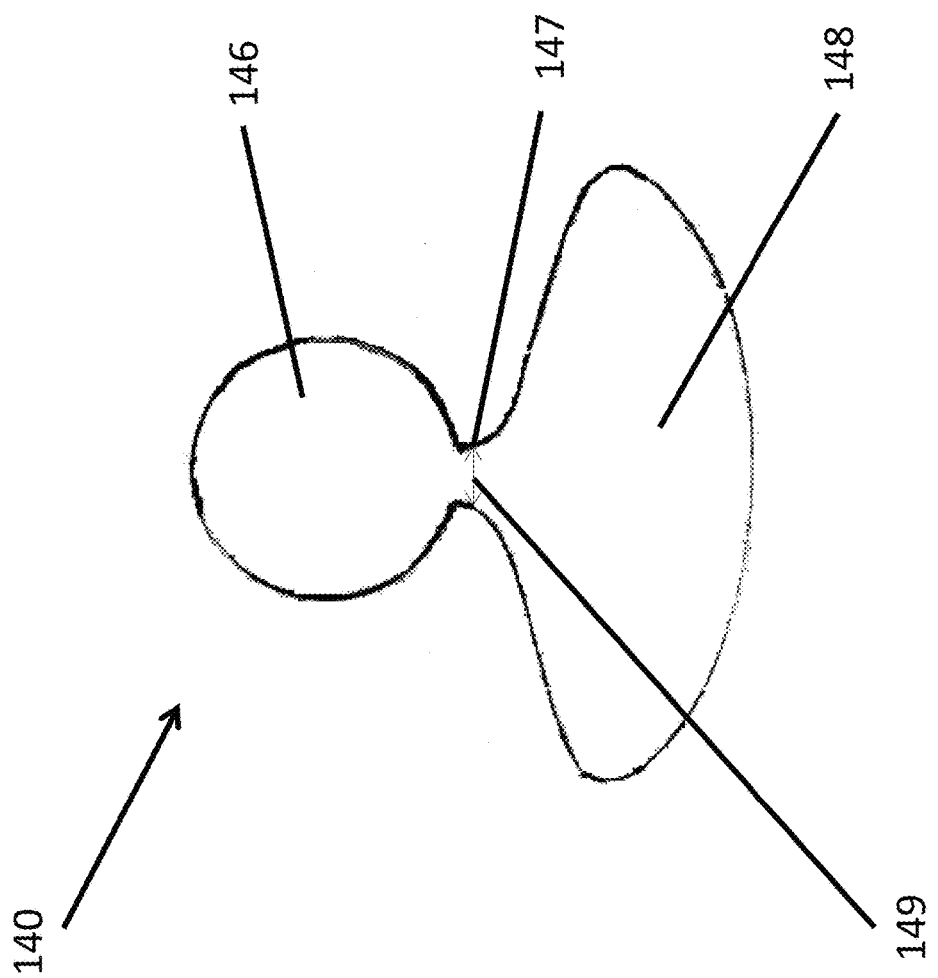
FIG. 3B shows a top view of a curved insert comprising a soluble polymer as in FIG. 3A.

FIG. 3B shows a top view of an insert 140 as in FIG. 3A. Insert 140 may comprise a shape with a portion 146 corresponding to an inner optical chamber of a lens 100, a portion 148 corresponding to a lower chamber of lens 100, and a portion 147 corresponding to a channel extending between the chambers. The diameter 149 of the portion 147 corresponding to said channel may be within a range of about 0.2 mm to 2 mm. When the insert 140 dissolves inside the lens body 120, the resulting cavity 110 can retain the shape profile of the insert 140.

The insert 140 can be sized and shaped in many ways suitable for the application of the body comprising the polymer. The insert may comprise a three dimensional shape profile, for example. The insert 140 can be formed in many ways, for example with three dimensional printing. The three dimensional shape profile may comprise an outer boundary defining the outer boundary of the cavity 110. The shape profile may comprise one or more curved surfaces corresponding to one or more surfaces of the contact lens, for example corresponding to the lower base curvature of the contact lens. The insert can be fabricated in many ways, for example with three dimensional printing of the insert material.

Figure 4:
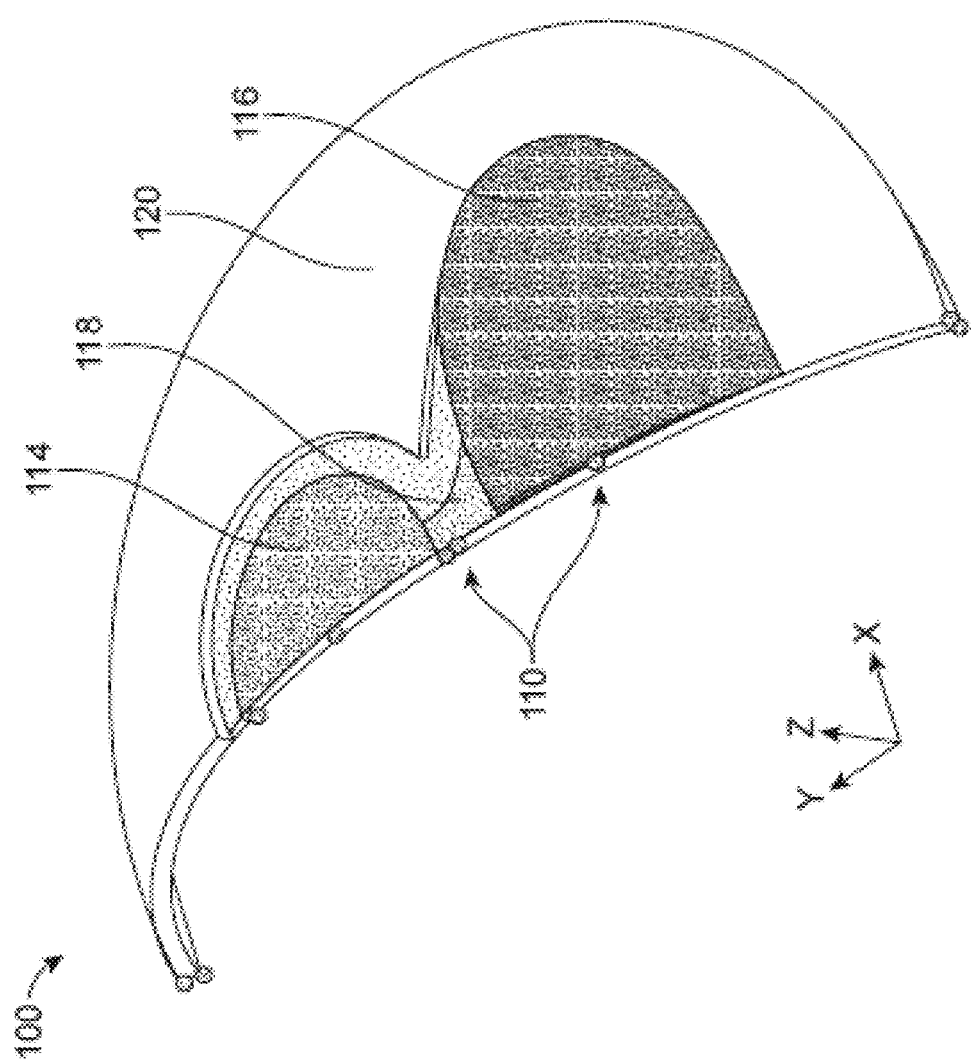
FIG. 4 shows a contact lens cavity following dissolution of insert, in accordance with embodiments.

FIG. 4 shows a contact lens 100 and cavity 110 following dissolution of insert 140. Upon hydration of the contact lens 100, insert 140, which may have a shape profile as depicted in FIG. 3B, dissolves to form a cavity 110 corresponding to the shape of the dissolved insert 140. Diffusion of the dissolved insert material away from the cavity 110 may inhibit osmotic pressure and expansion of cavity 110 as the insert 140 dissolves, such that the structural integrity of the lens body 120 and cavity 110 may be maintained. The insert material can diffuse through the polymer material of the body at a sufficient rate to inhibit a build-up of osmotic pressure that could otherwise compromise the structural integrity of the soft lens material and shape of the resulting cavity.

The cavity 110 may be shaped to correct vision when in equilibrium with tear fluid of the eye. The cavity 110 may comprise an inner optical chamber 114 which corresponds in shape and structure to portion 146 of insert 140, a lower chamber 116 which corresponds to portion 148 of insert 140, and a channel 118 extending there between which corresponds to portion 147 of insert 140. The contact lens 100 may also comprise one or more hinges coupled to inner optical chamber 114 and lower chamber 116. Lower chamber 116 comprises a liquid reservoir in fluid communication with inner optical chamber 114 via channel 118.

Inner optical chamber 114 and lower chamber 116 may be configured in many ways.

Cavity 110 may provide hydration to the eye with release of water, saline, or other fluid through the lens body 120 in order to hydrate the eye.

The lens body 120 may comprise a polymer comprising channels sized to permit diffusion of water between the cavity 110 and outside the lens body and also sized to prevent bacteria from entering the cavity 110 from outside the lens body.

Cavity 110 may comprise a drug to treat the eye which may be released through the lens body 120 including but not limited to timolol.

Figure 5:
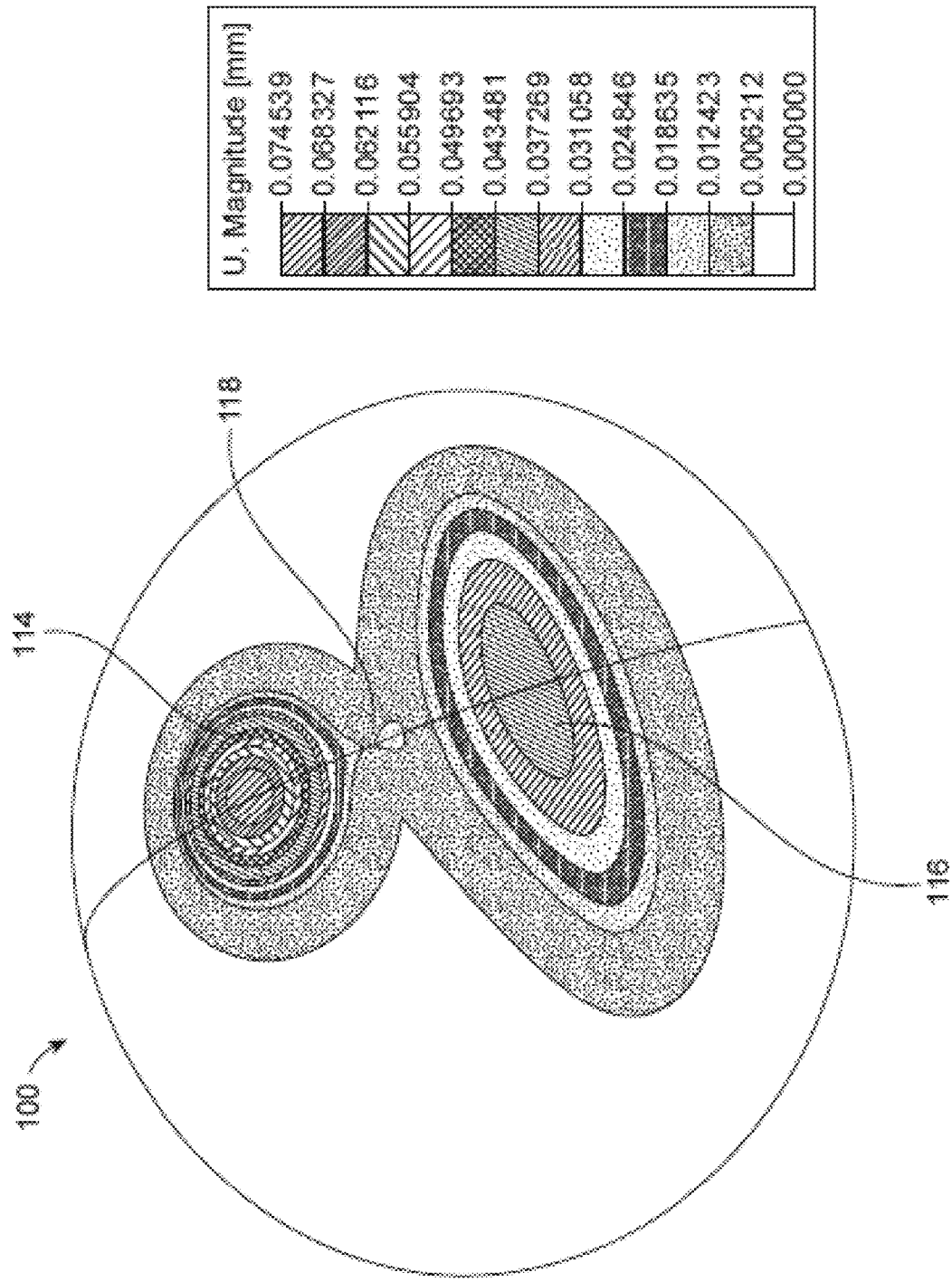
FIG. 5 shows a contour map of a lens due to inflation of the optical chamber of the cavity by simulated action of lower eyelid on the contact lens, in accordance with embodiments.

FIG. 5 shows a contour map of a lens due to inflation of the optical chamber of the cavity by simulated action of lower eyelid on the contact lens. When the lower eyelid engages lower chamber 116, which comprises a liquid reservoir, fluid is passed to inner optical chamber 114, through channel 118, so as to increase the curvature of the inner optical chamber 114 and provide optical power for near vision. The lens 100 may comprise a polymer with a sufficient amount of cross-linking so as to retain fluid in the inner optical portion 114 when the lower portion 116 engages the eyelid to generate additional plus power to correct near vision of the eye upon down gazing at an object. Although the polymer can allow equilibrium, the amount of fluid released from the lens during accommodation is sufficiently low to allow optical correction.

The range of additional power generated may be from about 0.5 D to 6.0 D wherein the down-gaze may be in the range of 10° to 40° and the object being viewed may be at a distance within a range of about 15 cm to 200 cm. The central region of the optical zone above the optical chamber shows in increased height of 75 µm relative to the rest of the lens, which is more than adequate to provide near vision to correct presbyopia with optical power within the range from about 0.5 D to 6.0 D, for example within a range from about 0.5 D to about 3 D.

The fluid 112 of the contact lens body 120 may comprise a refractive index within a range from about 1.31 to about 1.37 (also from about 1.33 to about 1.36). The contact lens body 120 may comprise an index of refraction within a range from about 1.37 to about 1.48 (also from about 1.37 to about 1.45). The refractive index of the contact lens material can be greater than the index of refraction of the fluid within the cavity, for example.

The cavity lens embodiments disclosed herein are well suited for combination with many prior art lenses, including rotationally stabilized contact lenses.

Figure 6:
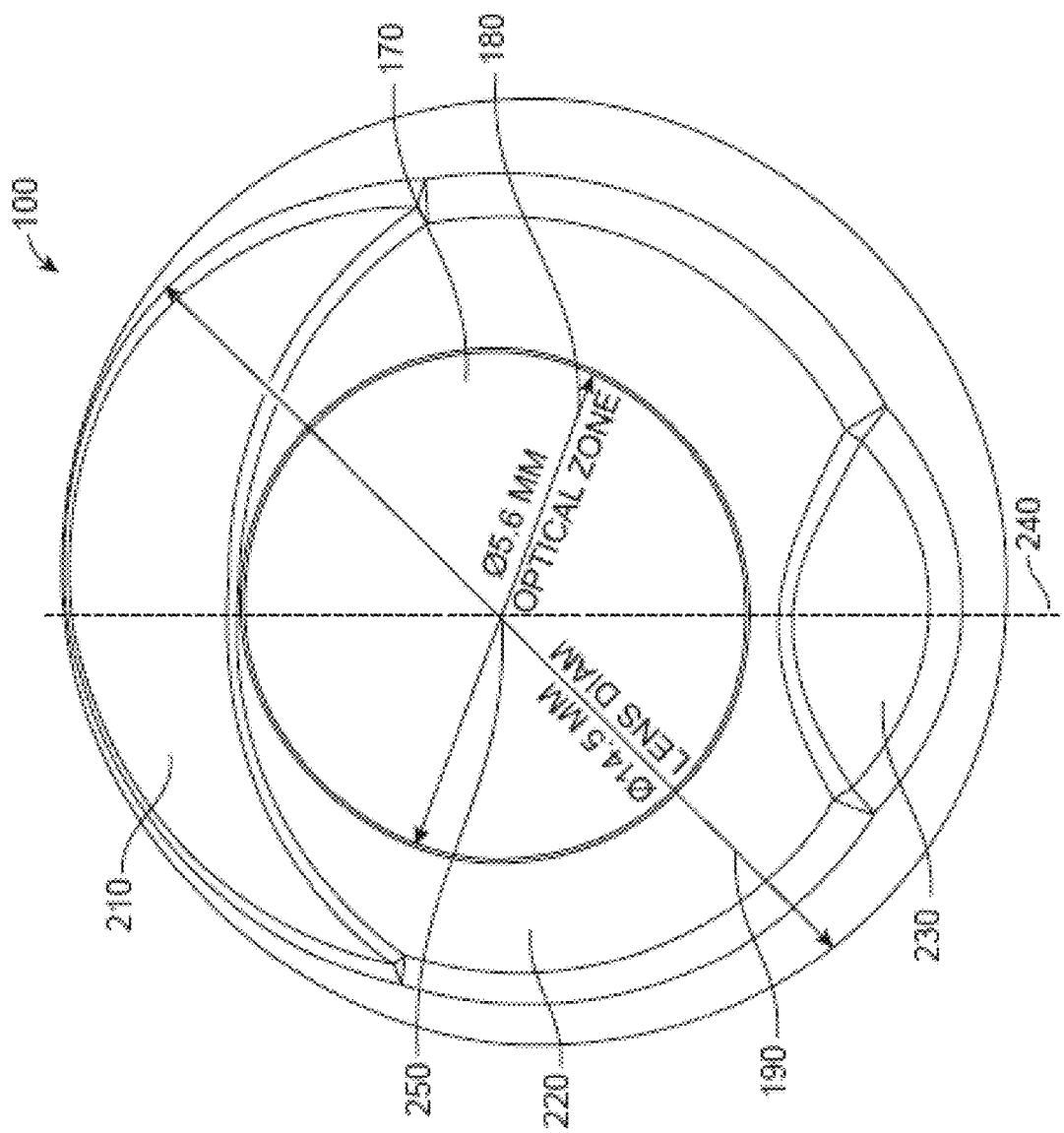
FIG. 6 shows a stabilized contact lens, in accordance with embodiments.

FIG. 6 shows a stabilized contact lens suitable for combination with the cavity lens and insert as described herein. The stabilized lens is described in the following patent applications: U.S. Provisional Application No. 62/254,080, filed Nov. 11, 2015, entitled "ROTATIONALLY STABILIZED CONTACT LENS"; and U.S. Provisional Application No. 62/255,242, filed Nov. 13, 2015, entitled "ROTATIONALLY STABILIZED CONTACT LENS", the full disclosures of which are incorporated herein by reference.

Lens 100 comprises an arrangement of structures to stabilize the lens. An upper stabilization zone 210 is generally located above the optical zone 170. Upper stabilization zone 210 comprises a crescent shape. A lower stabilization zone 220 is located below the upper stabilization zone and extends substantially around the optical zone 170. Lower stabilization zone 220 comprises a generally annular shape and extends around at least about half of the optical zone 170. Lower stabilization zone 220 comprises an upper boundary shaped to fit and correspond to the lower boundary of the upper stabilization zone. The lower stabilization zone 220 comprises a thickness greater than the upper stabilization zone in order to stabilize the lens on the eye.

Lens 100 comprises a pressure sensitive zone 230 coupled to the optical zone 170. Pressure sensitive zone 230 comprises a lenticular shape with a thickness less than the lower stabilization zone 220, in order to couple pressure from the eyelid to a pressure sensitive structure within the pressure sensitive zone. Pressure sensitive zone 230 is generally located between the lower boundary of the lens and the optical zone 170. The lower stabilization zone 220 comprises a lower boundary shaped to fit and correspond to the upper boundary of the pressure sensitive zone 230. Lens 100 comprises a midline 240 extending through a center 250 and corresponding to a 90 degree axis of the lens 100. The stabilizing structures of the lens can be symmetrically disposed about the midline 240.

Optical zone 170 may comprise a pressure sensor or lower chamber fluidic module coupled to the pressure sensing zone 230 as described in International Application No. PCT/US2014/071988, the full disclosure of which is incorporated by reference herein.

Optical zone 170 may comprise an optical fluidic chamber configured to increase curvature in response to eyelid pressure on the pressure sensing zone 230. The pressure sensing zone 230 comprises a fluidic reservoir chamber coupled to the optical chamber with a channel extending there-between to pass fluid to the optical chamber in response to eyelid pressure.

In an alternative embodiment, optical zone 170 may comprise a liquid crystal material between electrodes with the pressure sensing zone 230 comprising a pressure sensor coupled to the electrodes with a circuit to increase optical power of the liquid crystal material in response to eyelid pressure sensed with the pressure sensor.

The optical zone 170 comprises a maximum dimension across, such as a diameter 180 of the optical zone. The lens 100 comprises a maximum dimension across, such as diameter 190.

The upper stabilization zone 210 and lower stabilization zone 220 may each comprise a surface area greater than the pressure sensing zone in order to stabilize the lens.

Figure 7:
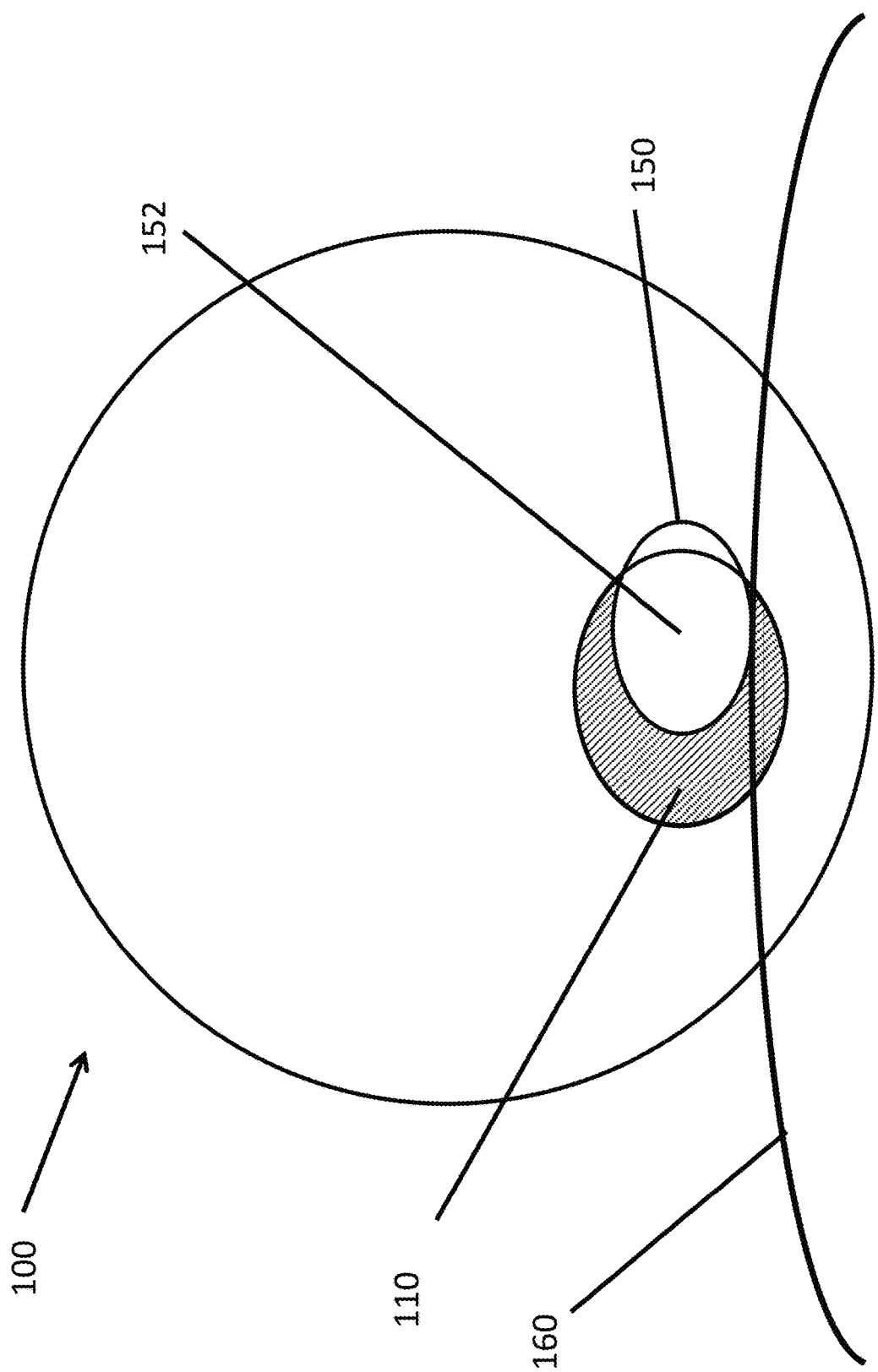
FIG. 7 shows a contact lens comprising a sensor wherein at least a portion of the sensor is located within the cavity, in accordance with embodiments.

FIG. 7 shows a contact lens 100 comprising a sensor 150 wherein at least a portion of the sensor is located within the cavity 110. Cavity 110 may be formed over at least a portion of a sensor 150 embedded within contact lens 100 in order to improve coupling of the sensor 150 to the external environment of the lens, for example tear fluid brought into contact with the contact lens above the active sensor region 152. Movement of the lower eyelid 160 can provide fluid to the external surface of the contact lens near the sensor. Active sensor region 152 may be exposed to the fluid within the cavity of the lens and therefore able to better measure the tear fluid as said active sensor region 152 is not in direct contact with the material of lens 100. The contact lens may comprise the stabilized lens as described herein.

Sensor 150 may comprise one or more of a pressure sensor, a glucose sensor, a biomarker sensor, an electrical sensor, and a sensor having ion specific microelectrodes. The sensor 150 may comprise a volume of no more than about 1.0 mm$^3$, for example.

Figure 8:
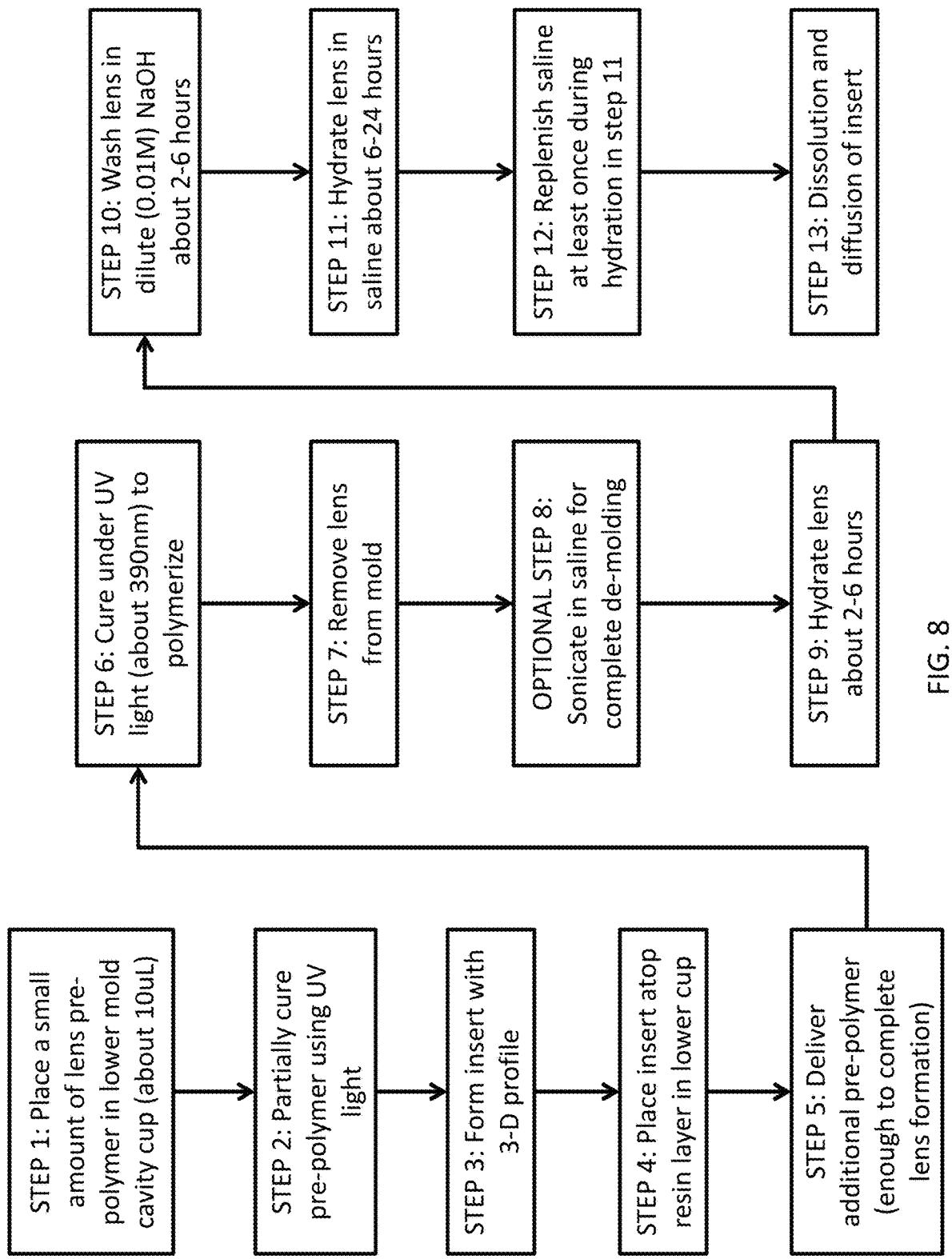
FIG. 8 shows a method of manufacturing a lens comprising a cavity formed by dissolving an insert, in accordance with embodiments.

FIG. 8 shows a method of manufacturing a lens comprising a cavity formed by dissolving an insert, in accordance with embodiments. A base layer of lens material may be generated. A small amount of about 104 of lens pre-polymer may be placed in a lower mold cavity cup (STEP 1) and partially cured (STEP 2) using UV light, or other appropriate curing method as defined by the pre-polymer in use. Next, an insert with a three-dimensional structure, such as insert 140 described herein, may be formed (STEP 3) and placed atop the partially cured resin layer residing in the lower mold cavity cup (STEP 4). Additional pre-polymer may then be delivered to the mold, which may comprise an insert and partially cured resin, in such quantities that there is enough to complete lens formation (STEP 5). The lens may then be fully polymerized by curing under UV light, for example at a wavelength of about 390 nm (STEP 6). The lens may then be removed from the mold (STEP 7), optionally placing the lens and mold in saline and sonicating to facilitate demolding (STEP 8), and hydrated for about 2-6 hours (STEP 9). Following initial hydration, the lens may be washed in dilute NaOH, for example 0.01M (STEP 10), and further hydrated in saline for about 6-24 hours (STEP 11). The saline may be replenished at least once during the hydration of STEP 11 (STEP 12). Upon hydration of the lens, the insert is dissolved in order to form a cavity with the desired shape within the lens body and the dissolved insert material may diffuse out of the lens body (STEP 13).

The method of FIG. 8 shows a method of manufacturing a cavity in a body of a material in accordance with an example. A person of ordinary skill in the art will recognize many variations. The steps can be performed in any order. Some of the steps can be added or removed. Materials used may be altered such that steps may be changed. For example the pre-polymer used to for the lens body may be cross-linked through methods other than photo-polymerization, such as use of catalysts, therefore curing steps may be altered to include such methods.

Turning again to FIG. 5, the inner optical chamber 114 provides an increased elevation contour to the upper surface of the lens in order to provide optical power with fluid from the lower chamber 116. The upper (anterior) surface of the lens 100 has an approximately spherical profile over the optical portion of the lens corresponding to the inner optical chamber 114. The surface elevation increases as shown from about 0.006 mm from the outer portion of the optical zone to about 0.075 mm at the center of the optical zone. A transition zone around the optical zone may comprise an elevation within a range from about 0.000 mm to about 0.006 mm, for example. The lower chamber 116 may also comprise an increased surface elevation profile in relation to other locations of the lens 100. The lower chamber 116 may comprise an elevation within a range from about 0.006 mm to about 0.040 mm as compared to adjacent locations of the lens 100, for example.

While the hydrogel of the contact lens body may comprise one or more of many hydrogel materials, in many embodiments the hydrogel comprises hydroxyethyl methacrylate (HEMA). The hydrogel comprising HEMA may comprise channels or pores sized to allow water to diffuse into and out of the cavity from the exterior of the contact lens body as described herein. The channels of the hydrogel contact lens body may be sized to allow a disinfectant to flow from the cavity chamber to the eye and to inhibit bacteria from entering the chamber from outside the lens body. The amount of cross-linking and cross-link density of the HEMA of the lens body can be configured to provide channels having appropriate sizes to allow water to diffuse in and out of the lens chamber and contain a portion of the solubilized material from the insert within the chamber.

The insert used to form the cavity may comprise one or more of many solid materials as described herein. In many embodiments, the insert material comprises polyvinyl alcohol (PVA), and the polymer chains of PVA may comprise vinyl acetate (VAc) groups interspersed among the vinyl alcohol groups. The co-polymer of PVA and PVAc 260 may be generated by partially hydrolyzing polyvinyl acetate (PVAc) to PVA so as to have a mixture of pendant groups along the polymer chain 262 comprising acetate groups 266 and alcohol groups 264 as shown in FIG. 9B. The insert material may comprise a plurality of such co-polymer chains configured to separate from each other when exposed to water so as to erode the insert. The solid insert material may be composed of PVA and PVAc such that the PVAc is within a range from about 1% to about 20% by weight of the solid insert material and the PVA is within a range from about 99% to about 80% by weight of the solid insert material. Each of a plurality of polymer chain of the insert material may comprise a number of vinyl groups having a number of pendent groups within a range from of about 1000 to about 1500 pendant groups. For example, each of the plurality of polymer chains of the insert material may have about 1000 pendant groups wherein about 10% of the pendant groups comprise PVAc and about 90% of the pendant groups comprise PVA. Each of the plurality of PCA/Ac polymer chains of the insert material may comprise PVAc within a range from about 0.05% to about 10% and PVA within a range from about 90% to about 99.5%. The PVAc pendant groups of each of the polymer chains of the insert material may be randomly interspersed among the PVA pendant groups. Each of the plurality of PVA/Ac chains of the insert material may have a molecular weight within a range from about 50 kilodaltons (kD) to about 150 kD, for example. Each of the plurality of PVA/Ac chains of the insert material may have a molecular weight within a range from about 50 kD to about 100 kD, for example. Each of the plurality of PVA/Ac chains of the insert material may have a molecular weight within a range from about 100 kD to about 110 kD, for example. The PVA/Ac chains may comprise at least about 50% of the erodible insert material, and the amount of PVA/Ac chains within the material can be within a range from about 60% to 99%, for example.

The erodible insert material can be configured in many ways to provide beneficial properties to the material contained within the cavity. The erodible insert material may comprise first polymer chains configured to dissolve and travel through the body of the contact lens and second polymer chains configured to erode from the material and remain within the cavity. The amount of pendent acetate groups disposed along the PVA chains can be related to the solubility of the polymer chains. For example, the insert material may comprise first PVA polymer chains having less than about 10% vinyl acetate along the PVA chain, and second polymer chains having more than about 10% acetate along the PVA chains. The PVA chains having less than about 10% acetate can travel through the channels of the contact lens body, and the PVA chains having more than about 10% acetate can be inhibited from travelling through the contact lens body and remain within the cavity.

Figure 9A:
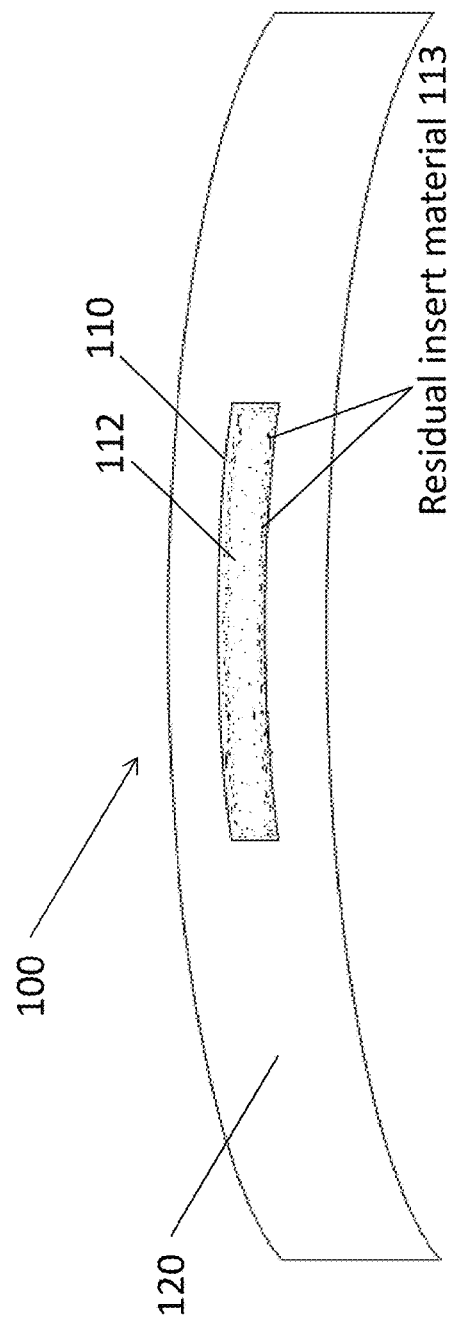
FIG. 9A shows a cross-sectional view of a contact lens comprising an internal cavity comprising residual insert material, in accordance with embodiments.
Figure 9B:
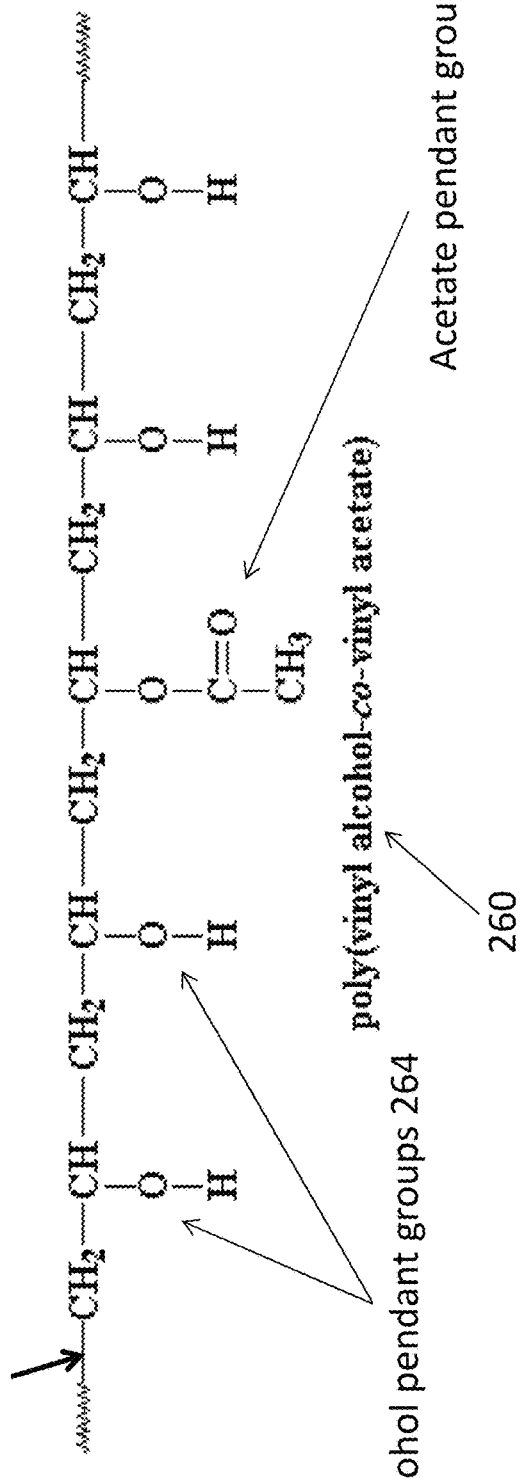
FIG. 9B shows an erodible insert material comprising a copolymer of polyvinyl alcohol and polyvinyl acetate, in accordance with embodiments.

As shown in FIG. 9A, the cavity liquid 112 may comprise residual dissolved insert material 113 as described herein. The residual insert material 113 may for example comprise polymer particles or nanoparticles. The residual dissolved insert material 113 may provide the cavity 110 with a refractive index gradient near the boundary of the cavity 110 to inhibit an abrupt change in the index of refraction and optical artifacts that may be perceptible to a wearer. The refractive index gradient of the cavity 110 may comprise a greater index of refraction near the boundary of the cavity 110 and a lesser index of refraction away from the lens body 120. The refractive index gradient may be formed by adsorption of the residual insert material 113 onto the exposed lens body material 120 defining the cavity 110 or by bonding interactions between the lens body material 120 and the residual insert material 113 for example. The residual insert material 113 may be more densely packed at the boundaries of the cavity 110 than towards the interior of the cavity 110 in order to generate a refractive index gradient.

The refractive index gradient of the cavity may be formed by the creation of one or more bonds, for example cross-linking or hydrogen bonding, between the insert material and the hydrogel lens material. Bonding may occur due to the addition of a cross-linking agent to the insert for example. Alternatively or in combination, the insert material may be configured such that it comprises polymer chains with both hydrophilic and hydrophobic pendant groups on them. The ratio of hydrophilic to hydrophobic groups may determine the solubility of each polymer chain such that increasing amounts of hydrophobic pendant groups decreases the ability of the polymer chain to dissolve. The polymer chains with increased hydrophobic groups, e.g. acetate, may fold on themselves to cover at least a portion of the acetate groups in order to partially dissolve within the cavity. Polymer chains which do not fully dissolve may form partially solubilized polymer particles that remain in the chamber in the liquid contained within the cavity. The polymer particles may be suspended in the cavity liquid. The particles may form a gel or gel-like network or substance within the cavity. These partially solubilized polymer particles may comprise increased amounts of acetate groups as compared with more soluble polymer particles that readily dissolve and travel through the hydrogel contact lens body. These less soluble polymers may comprise insoluble side groups or hydrophobic pendant molecules (e.g. acetate) that inhibit diffusion of the less soluble polymer particles through the hydrophilic lens material in order to provide a portion of the dissolved polymer particles within the chamber. The partially dissolved polymer particles can be adsorbed on an inner surface of the contact lens body defining the lens cavity. Exposed hydrophilic groups such as alcohols located on the partially solubilized polymer particles of insert material may be weakly bonded (e.g. with hydrogen bonds) with exposed hydrophilic side chains of the lens material at the cavity boundary.

Alternatively or in combination, the insert may be configured such that erosion of the insert material generates particles of one or more sizes. Varying the size the particles in relation to the dimensions of the channels of the lens body may alter the diffusion characteristics of the insert material through the lens body. For example, particles with dimensions less than the dimensions of the channels may easily pass through the channels and exit the lens. Particles with dimension greater than the dimensions of the channels may not pass through the channels and may be contained within the cavity. In many embodiments, the insert material erode into a plurality of particles with variable particle sizes such that a portion of the particles may exit the cavity through the channels and a portion of the particles may be contained within the cavity. For example, erosion of an insert material comprising a first polymer and a second polymer may lead to the formation of particles of a first size and particles of a second size, respectively. The particles of the first size may have dimensions less than the dimensions of the channels and thus diffuse out of the cavity. The particles of the second size may be larger than the channels and thus remain within the cavity. The erodible insert material may for example comprise a first water soluble polymer material and a second less soluble or insoluble polymer material. The first water soluble polymer material may have a molecular weight less than the second polymer material such that the second polymer material remains within the cavity formed by dissolution of the first soluble polymer material. The molecular weight of the first polymer may be such that dissolved particles of the first polymer are able to pass through channels in the lens body material and diffuse out of the lens. The molecular weight of the second polymer material may be such that particles of the dissolved or partially dissolved second polymer are inhibited from passing through the channels. The particles remaining in the cavity may form a refractive index gradient as described herein.

The interface of the interior surface of the contact lens body can be configured in many ways to define the provided the graded index having the refractive index gradient extending between the contact lens body and the liquid contained within the cavity. The eroded material from the insert within the chamber from the insert may comprise partially solubilized particles adsorbed to the surface of the contact lens material on the interior surface defining the cavity. The adsorbed particles may comprise polymer particles comprising acetate groups, for example. Alternatively or in combination, the eroded material may comprise water insoluble particles that remain after dissolution of water soluble material. The particles remaining within the chamber can be adsorbed on the interior surface of the contact lens body defining the cavity. The plurality of particles may comprise a maximum dimension across greater than about a quarter of a wavelength of visible light in order to inhibit light scatter from the particles. For example, the plurality of particles may comprise a maximum dimension across of no more than about 150 nm, and the maximum dimension across can be within a range from about 5 nm to about 150 nm. Alternatively or in combination, the maximum distance across can be within a range from about 10 nm to about 100 nm, for example. The particles within these ranges can increase the index of refraction with acceptable amounts of light scatter that are not perceivable by the wearer.

Alternatively or in combination, the gradient refractive index can be provided by polymer side chains extending from the lens body into the cavity. The lens material may for example comprise HEMA. Hydrophilic side groups or chains on the HEMA may prevent the hydrophobic acetate side chains of the solubilized polymer from diffusing out the cavity. Hydrophilic pendant groups on the polymer, for example PVA groups on a PVA-co-PVAc (PVA/Ac) polymer insert material, may hydrophilically bond with the HEMA at the cavity-lens body interface to provide a refractive index gradient as described herein. The partially solubilized material within the chamber from the insert when the lens is worn may comprise no more than about 10% by weight of the material within the chamber, for example.

The partially solubilized material within the cavity may comprise an amount sufficient to provide an osmolality of the cavity. The cavity liquid may comprise an osmolality within a range from about 200 milliosmoles per liter (mOsmol/L) to about 290 mOsmol/L, for example within a range from about 250 mOsmol/L to about 290 mOsmol/L.

Figure 10:
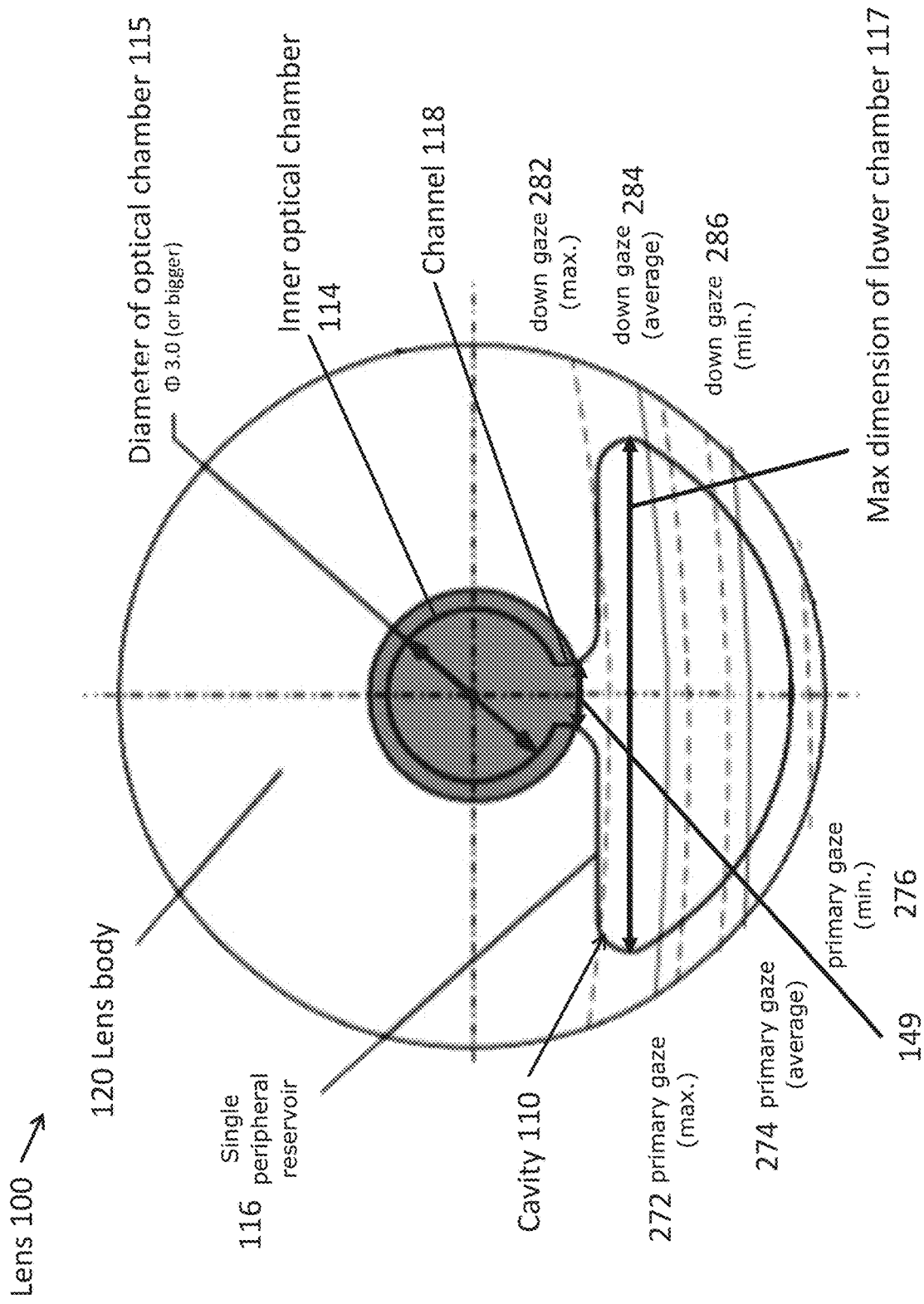
FIG. 10 shows a contact lens with a single peripheral reservoir, in accordance with embodiments.

FIG. 10 shows a contact lens 100 with a single outer reservoir 116. The cavity 110 may be similarly shaped as described herein so as to comprise an inner optical chamber 114, a channel 118, and a peripheral reservoir 116. The cavity 110 may be formed by dissolving, eroding, degrading, photo-degrading, or otherwise solubilizing an insert as described herein such that the shape of the cavity 110 corresponds to the shape of the insert. The insert may comprise an erodible (for example photo-decomposable) material shaped to have front and back surfaces each having curvature corresponding to one or more surface of the contact lens 100. The cavity 110 may be formed between anterior and posterior surfaces of the lens body 120. The cavity 110 may be shaped to add negative optical power to the contact lens when light is refracted in a far vision configuration. The anterior and posterior surfaces of the lens body 120 may each comprise a radius of curvature about the cavity 110 to provide far vision correction when combined with the negative power of the cavity 110.

The insert may comprise a circular region which defines the inner optical chamber 114 upon dissolving. The insert may comprise an outer region which defines the peripheral reservoir 116. The insert may comprise an extension between the circular region and the outer region which defines the channel 118. The inner optical chamber 114 may comprise a diameter 115 which corresponds to the diameter of a circular region of the insert. The channel 118 may comprise a maximum dimension across 149 which corresponds to the maximum dimension across the extension of the insert. The maximum dimension across 149 of the channel 118 may be less than the diameter 115 of the inner optical chamber 114; therefore, the maximum dimension across the extension may be less than the diameter of the circular region of the insert. The lower chamber 116 may comprise a maximum dimension across 117 which corresponds to the maximum dimension across the outer region of the insert. The maximum dimension across 117 of the lower chamber 116 may be greater than the maximum dimension 149 of the channel 118, and the maximum dimension across of the outer region may be greater than the maximum dimension of the extension.

The insert may comprise an optically smooth surface such that the formed cavity 110 comprises optically smooth inner anterior and posterior surfaces so as to allow vision correction as described herein. The erodible lens insert may comprise an RMS roughness of no more than about 50 nm for example. The RMS roughness of the insert can be greater, depending on the difference between the difference between the index of refraction of the liquid contained in the cavity and the index of refraction of the lens body. The RMS roughness of the insert can be within a range from about 5 nm to about 1000 nm, for example within a range from about 10 nm to about 500 nm. The inner surface of the cavity may be defined by an upper and a lower portion of the lens body extending across the optically used portion of the lens, and these surfaces may have RMS roughness similar to the insert. The inner surface of the cavity may have a surface roughness RMS value of about 50 nm or less in order to provide clarity and allow for vision correction, for example.

The insert may have a tapered edge so as to reduce astigmatism, prism, or other aberrations that may be related to an abrupt change in refractive index near the boundary of the cavity 110 formed in the lens material 120.

Inflation of the optical chamber 114 of the cavity 110 may occur by action of lower eyelid on the contact lens during down gaze as described herein. When the lower eyelid engages the lower chamber 116 during down gaze, fluid is passed to inner optical chamber 114, through channel 118, so as to increase the curvature of the inner optical chamber 114 and provide optical power for near vision. The curvature of the inner optical chamber 114 may be reduced again upon returning to a primary gaze for far vision. FIG. 10 shows various locations which the lower eyelid may rest on the peripheral chamber 116 during down gaze (shown in dashed lines) or primary gaze (shown in solid lines). The lower eyelid may engage the peripheral chamber 116 during primary gaze to varying degrees. For example, during a minimum primary gaze 276 the lower eyelid may not engage the peripheral chamber 116 at all. An average primary gaze 274 may result in the lower eyelid contacting a lower portion of the peripheral chamber 116. A maximum primary gaze 272 may result in the lower eyelid contacting about half of the peripheral chamber 116. The transition to down gaze may have similar variations, with a minimum down gaze 286 engaging a lower portion of the chamber 116, an average down gaze 284 engaging about half of the chamber 116, and a maximum down gaze 282 engaging all or nearly all of chamber 116. The transition between primary gaze and down gaze, and the corresponding change in lower eyelid position, forces fluid from the peripheral reservoir 116 into the inner optical chamber 114 where it may provide increased optical power for near vision.

The cavity 110 may comprise a different index of refraction (also referred to herein as a refractive index) than the hydrogel material of the lens body 120 surrounding the cavity 110 as described herein. The refractive index of the cavity may be different by at least about 0.10 from the refractive index of the material of the lens body 120. The refractive index of the cavity may for example be different by at least about 0.05 from the refractive index of the material of the lens body 120. The refractive index of the cavity may for example be different by at least about 0.03 from the refractive index of the material of the lens body 120. The difference in the refractive indices of the cavity 110 and the lens body 120 may provide optical power to the inner optical chamber 114.

The cavity 110 may comprise a similar index of refraction as the hydrogel material of the lens body 120. The refractive index of the cavity may be within about 0.10 of the refractive index of the lens body material 120. The refractive index of the cavity may for example be within about 0.05 of the refractive index of the lens body material 120. The refractive index of the cavity may for example be within about 0.03 of the refractive index of the lens body material 120.

Figure 11:
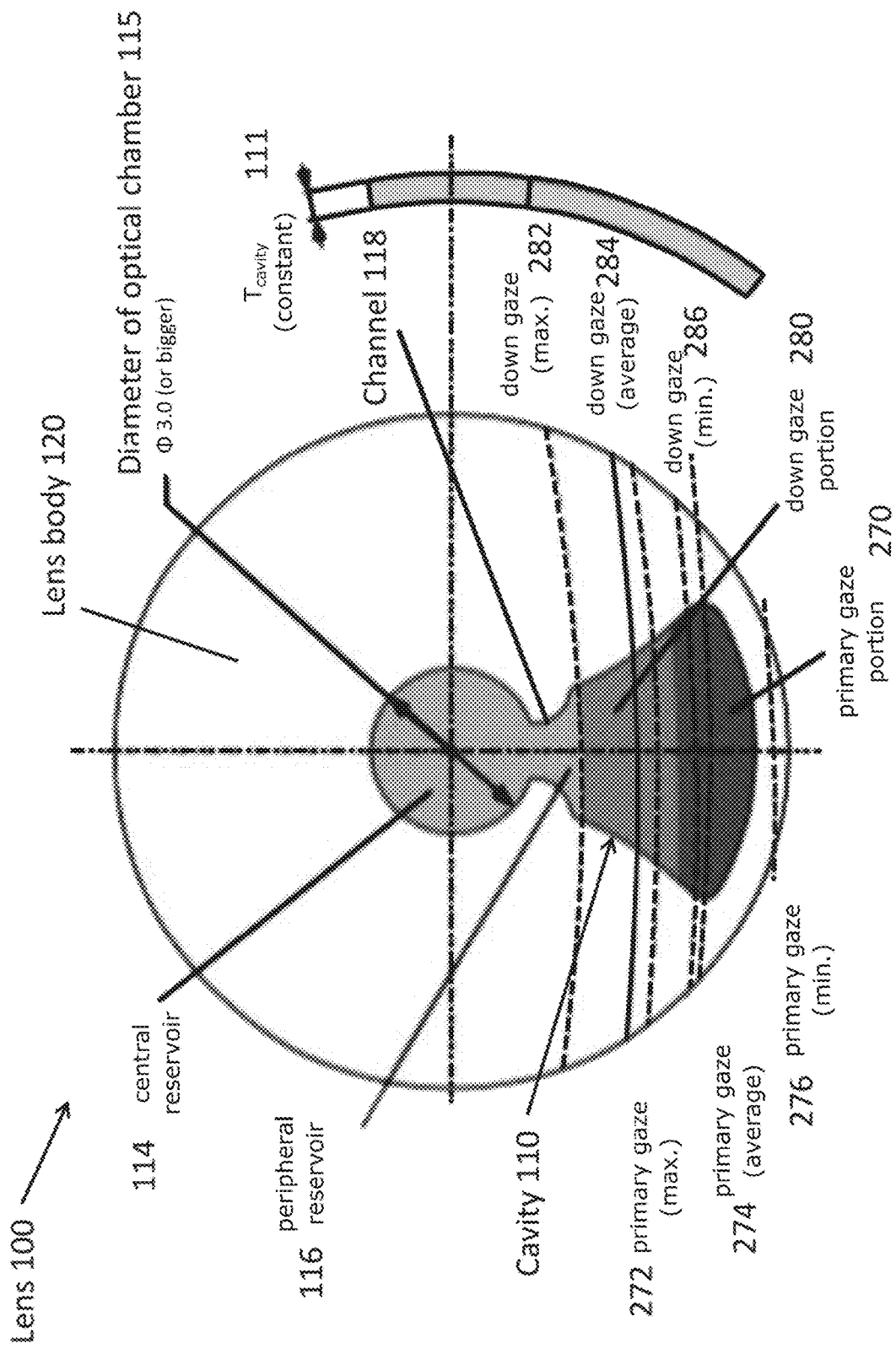
FIG. 11 shows a contact lens with a progressive peripheral reservoir, in accordance with embodiments.

FIG. 11 shows a contact lens 100 with a progressive peripheral reservoir 116. The cavity 110 may be formed as described herein. Similar to the embodiment shown in FIG. 10, the cavity 110 may comprise an inner optical chamber or central reservoir 114, a peripheral reservoir or lower chamber 116, and a channel 118 extending there between. The thickness 111 of the cavity 110 may be constant such that the thickness of the inner optical chamber 114 and the thickness of the peripheral reservoir 116 are about the same when the peripheral reservoir 116 is not engaged by the lower eyelid. The peripheral reservoir 116 may further comprise a primary gaze portion 270 configured to be engaged by the lower eyelid during far vision and a down gaze portion 280 configured to be engaged by the lower eyelid during near vision. Compression of the primary gaze portion 270 may provide an intermediate amount of optical power change to the central reservoir 114 when the eye is between a maximum primary gaze 272 (for example when staring straight ahead into the distance) and a minimum primary gaze 276 (for example when glancing at something low to the ground at a distance). As the gaze continues down and moves nearer, more of the peripheral reservoir 116 may be engaged, including the down gaze portion 280, so as to further increase optical power in the inner optical portion 114. A measured amount of fluid may be contained within the portions of the peripheral reservoir 116 so as to provide calculated responses of the lens 100 to the needs of the wearer. In this way, the lens 100 may provide a range of optical powers suited to multiple eye positions similar to the way progressive lenses in glasses function.

Figure 12:
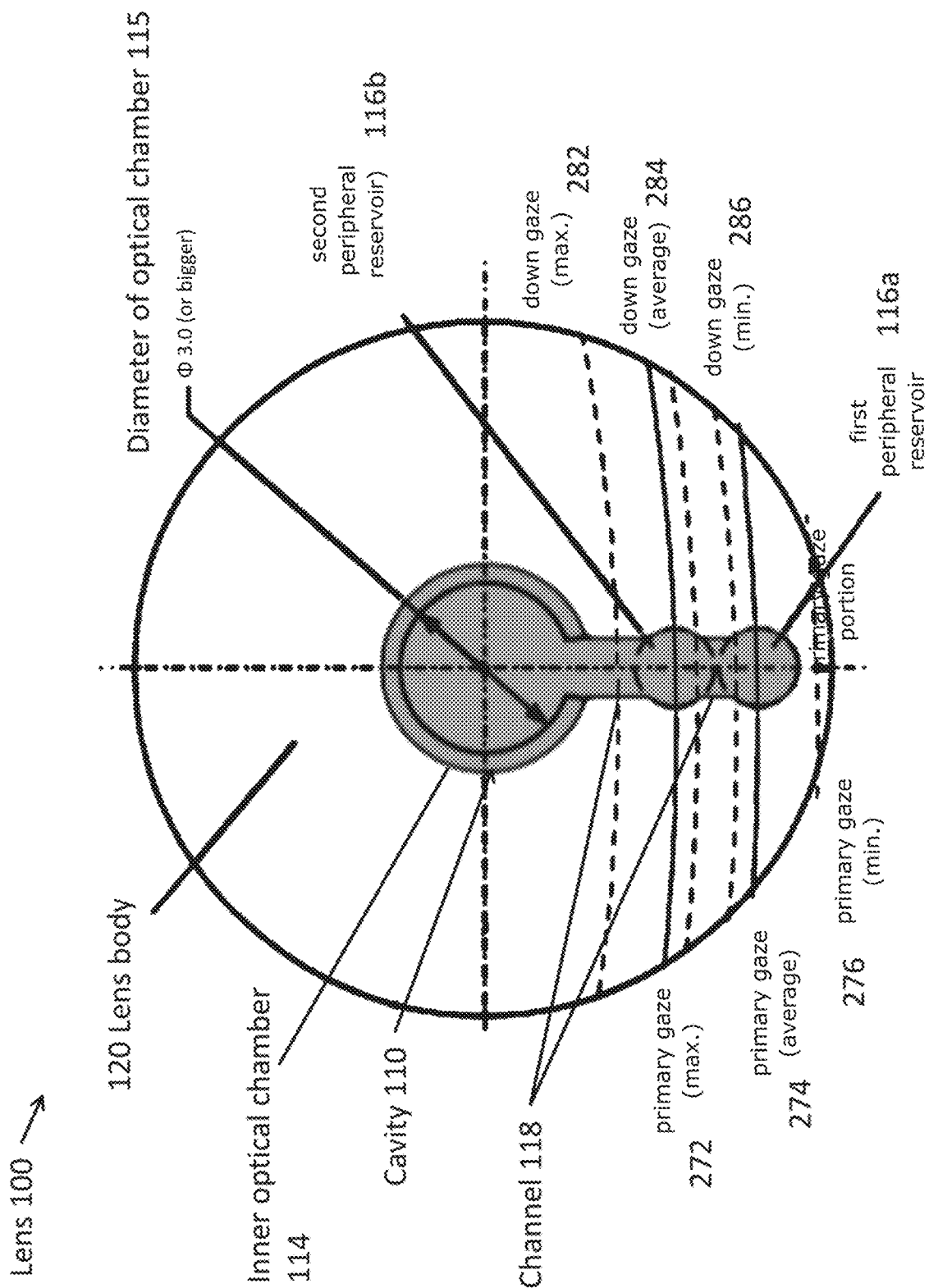
FIG. 12 shows a contact lens with two peripheral reservoirs, in accordance with embodiments.

FIG. 12 shows a contact lens 100 with two peripheral reservoirs 116a, 116b. The cavity 110 may be formed as described herein. The cavity 110 may comprise an inner optical chamber 114, a first outer chamber or peripheral reservoir 116a, a second outer chamber or peripheral reservoir 116b, and one or more channels 118 extending therebetween. The first outer chamber 116a may be located inferior to the inner optical chamber 114. The second outer chamber 116*b* may be located inferior to the inner optical chamber 114. The first outer chamber 116*a* may be located inferior to the second outer chamber 116*b*. The first and second outer chambers 116*a*, 116*b* may each comprise an amount of fluid to provide near vision correction. Engagement of the first outer chamber 116*a* by the lower eyelid may provide a first about of fluid to the inner optical chamber 114 and provide intermediate vision correction. As the gaze is directed further down, the second outer chamber 116*b* may also be engaged by the lower eyelid and the fluid of the second outer chamber 116*b* may be combined with the fluid from the first outer chamber 116*a* and provide near vision correction to the inner optical chamber 114 of the lens 100. The amount of fluid in each outer chamber 116*a*, 116*b* may be measured to as to have the desired amount of intermediate and near vision correction. For example, the amount of fluid in the first peripheral reservoir 116*a* may be such that it provides 1 D of increased optical power to the inner optical chamber 114 when compressed for intermediate vision. The fluid in the second peripheral reservoir 116*b* may have enough fluid to provide an additional 1 D of increased optical power, thus when both the first outer chamber 116*a* and second outer chamber 116*b* are compressed the inner optical chamber 114 is provided 2 D of total increased optical power for far vision.

The cavity 110 of any of the embodiments described herein may comprise a fluid in equilibrium with an outside liquid. For example, the cavity fluid may comprise one or more of water, saline, or tear fluid. Water and other fluids may diffuse in and out of the contact lens body 120 to the cavity 110 from an external surface of the contact lens body 120. The cavity 110 may be in equilibrium with the tear fluid of the eye when placed on the eye of a wearer. For example, the liquid contained within the cavity may be at least partially released by the hydrogel lens body 120 onto the eye, for example to provide hydration. The liquid released by the cavity may be replaced with tear fluid. The cavity may for example comprise a porous cavity.

The peripheral reservoir can be configured in many ways when connected to the inner optical chamber in order to provide accommodation. In many instances, the upper lid may contribute to accommodation of the lens. The upper lid may engage the fluid-filled cavity during down-gaze or squinting, thereby compressing the cavity and altering the shape of at least the inner optical chamber in order to alter the optical power as described herein. The peripheral chamber may be connected to the inner optical chamber and sized and shaped in many ways, for example with an annular peripheral chamber extending around the inner optical chamber. Alternatively or in combination, the upper lid may engage an upper reservoir disposed above the inner optical chamber of the cavity. The peripheral reservoir described herein may be an upper reservoir or a lower reservoir as desired by one of ordinary skill in the art in order to provide accommodation as described herein. The upper reservoir may be coupled to the inner optical chamber by an upper channel to allow fluid to flow between the upper reservoir and the inner optical chamber. The cavity may comprise any combination of an inner optical chamber, an upper reservoir, and a lower reservoir. The cavity may for example comprise an inner optical chamber coupled to an upper reservoir by an upper channel and a lower reservoir by a channel as described herein. The cavity may alternatively comprise an inner optical chamber and an upper reservoir without a lower reservoir. Engagement of the upper reservoir with the upper eyelid may function to adjust the optical power of the lens in a near vision configuration or far vision configuration in a manner substantially similar to that of the lower reservoir described herein.

As described herein, the insert may be configured such that erosion of the insert material generates particles of one or more sizes. The particles may be sized such that they may easily pass through the one or more channels of the lens body and exit the lens. The particles may have dimensions less than the dimensions of the channels. The one or more channels may facilitate removal of the insert material. In some instances, there may be no residual insert material left in the cavity following erosion of the insert.

The lens material may be configured (e.g. with one or more channels as described herein) such that particles or molecules (e.g. insert material or therapeutic agents) with a radius of gyration within a pre-determined range may diffuse through the lens material (e.g. polymer) of the lens body. The radius of gyration of a molecule able to diffuse through the polymer may be within a range of about 0 nm to about 100 nm, for example no more than about 50 nm, or no more than about 15 nm. The radius of gyration may be within a range defined between any two of the following values: 0 nm, 5 nm, 10 nm, 15 nm, 20 nm, 25 nm, 30 nm, 40 nm, 50 nm, 60 nm, 70 nm, 80 nm, 90 nm, and 100 nm.

The cavity may comprise a therapeutic agent. The therapeutic may be released by the cavity to the eye as described herein. The therapeutic agent may be selected from a group consisting of: anti-infectives, including, without limitation, antibiotics, antivirals, and antifungals; antiallergenic agents and mast cell stabilizers; steroidal and non-steroidal anti-inflammatory agents; cyclooxygenase inhibitors, including, without limitation, Cox I and Cox II inhibitors; combinations of anti-infective and anti-inflammatory agents; decongestants; anti-glaucoma agents, including, without limitation, adrenergics, ($\beta$-adrenergic blocking agents, $\alpha$-adrenergic agonists, parasypathomimetic agents, cholinesterase inhibitors, carbonic anhydrase inhibitors, and prostaglandins; combinations of anti-glaucoma agents; antioxidants; nutritional supplements; drugs for the treatment of cystoid macular edema including, without limitation, non-steroidal anti-inflammatory agents; drugs for the treatment of ARMD, including, without limitation, angiogenesis inhibitors and nutritional supplements; drugs for the treatment of herpetic infections and CMV ocular infections; drugs for the treatment of proliferative vitreoretinopathy including, without limitation, antimetabolites and fibrinolytics; wound modulating agents, including, without limitation, growth factors; antimetabolites; neuroprotective drugs, including, without limitation, eliprodil; and angiostatic steroids for the treatment of diseases or conditions of posterior segment, including, without limitation, ARMD, CNV, retinopathies, retinitis, uveitis, macular edema, and glaucoma.

The therapeutic agent may have a molecular weight within a range of about 18 Daltons to about 10 kD. The therapeutic agent may have a molecular weight within a range defined between any of the two following values: 10 Daltons, 20 Daltons, 50 Daltons, 100 Daltons, 200 Daltons, 500 Daltons, 1 kD, 2 kD, 3 kD, 4 kD, 5 kD, 6 kD, 7 kD, 8 kD, 9 kD, and 10 kD.

The cavity contact lens as described herein can be configured to provide changes in optical power of at least +2 Diopters (D), for example at least +3 D, in response to low amounts of increases in pressure, in order to allow the contact lens to change shape to correct presbyopia in response to eyelid contact. The amount of internal pressure to increase the optical power by at least +2 D, can be within a range from about 10 Pascals (Pa) to about 100 Pa, for example within a range from about 20 Pa to about 50 Pa. The thickness of the anterior and posterior lens portions defining the cavity can be sized as described herein to increase or decrease the amount of deflection in the lens in response to internal pressure generated by the eyelid. The modulus of the contact lens material can be increased or decreased to change the amount of pressure increase to provide the correction. The modulus of the hydrogel contact lens material as described herein and can be within a range from about 0.2 MPa to about 4 MPa, for example within a range from about 0.25 MPa to about 2 MPa. In many instances, the modulus is related to the equilibrium water content, and the modulus can be decreased with increasing amounts of hydration as described herein. The equilibrium water content can be within a range from about 25% to about 80%, for example within a range from about 30% to about 70% and within a range from about 40% to about 65%. The volume of cavity can be within a range from about 0.25 mm$^3$ to about 10 mm$^3$, for example within a range from about 0.5 mm$^3$ to about 5 mm$^3$ The internal pressure of the cavity can be measured by inserting a needle into the cavity and measuring the pressure with a manometer, for example, and other methods of measuring pressure known to one of ordinary skill in the art.

Table A lists examples of hydrogel materials, equilibrium water content, and moduli.

TABLE A

| Material | Equilibrium Water Content (%) | Modulus (MPa) | Oxygen Permeability (Dk × 10-11 |
| --- | --- | --- | --- |
| Lotrafilcon A | 24 | 1.5 | 140 |
| Lotrafilcon B | 36 | 1.0 | 110 |
| Balafilcon A | 33 | 1.1 | 99 |
| Comfilcon A | 48 | 0.8 | 128 |
| Senofilcon A | 38 | 0.72 | 103 |
| pHEMA | 38 | 0.50 | 7.5 |
| Omafilcon A | 62 | 0.49 | 34 |
| Galyfilcon A | 47 | 0.43 | 60 |
| Etafilcon A | 58 | 0.3 | 21 |

Although Table A is provided as an example, other materials as described herein can be configured to have moduli and amounts of hydration as described herein.

Figure 13A:
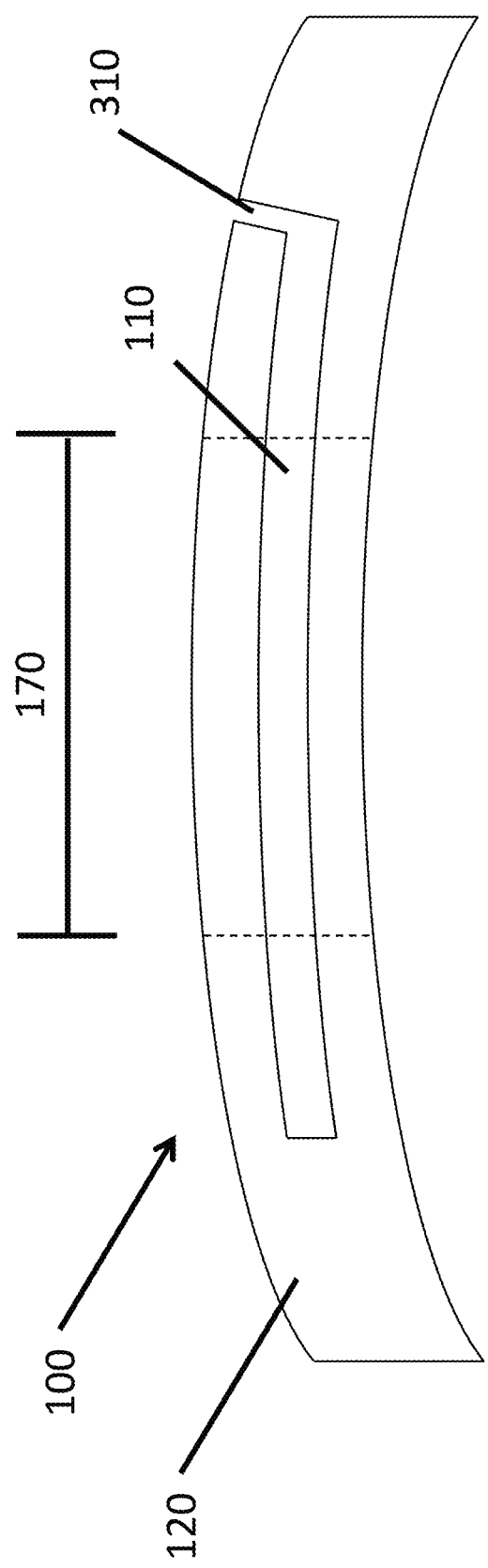
FIG. 13A shows a cross-sectional view of a contact lens comprising an internal cavity and hole, in accordance with embodiments.
Figure 13B:
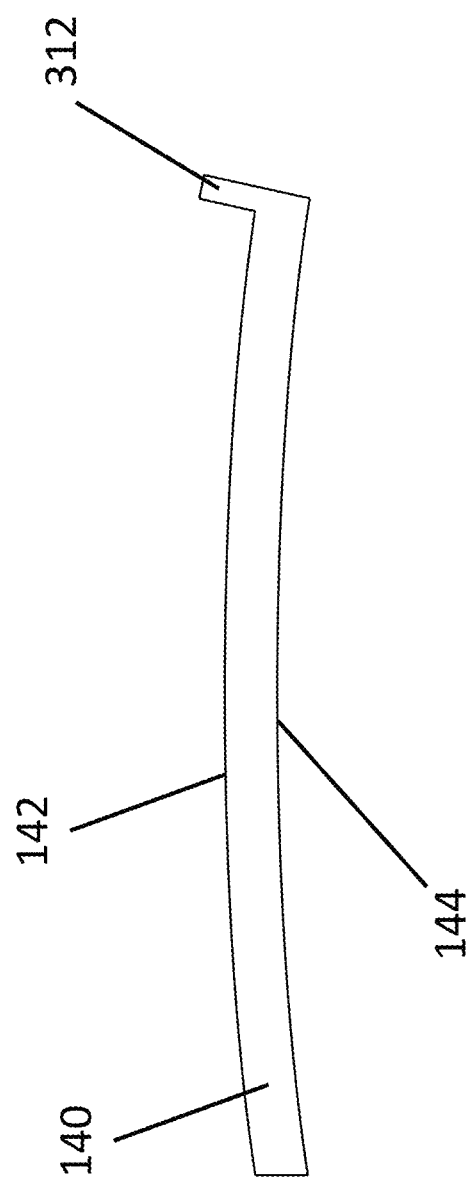
FIG. 13B shows a cross-sectional view of an insert comprising a protrusion, in accordance with embodiments.
Figure 13C:
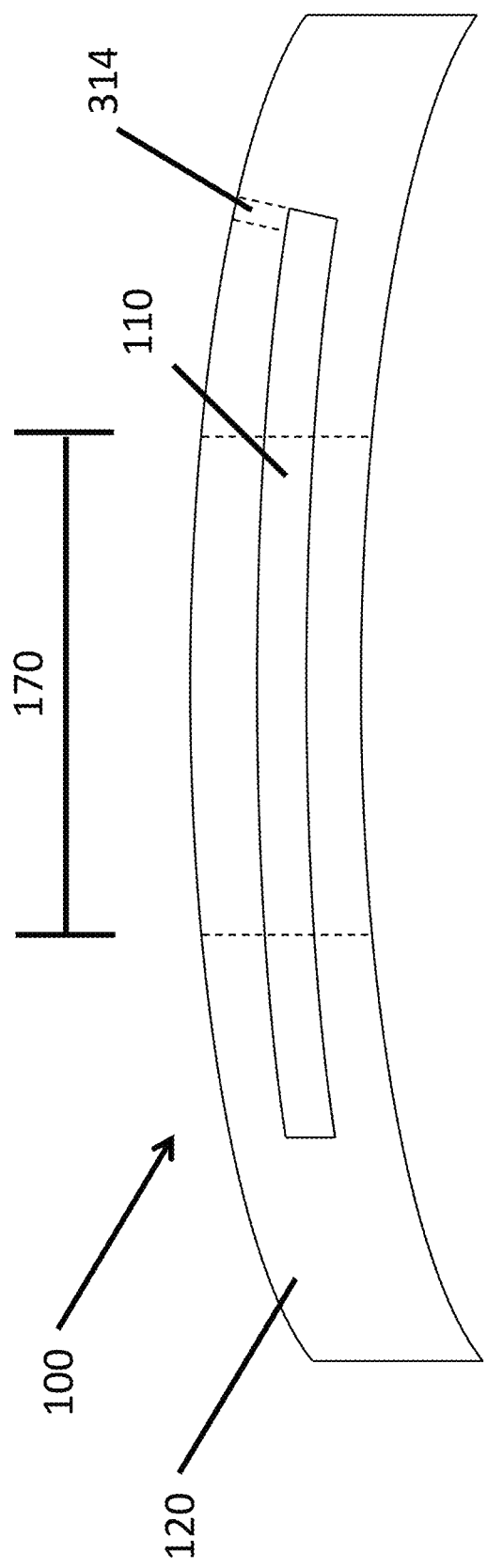
FIG. 13C shows a cross-sectional view of a contact lens comprising an internal cavity and filled-in hole, in accordance with embodiments.

FIGS. 13A-13C show a contact lens comprising an internal cavity 110 formed by erosion of an insert as described herein. The cavity 110 may be formed by dissolving, eroding, degrading, photo-decomposing, or otherwise solubilizing an insert as described herein such that the shape of the cavity 110 corresponds to the shape of the insert. The cavity 110 may be formed between anterior and posterior surfaces of the lens body 120. The insert may comprise an erodible material as described herein. As the insert erodes, low molecular weight or highly soluble components of the insert may readily diffuse through the lens body 120 while high molecular weight or insoluble components of the insert may have reduced diffusion as described herein. For example, the insert may dissolve into particles of differing sizes, with higher molecular weight particles being unable to pass through the pores or channels in the lens body 120 while lower molecular weight particles readily diffuse out of the cavity 110. The cavity 110 may not comprise residual insert material as described herein. The cavity 110 may comprise residual insert material as described herein. Retention of residual insert material within the cavity 110 may change the osmotic pressure of the cavity 110 and cause the cavity 110 to swell as described herein. The amount of swelling or bulging of the cavity 110 may be controlled to achieve desired optical and/or physical properties of the lens 100. The amount of swelling or bulging of the cavity 110 may be controlled by altering one or more of the temperature, the salinity of the surrounding solvent, the amount or type of sugars in the insert or solvent, the molecular size of the dissolved insert materials, the rate of dissolution of the insert materials and their water uptake rate, the solvent and conditions of insert dissolution, or any combination thereof. For example, the swelling may be mitigated by increasing the heat of the solvent or increasing the salinity of the solvent. Alternatively or in combination, the channel size of the lens body material may be increased to permit diffusion of larger or less soluble particles through the lens and thereby alter the amount of residual insert material in the cavity 110 and relieve the osmotic pressure of the cavity 110. The channel size may be altered as described herein, for example by modifying the chemistry of the lens body formation. One or more channels or holes may be mechanically created in the lens body, for example with a syringe, needle, laser, or other method suitable for creating a hole. Alternatively or in combination, one or more holes may be made by shaping the insert such that it leaves behind a hole in the lens body when eroded.

FIG. 13A shows a cross-sectional view of a contact lens 100 comprising an internal cavity 110 and hole 310. Any of the contact lenses described herein may further comprise one or more hole or channel 310. The hole or channel 310 may comprise an opening in the lens body 120 which extends from the cavity 110 to the external environment of the lens 100. One or more holes 310 may be created by physically puncturing the lens body 120. Alternatively or in combination, one or more holes 310 may be created through chemical erosion of the lens body 120 or by altering the chemical properties of the lens body 120 prior to UV curing. Alternatively or in combination, one or more holes 310 may be generated by a correspondingly-shaped protrusion on the insert. Hole 310 may be sized to facilitate the release of high molecular weight substances from the cavity, for example to control, reduce, or prevent bulging of the lens 100 as the cavity 110 is formed following dissolution or erosion of an insert as described herein. The hole 310 may be positioned outside of the optical zone 170 to prevent visual aberrations. The hole 310 may be position inside the optical zone 170.

FIG. 13B shows a cross-sectional view of an insert 140 comprising a protrusion 312. The channel 310 may for example be formed during the curing process of the lens 100. The insert 140 may be configured so as to form a corresponding hole in the lens upon erosion of the insert 140 to form the cavity. The insert 140 may be shaped substantially similar to any of the inserts described herein such that a cavity is formed within the lens body when the insert material erodes and diffuses out of the lens. The insert 140 may comprise a protrusion 312 which extends beyond the upper surface 142 or lower surface 144 of the insert 140 towards an external surface of the lens. The protrusion 312 may be shaped such that it extends up to or beyond the surface of the lens after the lens is formed around the insert as described herein. The protrusion 312 may be located anywhere on the insert 140. The protrusion 312 may for example be on an outer edge of the insert as shown in FIG. 13B. The protrusion 312 may be disposed on an internal surface 142, 144 of the insert away from the edge. The protrusion 312 may protrude towards the posterior surface of the lens, the anterior surface of the lens, or both. It will be understood that the protrusion 312 may be located on any part of the insert 140 in order to form a hole in the lens body extending into the cavity upon erosion of the insert material (as shown in FIG. 13A).

FIG. 13C shows a cross-sectional view of a contact lens 100 comprising an internal cavity 140 and filled-in hole 314. After the lens has hydrated and the insert has eroded, the hole may be filled in 314 in order to create a final lens 100 comprising an internal cavity 110 substantially similar to any of the lenses described herein. The hole may be filled in 314 with any suitable material, for example the same or different material used to form the lens, and then bonded or hardened to complete the lens body 120. For example, the filled-in hole 314 may comprise lens body material which was injected into the hole with a syringe and UV-cured to seal the hole. The hole may be filled in, plugged, sealed, sealed with polymer comprising a polymer of the contact lens, welded, or otherwise closed using techniques known to one of ordinary skill in the art following erosion of the insert and formation of the cavity.

The insert described herein can be sized and shaped in many ways. The insert may comprise a three dimensional shape profile. The three dimensional shape profile may comprise an outer boundary defining the outer boundary of the cavity 110. The shape profile may comprise one or more curved surfaces corresponding to one or more surfaces of the contact lens, for example corresponding to the lower base curvature of the contact lens. The insert may be fabricated via casting, extrusion, molding, lamination, laser etching or ablation, or any other technique known to those skilled in the art. The insert may be formed by any combination of techniques to produce a desired three-dimensional profile.

The lens may be formed around the insert as described herein. A base layer of lens material may be generated by the addition of a small amount of lens pre-polymer to a lower mold cavity cup. The pre-polymer material may be partially cured using UV light or other curing methods. The partially cured resin layer (e.g. base layer or first portion) may be viscous or solid. The insert may be formed and/or placed atop the partially cured resin layer residing in the lower mold cavity cup. The insert may be partially inserted into or submerged in the partially cured base layer residing in the lower mold cavity cup to secure the insert. The insert may be placed on the base layer by a robotic arm. Additional pre-polymer may then be delivered to the mold, which may comprise an insert and partially cured resin, in such quantities that there is enough to generate a top layer of lens material (e.g. to form a second portion) and complete lens formation. The robotic arm may deliver some or all of the additional pre-polymer before, during, or after placement of the insert on the base layer. The lens may then be fully polymerized by curing under UV light for example. The lens may then be hydrated and the insert dissolved in order to form a cavity with the desired shape within the lens body and the dissolved insert material may diffuse out of the lens body as described herein. Alternatively or in combination, the insert may be formed on an intermediate layer of material, for example lens material or any other material as desired. The intermediate layer may be placed atop the uncured or partially cured base layer of lens material prior to addition of the top layer lens material and completion of lens formation.

After hydration and erosion of insert to form the cavity, the contact lens body may comprise a first portion on a first side of the cavity corresponding to the base layer of polymer poured as described herein. The contact lens body may further comprise a second portion on a second side of the cavity corresponding to the top layer of polymer poured as described herein. The cavity may extend between the top layer and the bottom layer. Internal surfaces of the top layer and the bottom layer, shaped by the erosion of insert, may define the cavity. The top layer and bottom layer may be bonded together away from the cavity (e.g. where the insert was not) as described herein. The cavity may comprise a fluid as described herein. The cross-linked polymer of the lens body exposed at the cavity edge may directly contact the fluid within the cavity. The interface at which the top layer and the bottom layer are bonded together may be undetectable. The interface at which the top layer and the bottom layer are bonded together may be detectable, for example by dark field microscopy as known to one of ordinary skill in the art. For example, the lens may be bisected along a midline and dark field microscopy may be used to visualize the interface between the two cured regions or layers via light scattering.

The insert may be positioned during formation of the lens such that the cavity, or a portion of the cavity, for example the inner optical chamber, is eccentric with the contact lens. The insert may be positioned during formation of the lens such that the cavity is concentric within the lens. The insert may be positioned and/or the cavity may be formed such that the cavity is concentric with the pupil when the lens is placed on the eye. The inner optical chamber can be positioned in many ways in relation to the contact lens in order to accommodate anatomical variability of the eye. For example, the inner optical chamber may be positioned within the soft contact lens away from a center of the contact lens such that the inner optical chamber is concentric with the pupil. Alternatively, the inner optical chamber can be concentric with the contact lens. A person of ordinary skill in the art will recognize that the pupil may be located away from the center of the cornea and design the contact lens accordingly in accordance with the embodiments disclosed herein. This approach allows the center of the inner optical chamber to be centered on the pupil when the soft contact lens is placed on the eye. The inner optical chamber may be concentric or eccentric within the soft contact lens, such as with respect to the center of the soft contact lens. The lens may configured such that the optical zone is concentric or eccentric with respect to the center of the lens. The lens may be configured such that the optical zone is concentric or eccentric with respect to the pupil.

The diameter or maximum dimension across of the optical zone and/or inner optical chamber may be sized to match the pupil based on physiological norms. The diameter of the optical zone or inner optical chamber may be within a range of about 2.5 mm to about 6 mm, for example within a range of about 3 mm to about 6 mm.

Erosion, dissolution, or decomposition of the insert may result in the formation of a cavity comprising an optically smooth surface of an inner portion of the cavity through which light passes to correct vision. The optically smooth surface may comprise no visually perceptible artifacts (e.g. less than about 0.1 D) when worn by a patient. The optically smooth surface may have a wavefront distortion of about 0.3 microns or less measured through the optically smooth surface, for example within a range defined between any two of the following values: about 0 microns, about 0.01 microns, about 0.025 microns, about 0.05 microns, about 0.075 microns, about 0.1 microns, about 0.125 microns, about 0.15 microns, about 0.175 microns, about 0.2 microns, about 0.225 microns, about 0.25 microns, about 0.275 microns, and about 0.3 microns. The optically smooth surface may have an RMS value of about 0.2 microns of less, for example within a range defined between any two of the following values: about 0 microns, about 0.01 microns, about 0.025 microns, about 0.05 microns, about 0.075 microns, about 0.1 microns, about 0.125 microns, about 0.15 microns, about 0.175 microns, and about 0.2 microns. Erosion of the insert material may result in the formation of a cavity comprising residual surface structure corresponding to the surface structure of the insert. The residual surface structure may comprise a three-dimension pattern left behind due to three-dimensional patterning on the surface of the insert. Alternatively or in combination, the residual surface structure may comprise residual insert material. The inner surface of the cavity may have an RMS value within a range defined between any two of the following values: about 5 nm, about 10 nm, about 15 nm, about 25 nm, about 50 nm, about 100 nm, about 200 nm, about 300 nm, about 400 nm, about 500 nm, about 600 nm, about 700 nm, about 800 nm, about 900 nm, and about 1000 nm. The inner surface of the cavity may have an RMS value of about 50 nm or less.

The shape-changing portion of the lens (e.g. the inner optical chamber and/or peripheral reservoir(s) as described herein) used to correct vision may have RMS optical path difference aberrations of about 0.4 microns or less in a far vision configuration when placed on the eye. The RMS optical path difference values may be measured on-eye with Hartmann-Shack wavefront aberrometry or other techniques as are known to one of ordinary skill in the art. The shape-changing portion of the lens (e.g. the inner optical chamber and/or peripheral reservoir(s) as described herein) used to correct vision may have RMS optical path difference aberrations of about 0.4 microns or less in a near vision configuration when placed on the eye. The RMS optical path difference aberrations may for example within a range defined between any two of the following values: about 0 microns, about 0.01 microns, about 0.025 microns, about 0.05 microns, about 0.075 microns, about 0.1 microns, about 0.125 microns, about 0.15 microns, about 0.175 microns, about 0.2 microns, about 0.225 microns, about 0.25 microns, about 0.275 microns, about 0.3 microns, about 0.325 microns, about 0.35 microns, about 0.375 microns, and about 0.4 microns.

The insert may comprise any of the insert materials described herein. The insert 140 may have a thickness within a range from about 0.5 microns to about 100 microns. The insert 140 may have a thickness within a range bounded by any two numbers from Table 1, for example within a range of about 0.5 microns to about 10 microns or within a range of about 4 microns to about 60 microns. The insert may have a thickness greater than about 100 microns. The insert may have a thickness within a range defined between any two of the following values: about 0.5 microns, about 15 microns, about 75 microns, about 100 microns, about 150 microns, and about 200 microns.

Table 1 shows the range of values that the insert thickness can take.

TABLE 1

| Insert thickness values. Insert thickness (microns) |
| --- |
| 0.5 |
| 1 |
| 2 |
| 4 |
| 5 |
| 10 |
| 20 |
| 30 |
| 40 |
| 50 |
| 60 |
| 70 |
| 80 |
| 90 |
| 100 |
| 110 |
| 120 |
| 130 |
| 140 |
| 150 |
| 160 |
| 170 |
| 180 |
| 190 |
| 200 |

The insert may comprise a material capable of deforming without breaking at room temperature. The insert may comprise a material capable of being bent to a radius of curvature within a range from about 5 mm to about 1 m, for example within a range defined between any two of the following values: about 5 mm, about 10 mm, about 25 mm, about 50 mm, about 100 mm, about 200 mm, about 300 mm, about 400 mm, about 500 mm, about 600 mm, about 700 mm, about 800 mm, about 900 mm, and about 1000 mm. The insert may optionally comprise an elastic material. The insert may comprise a flexible, non-brittle material.

Factors affecting the dissolution of the insert may include the molecular size of the dissolved insert materials, the rate of dissolution of the insert materials and their water uptake rate, the solvent and conditions of insert dissolution, or any combination thereof. The insert may be dissolved, eroded, degraded, or solubilized with or without forming a bulge in the lens cavity.

The insert may be formed of any material suitably dissolvable, erodible, degradable, or solubilizable by an aqueous solution, an alcohol, or other solvent, or any combination thereof. The insert material may comprise one or more low molecular weight components capable of diffusing through the lens body material upon hydration, exposure to an aqueous solution, exposure to an alcohol-based solution, exposure to an organic solvent, or any combination thereof. The insert material may be soluble in an organic solvent such as a polar protic solvent such as an alcohol such as methanol, ethanol, or butanol. The insert material may comprise one or more components with a reduced capacity for diffusion through the lens body as described herein. The insert material may be photo-curable. The insert material may be photo-cleavable. The insert material may be moldable. The insert material may be extrudable. The insert material may comprise a sugar such as fructose, galactose, glucose, glyceraldehyde, lactose, maltose, ribose, sucrose, or any other monosaccharides, disaccharides, or polysaccharides such as cellulose or methylcellulose. The insert material may comprise a sugar alcohol such as arabitol, sorbitol, D-sorbitol, erythritol, fucitol, galactiol, glycerol, iditol, inositol, isomalt, lactitol, maltotetraitol, maltitol, maltotritol, mannitol, inositol, myo-inositol, polyglycitol, ribitol, sorbitol, threitol, xylitol, or any other sugar alcohol. A sugar-based insert material may comprise a low molecular weight and may thereby be beneficial when a reduction in bulging is desired as described herein. The insert material may comprise a salt such as sodium chloride, sodium carbonate, potassium chloride, or any other salt. The insert material may comprise dimethyl sulfoxide (DMSO), N-vinylpyrrolidone (NVP), polyethylene glycol (PEG), poly sodium methacrylate, METHOCEL™ E6, or any of the materials described herein. The insert material may comprise polyvinyl alcohol (PVA), and the polymer chains of PVA may comprise vinyl acetate (VAc) groups interspersed among the vinyl alcohol groups as described herein. The co-polymer of PVA and PVAc may be generated by partially hydrolyzing polyvinyl acetate (PVAc) to PVA so as to have a mixture of pendant groups along the polymer chain comprising acetate groups and alcohol groups. The insert material may be chosen to reduce deformation of the lens before, during, or after removal of the insert. The insert material may be any combination of the materials described herein.

The insert material may comprise one or more low molecular weight components. The insert material may have a molecular weight within a range of about 1 g/mol (grams per mole) to about 50,000 g/mol, or within a range between any two weights therebetween. The insert material may for example have a molecular weight within a range of about 50 g/mol to about 10,000 g/mol, for example within a range of about 50 g/mol to about 5,000 g/mol, or within a range of about 50 g/mol to about 1000 g/mol. For example, the insert material may comprise sodium chloride which as a molecular weight of 58.44 g/mol. The insert material may comprise glucose which has a molecular weight of 180 g/mol. The insert material may comprise isomalt which has a molecular weight of 334 g/mol. The insert material may comprise sucrose which has a molecular weight of 342 g/mol.

The insert material may have a molecular weight within a range of about 50 g/mol to about 100,000 g/mol, or within a range bounded by any two numbers therebetween. The insert material may have a molecular weight within a range defined between any of the two following values: 50 g/mol, 100 g/mol, 500 g/mol, 1,000 g/mol, 5,000 g/mol, 10,000 g/mol, 25,000 g/mol, 50,000 g/mol, and 100,000 g/mol.

The insert material may comprise PVA or PVA/Ac as described herein. The molecular weight of the PVA or PVA/Ac may be within a range of about 50 Daltons (e.g. g/mol) to about 100,000 Daltons, or within a range bounded by any two numbers therebetween. The insert material may comprise PVA or PCA/Ac with a molecular weight within a range defined between any of the two following values: 50 Daltons, 100 Daltons, 500 Daltons, 1,000 Daltons, 5,000 Daltons, 10,000 Daltons, 25,000 Daltons, 50,000 Daltons, and 100,000 Daltons. The insert material may comprise PVA or PVA/Ac with a molecular weight of less than about 13,000 Daltons.

Figure 32:
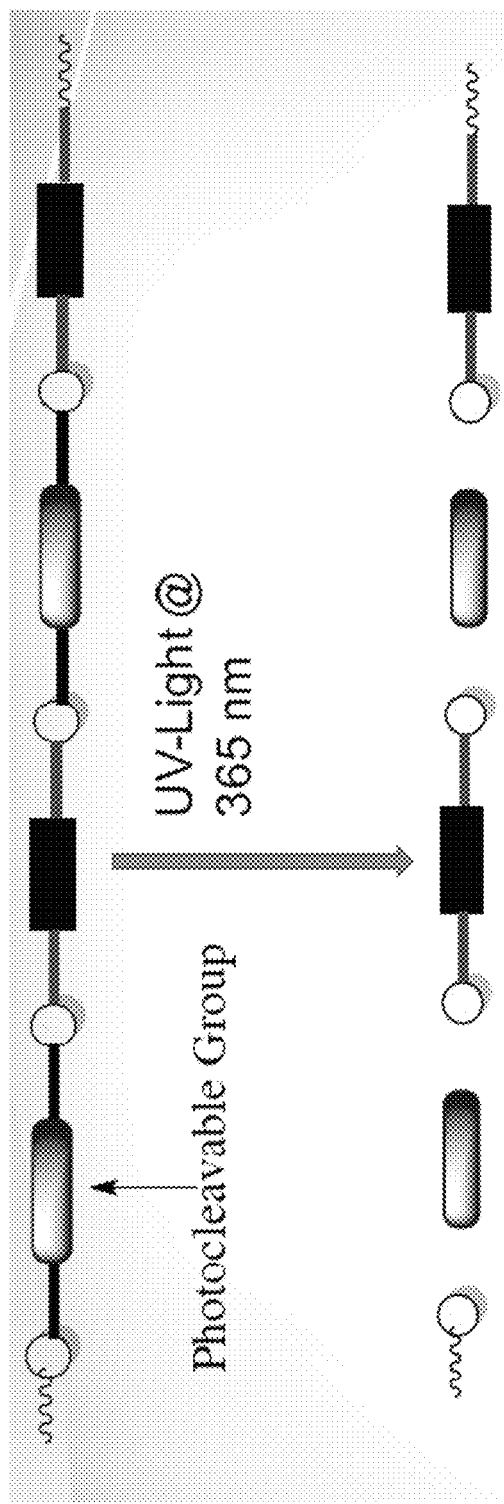
FIG. 32 shows an exemplary photo-cleavable insert material, in accordance with embodiments.

FIG. 32 shows an exemplary photo-cleavable insert material. The insert may for example comprise a photo-cleavable material. The insert material may comprise polymer chain comprising a photo-cleavable group. The insert material may comprise a plurality of photo-cleavable groups. The photo-cleavable group may be cleaved by light comprising ultraviolet light, visible light, near infrared light, or infrared light. For example, the photo-cleavable group may be cleaved light comprising a wavelength of about 365 nm such that the polymer chain of the insert material is cleaved into smaller polymer fragments. The small polymer fragments may for example be water soluble. The smaller polymer fragments may have a low molecular weight such that they are readily capable of diffusing out of the lens body and forming the cavity.

The erodible inserts as described herein can be configured in many ways and may comprise sufficient strength to facilitate handling of the insert in a free standing configuration, for example when the insert is placed on a partially cured contact lens material. The insert may comprise a combination of materials and thickness as disclosed herein in order to allow the insert to be bent from a substantially planar configuration to a radius of curvature within a range from about 5 mm to about 1 m. The insert may be resilient and capable of substantially returning to an initial profile to being bent, for example returning at least about 90% toward the initial profile from the deflected profile. The insert may comprise an additive as described herein to promote flexibility. Although the insert can be optically smooth to an RMS roughness of approximately 50 nm or less, for example, the insert may comprise greater amounts of roughness without affecting optical quality of the lens, for example when the fluid of the optical cavity has an index of refraction within about 0.1 of the fully hydrated contact lens material defining the cavity. Although the roughness and surface structure of the insert may be imparted on the contact lens material defining the cavity subsequent to erosion of the insert, this magnitude of such structure and roughness can be controlled by manufacturing the insert such that the surface structure of the insert material imparted on the lens cavity does not provide user perceptible optical artifacts or degrade vision in many instances.

The lens 100 can be formed in many ways. The lens may also be fabricated via casting, extrusion, molding, lamination, or any other technique known to those skilled in the art. The lens 100 may by formed by molding, or the like. The lens 100 may be formed to any shape or size as desired. The material of the lens may for example be a polymer that forms a hydrogel in water or aqueous solution. The material of the lens may comprise acofilcon A, acofilcon B, alfafilcon A, altraficon A, atlafilcon A, balafilcon A, bufilcon A, comfilcon A, crofilcon, deltafilcon A, dimefilcon A, droxifilcon A, efrofilcon A, enfilcon, epsifilcon A, etafilcon A, focofilcon A, galyfilcon A, heflicon A, heflicon B, hefilcon C, hilafilcon A, hilafilcon B, hioxifilcon A, hioxifilcon B, hioxifilcon D, isofilcon, lidofilcon A, lidofilcon B, lotrafilcon A, lotrafilcon B, mafilcon, methafilcon A, methafilcon B, narafilcon B, nelfilcon A, nescofilcon A, netrafilcon A, ocufilcon A, ocufilcon B, ocufilcon C, ocufilcon D, ocufilcon E, ocufilcon F, ofilcon A, omafilcon A, phemfilcon, phemfilcon A, polymacon, perfilcon A, samfilcon A, scafilcon A, senofilcon A, sifilcon A, surfilcon A, teflicon, tetrafilcon A, tetrafilcon B, vasurfilcon A, vilfilcon A, xylofilcon A, or any combination thereof. One or more lens materials may be used to form the lens. For example, the base layer may comprise a different lens material than the top layer.

Some or all of the lens material may be partially or fully cured before, during, or after the manufacturing process.

The insert material may be extracted from the lens body by exposure to an aqueous solution, an alcohol-based solution, an organic solvent, or any combination thereof. The insert material may for example be extracted from the lens body by saline. The insert material may be extracted from the lens body by an organic solvent such as an alcohol (e.g. ethanol), an ether (for example a cyclic either such as tetrahydrofuran). The solvent may be miscible in water or an aqueous solution. The insert material may be extracted from the lens body by saline in combination with an organic solvent, for example an organic solvent which is miscible with water such as isopropanol, methanol, tetrahydrofuran, or ethanol. The insert material may be extracted from the lens body at a temperature at or above room temperature.

For example, the insert material may be extracted at a temperature within a range of about 20 C to about 80 C or any within a range of any two temperatures therebetween. The insert material may be extracted at a temperature within a range of about 25 C to about 60 C. The insert material may be extracted at any temperature desired to achieve formation of the cavity. The insert material may be extracted from the lens body by any solvent or solution known to one of ordinary skill in the art which is compatible with the lens material. Removal of the insert material from the lens body to form the cavity may be aided by circulation of the extraction solution or solvent about the lens body.

Figure 14:
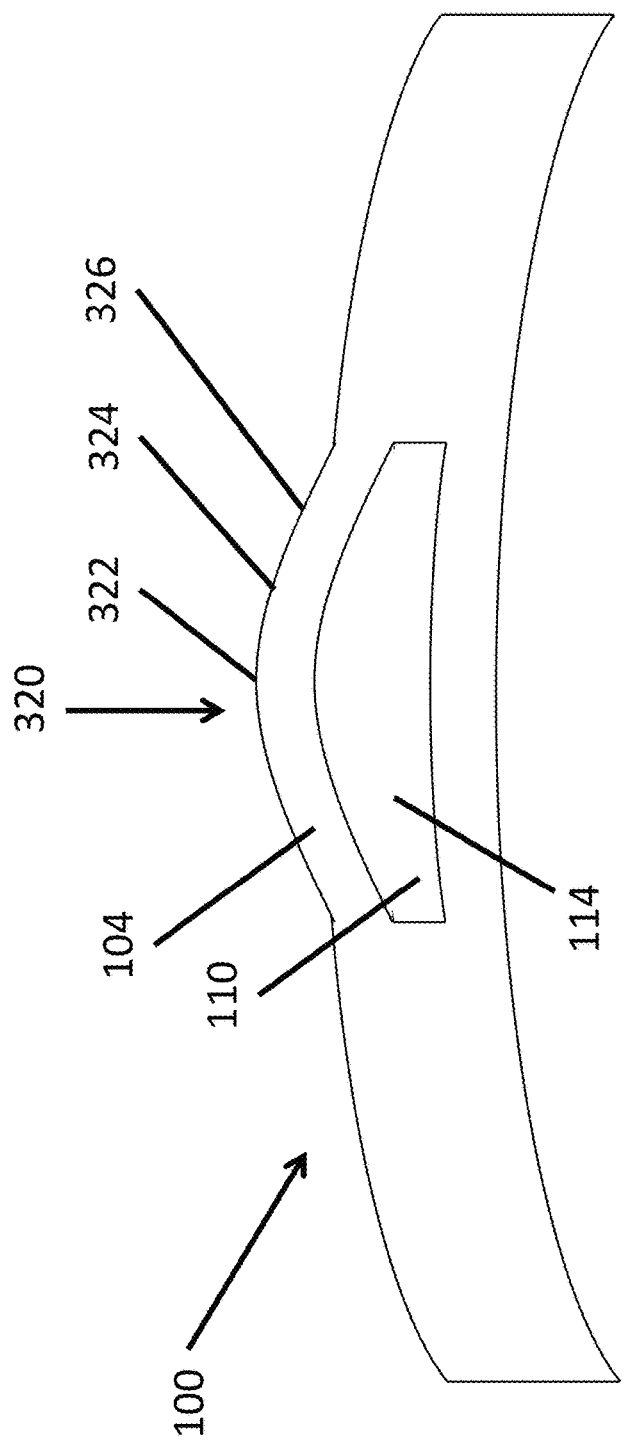
FIG. 14 shows a cross-sectional view of a contact lens comprising an internal cavity and comprising a multifocal lens, in accordance with embodiments.

FIG. 14 shows a contact lens 100 comprising an internal cavity 110. The cavity 110 may be substantially similar to any of the cavities described herein. For example, the cavity 110 may comprise an inner optical chamber 114 and one or more lower chambers (not shown) as described herein. The inner optical chamber 114 may deflect in response to compression of the one or more lower chambers as described herein. Deflection of the inner optical chamber 114 may provide optical correction as described herein. Deflection of the inner optical chamber 114 may provide increased optical power to provide near vision correction as described herein. The lens anterior side 104 may deflect with the deflection of the inner optical chamber 114. Deflection of the lens anterior side 104 may provide optical correction, for example increased optical power when the lens anterior side 104 is deflected anteriorly by compression of the one or more lower chambers. The lens anterior side 104 may be deflected so as to provide uniform optical correction, for example spherically. The lens anterior side 104 may be deflected to as to provide non-uniform optical correction, for example non-spherically. The lens anterior side 104 may have a multifocal profile 320 with regions of differing optical power. As an example, there may be a first region 322 with a high optical power, for example 3 D, a second region 324 with a medium optical power, for example 2 D, and a third region 326 with a low optical power, for example 1 D. These numbers are meant only as an example and those skilled in the art will recognize that the lens 100 may be configured to accommodate many possible values for optical power as desired. The multifocal profile 320 can be made of distinct regions or may be continuous. The multifocal profile 320 may have distinct regions of differing optical power. The multifocal profile 320 may have a continuously varying region of optical power. The lens 100 may comprise a multifocal profile 320 in a near vision configuration. Alternatively or in combination, the lens 100 may comprise a multifocal profile 320 in a far vision configuration.

Figure 15:
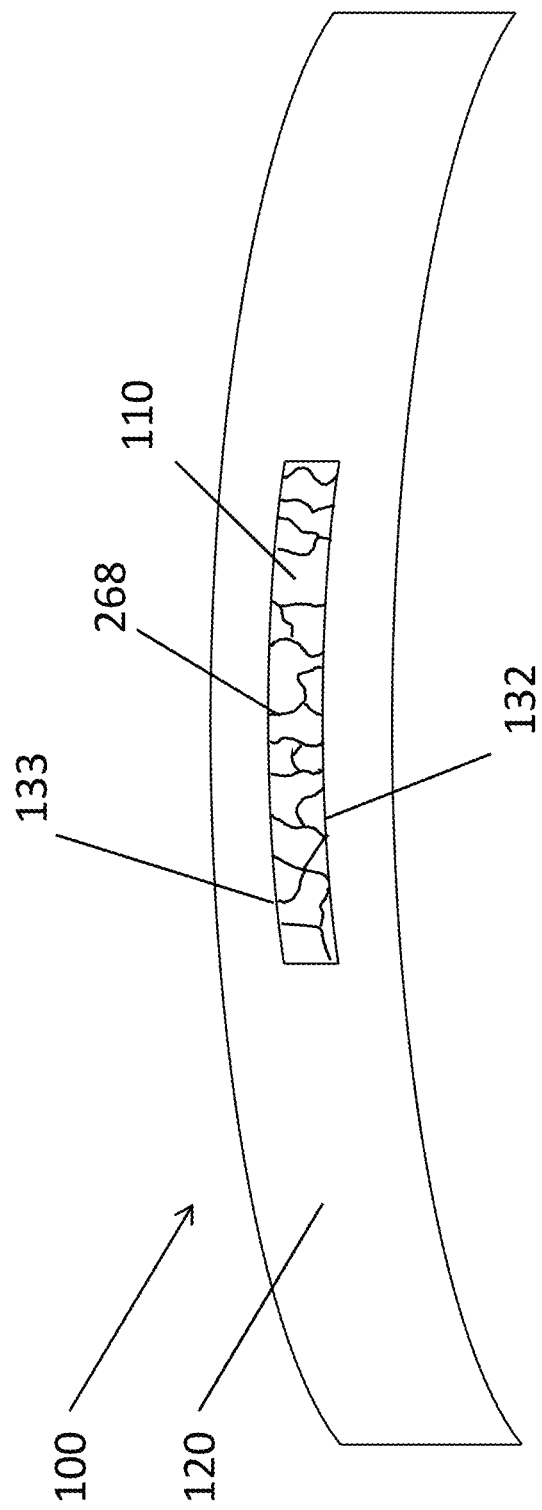
FIG. 15 shows a cross-sectional view of a contact lens comprising an internal cavity with cross-linked material, in accordance with embodiments.

FIG. 15 shows a cross-sectional view of a hydrogel contact lens 100 comprising an internal cavity 110. The cavity 110 may comprise residual insert material as described herein. The residual insert material may be cross-linked within the cavity 110, for example during UV-curing of the lens body around the insert prior to hydration. The residual insert material may be cross-linked within the cavity 110 by a chemical cross-linker prior to, during, or after hydration. The cross-linked material 268 may be free-floating or cross-linked to the exposed lens polymer material at one or more locations. For example, the cross-linked material 268 may extend across the cavity 110 from the anterior edge 133 of the cavity 110 to the posterior edge or base 132 of the cavity 110. Cross-linked material 268 may extend into the cavity 110 from one point along the anterior edge 133 to another point along the anterior edge 133. Cross-linked material 268 may extend into the cavity 110 from one point along the posterior edge 132 to another point along the posterior edge 132. The cross-linked material 268 may form a network of cross-linked polymer chains within the cavity 110 connected to the anterior edge 133, the posterior edge 132, any other surface defining the cavity 110, or any combination thereof, or it may be unconnected to the lens body surfaces defining the cavity 110. The insert material may comprise any material which cross-links when exposed to UV light for example. The insert material may comprise a UV blocking or absorbing material in order to modify the extent or location of cross-linking. The insert may for example be coated in or comprise a UV blocking agent. The insert material may be selected so as to create desired arrangements of cross-linking for optical, structural, or functional purposes.

In some embodiments, it may be desirable to prevent cross-linking of the residual insert material. The insert material may comprise any material which does not cross-link when exposed to UV light for example. Alternatively or in combination, the insert 140 may be coated in, mixed with, made from, or otherwise created using a UV blocking or absorbing material in order to prevent cross-linking of the insert material during photo-curing of the lens body 120.

Figure 16:
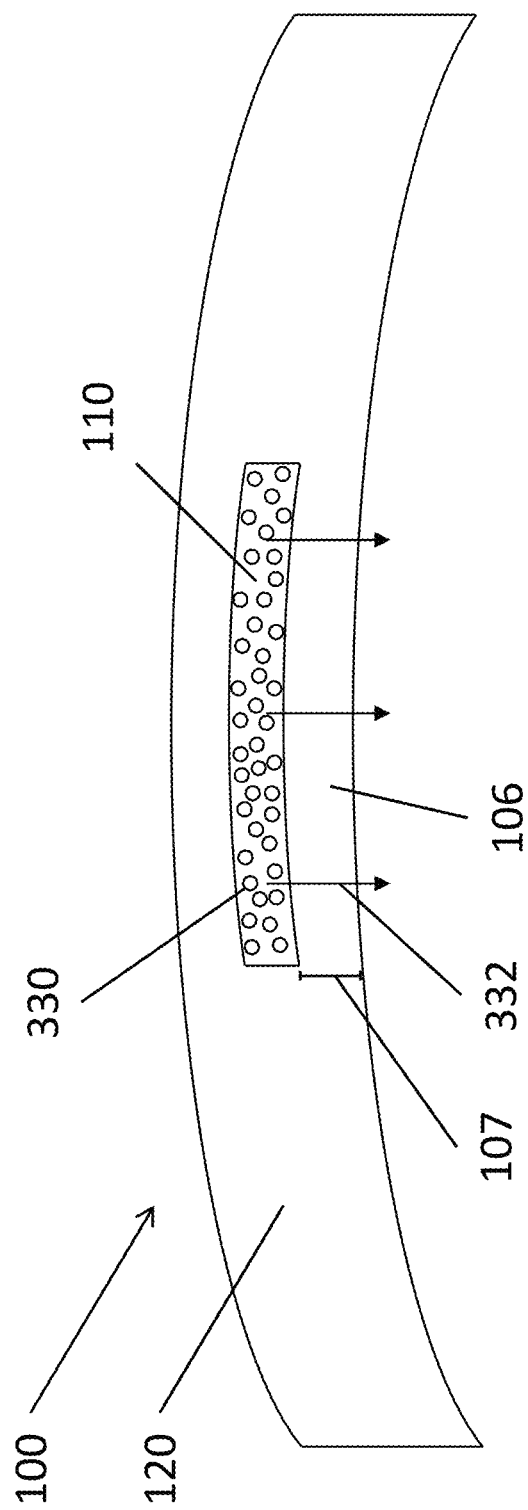
FIG. 16 shows a cross-sectional view of a contact lens comprising an internal cavity with a drug contained therein, in accordance with embodiments.

FIG. 16 shows a contact lens 100 with a cavity 110 configured for therapeutic agent delivery to the eye of the wearer. The cavity 110 may comprise a therapeutic agent 330. The therapeutic agent 330 may comprise any of the drugs or therapeutic agents described herein. The therapeutic agent 330 may comprise a plurality of therapeutic agents, for example a mixture or any number of therapeutic agents as desired. The therapeutic agent 330 may be introduced into the cavity 110 in any number of ways. For example, the insert which erodes to form the cavity may comprise the therapeutic agent 330. Alternatively or in combination, the therapeutic agent 330 may be a coating on the insert. The therapeutic agent 330 may remain in the cavity following dissolution of the insert. Alternatively or in combination, the therapeutic agent 330 may be introduced into the cavity 110 following erosion of the insert or via the external solution in which the lens 100 is stored. The external solution may be an aqueous solution 204 containing the therapeutic agent 330 such that as the internal cavity 110 comes to equilibrium with the external storage solution, the therapeutic agent 330 diffuses across the lens body 120 into the cavity 110. The storage solution may be of such a concentration, temperature, composition, or any comparable parameter or combination of parameters that the rate of diffusion can be controlled to load the cavity 110 with the desired amount of therapeutic agent 330. The therapeutic agent 330 may also be introduced into the cavity 110 through any technique known to those skilled in the art.

The therapeutic agent 330 may be delivered to the eye when the lens 100 is being worn via diffusion. The therapeutic agent 330 may diffuse across a posterior side 106 of lens 100 to the eye, or across an anterior side of the lens. The posterior side 106 of the lens 100 may act as a rate control structure. For example, the posterior side 106 of the lens 100 may comprise a thickness 107. The thickness 107 may be sized in order to control the diffusion rate 332 of the therapeutic agent 330 through the posterior side 106 of the lens 100 onto the surface of the eye. Alternatively or in combination, the pore size of the lens body 120 may be configured so as to control the rate of diffusion 332 of the therapeutic agent 330 through the posterior side 106 of the lens 100. The molecular weight and/or size of the therapeutic agent may affect the rate of diffusion across the posterior side 105. The molecular weight of the therapeutic agent 330 may for example be within a range of about 18 to about 10 kilodaltons. In many embodiments, the molecular weight of the therapeutic agent is no more than the molecular weight of the insert material, in order to allow the therapeutic agent to diffuse out of the cavity and onto the eye when worn. The therapeutic agent may comprise water to hydrate the eye, and other materials to retain water such as surfactants, for example. Although reference is made to the posterior side of the lens providing a rate control structure, the anterior side of the lens may be similarly configured.

Any range of molecular weights may be combined with any range or sizes, any range of thicknesses, or any combination thereof in order to achieve a desired rate of diffusion of the therapeutic agent 330 out of the cavity 110, through the lens posterior side 106, and onto the eye. For example, for a given molecular weight of the therapeutic agent 330, the thickness 107 may be modified to achieve a desired therapeutic agent release rate.

Therapeutic amounts of the therapeutic agent 330 may cause a change in the refractive index of the cavity. The change in the index of refraction may be within a range of about 0.01 to about 0.02 such that vision is not significantly altered by the presence of the therapeutic agent 330. Alternatively or in combination, there may be a second cavity formed by a second insert outside the optical zone. The second cavity may comprise the therapeutic agent 330 such that the therapeutic agent 330 remains out of the optical zone of the lens. Such an approach could be a useful way to maintain the therapeutic agent delivery capabilities of the lens without affecting vision, especially for those sorts of therapeutic agents which may be used in high concentrations or which may affect the index of refraction so as to reduce vision beyond a tolerable level. The cavity in the optical zone, the second cavity outside the optical zone, or both cavities may comprise one or more therapeutic agent 330. The cavities may comprise different therapeutic agents 330 or the same therapeutic agent 300. The cavities may comprise the same concentration of therapeutic agent 330 or different concentrations of therapeutic agent 330. It will be understood that the lens 100 may comprise any number of cavities of any size as desired to deliver any number or concentration of therapeutic agents as desired to any location on the eye as desired. The cavity may be positioned so as to deliver therapeutic agent directly to the site of injury or infection for example. One or more cavities may be positioned so as to generate a therapeutic agent concentration gradient across the surface of the eye.

The therapeutic agent 330 may comprise a half-life of about 1 day to about 7 days to allow for the introduction of therapeutic agent 330 into the cavity 110 from the external storage solution and/or to achieve desired release of the active compound or therapeutic agent 330 onto the eye. Alternatively or in combination, the therapeutic agent may comprise a solid to provide a substantially constant rate of release while the solid remains present on the lens.

Figure 17:
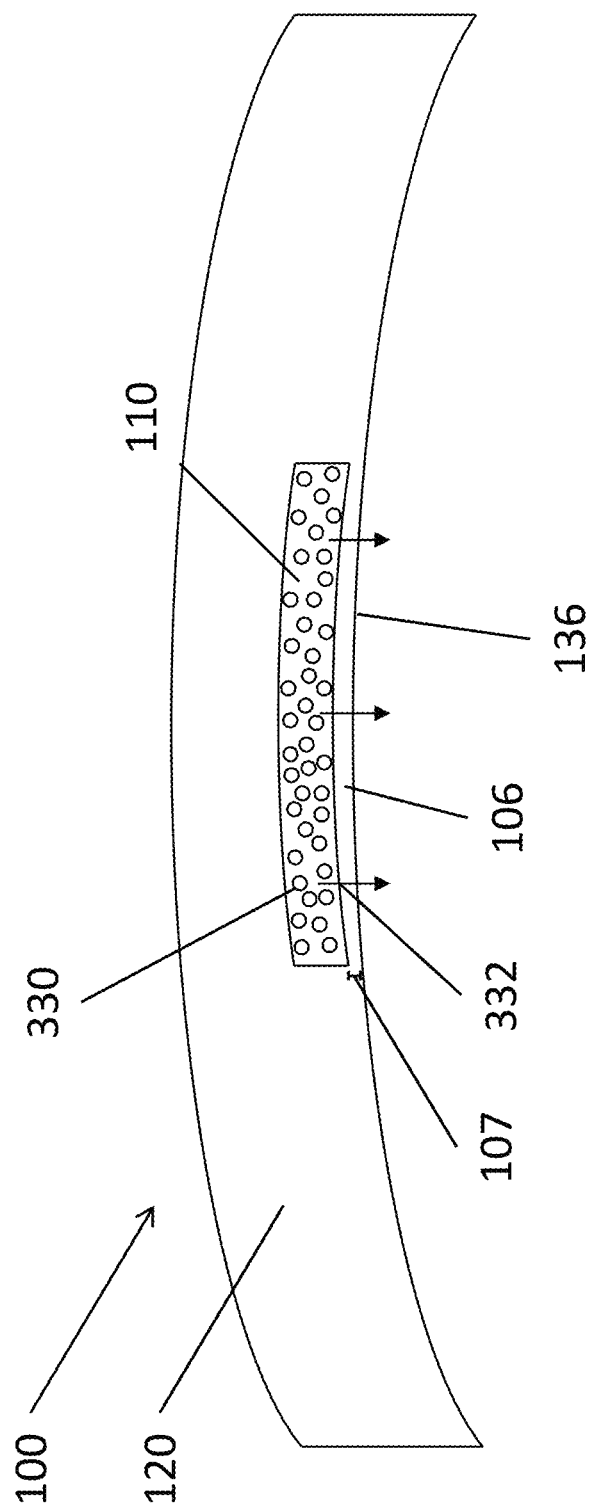
FIG. 17 shows a cross-sectional view of a contact lens comprising an internal cavity close to the posterior of the lens with a drug contained therein, in accordance with embodiments.

FIG. 17 shows a contact lens 100 with a cavity 110 near the posterior lens surface 136 configured for therapeutic agent delivery to the eye of the wearer. Placement of the cavity 110 near the posterior lens surface 136 may be useful to achieve the desired diffusion behavior. Placement of the cavity 110 near the posterior lens surface 136 may be useful to achieve the desired refractive behavior and may be situated in such a way to be outside of the optical zone. The cavity 110 may be continuous with one or more other cavities in the lens configured to delivery therapeutic agents, aid in vision, or any other purpose disclosed herein. The cavity 110 may comprise a therapeutic agent 330. The therapeutic agent 330 may comprise any of the drugs or therapeutic agents described herein. The therapeutic agent 330 may comprise a plurality of drugs, for example a mixture or any number of drugs as desired. The therapeutic agent 330 may be introduced into the cavity 110 in any number of ways. For example, the insert which erodes to form the cavity may comprise the therapeutic agent 330. Alternatively or in combination, the therapeutic agent 330 may be a coating on the insert. The therapeutic agent 330 may remain in the cavity following dissolution of the insert. Alternatively or in combination, the therapeutic agent 330 may be introduced into the cavity 110 following erosion of the insert or via the external solution in which the lens 100 is stored. The external solution may be an aqueous solution 204 containing the therapeutic agent 330 such that as the internal cavity 110 comes to equilibrium with the external storage solution, the therapeutic agent 330 diffuses across the lens body 120 into the cavity 110. The storage solution may be of such a concentration, temperature, composition, or any comparable parameter that the rate of diffusion can be controlled to load the cavity 110 with the desired amount of therapeutic agent 330. The therapeutic agent 330 may also be introduced into the cavity 110 through any technique known to those skilled in the art. The therapeutic agent 330 may be delivered to the eye when the lens 100 is being worn via diffusion. The therapeutic agent 330 may diffuse across a posterior side 106 of lens 100 to the eye. The posterior side 106 of the lens 100 may act as a rate control structure. For example, the posterior side 106 of the lens 100 may comprise a thickness 107. The thickness 107 may be varied in order to control the diffusion rate 332 of the therapeutic agent 330 through the posterior side 106 of the lens 100 onto the surface of the eye.

Figure 18:
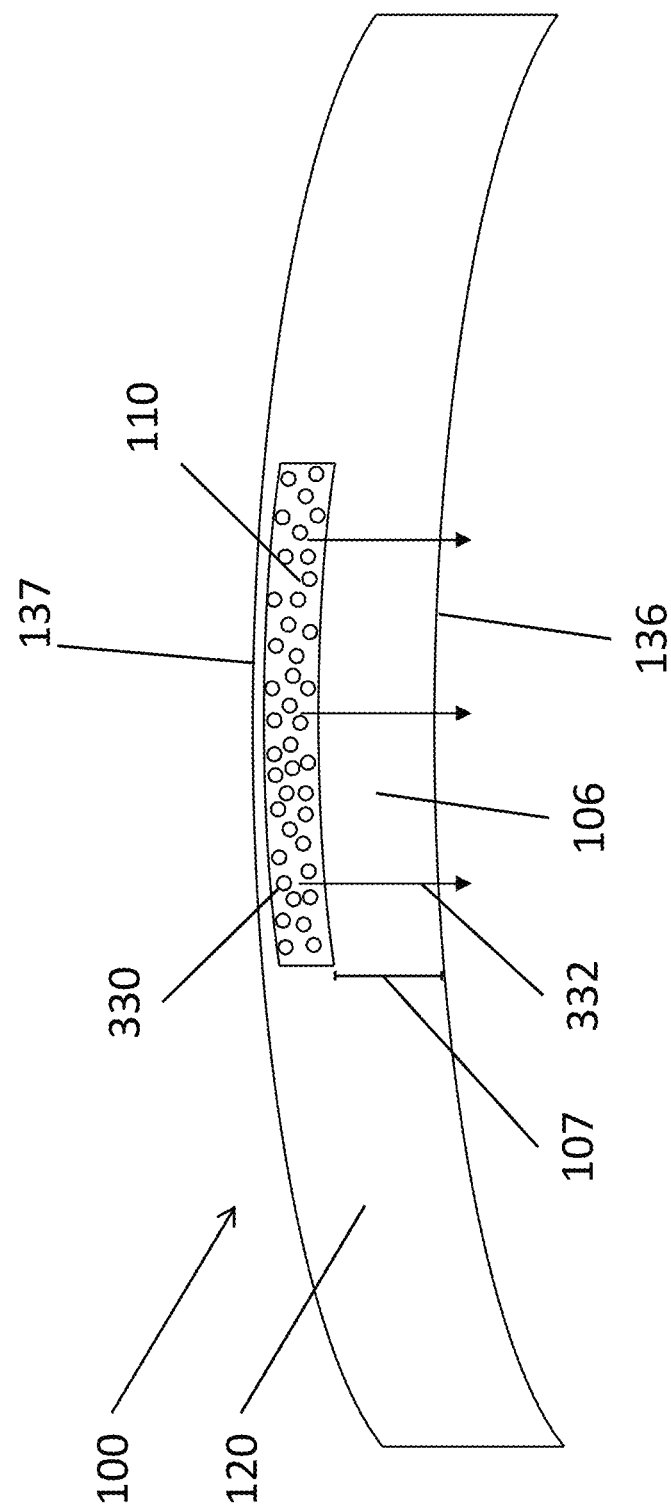
FIG. 18 shows a cross-sectional view of a contact lens comprising an internal cavity close to the anterior of the lens with a drug contained therein, in accordance with embodiments.

FIG. 18 shows a contact lens 100 with a cavity 110 near the anterior lens surface 137 configured for therapeutic agent delivery to the eye of the wearer. Placement of the cavity 110 near the anterior lens surface 137 may be useful to achieve the desired diffusion behavior. Placement of the cavity 110 near the posterior lens surface 136 may be useful to achieve the desired refractive behavior and may be situated in such a way to be outside of the optical zone. The cavity 110 may be continuous with one or more other cavities in the lens configured to deliver therapeutic agents, aid in vision, or any other purpose disclosed herein. The cavity 110 may comprise a therapeutic agent 330. The therapeutic agent 330 may comprise any of the drugs or therapeutic agents described herein. The therapeutic agent 330 may comprise a plurality of drugs, for example a mixture or any number of drugs as desired. The therapeutic agent 330 may be introduced into the cavity 110 in any number of ways. For example, the insert which erodes to form the cavity may comprise the therapeutic agent 330. Alternatively or in combination, the therapeutic agent 330 may be a coating on the insert. The therapeutic agent 330 may remain in the cavity following dissolution of the insert. Alternatively or in combination, the therapeutic agent 330 may be introduced into the cavity 110 following erosion of the insert or via the external solution in which the lens 100 is stored. The external solution may be an aqueous solution 204 containing the therapeutic agent 330 such that as the internal cavity 110 comes to equilibrium with the external storage solution, the therapeutic agent 330 diffuses across the lens body 120 into the cavity 110. The storage solution may be of such a concentration, temperature, composition, or any comparable parameter that the rate of diffusion can be controlled to load the cavity 110 with the desired amount of therapeutic agent 330. The therapeutic agent 330 may also be introduced into the cavity 110 through any technique known to those skilled in the art. The therapeutic agent 330 may be delivered to the eye when the lens 100 is being worn via diffusion. The therapeutic agent 330 may diffuse across a posterior side 106 of lens 100 to the eye. The posterior side 106 of the lens 100 may act as a rate control structure. For example, the posterior side 106 of the lens 100 may comprise a thickness 107. The thickness 107 may be varied in order to control the diffusion rate 332 of the therapeutic agent 330 through the posterior side 106 of the lens 100 onto the surface of the eye.

Figure 19:
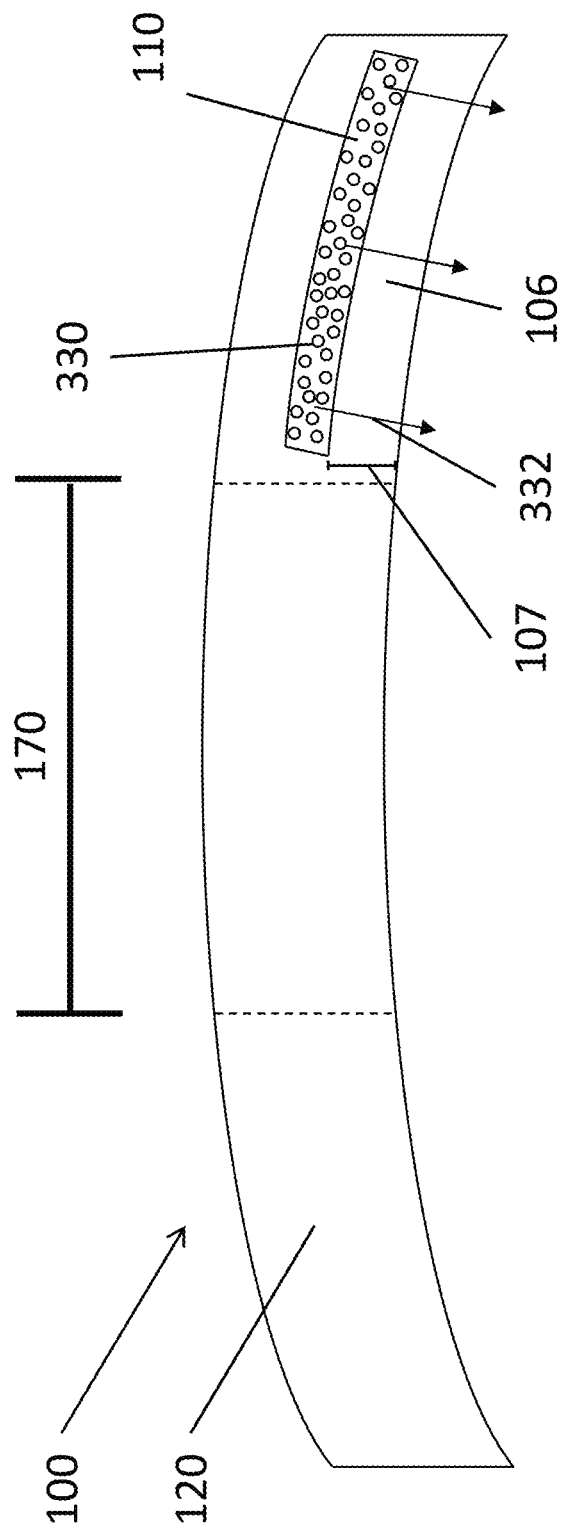
FIG. 19 shows a cross-sectional view of a contact lens comprising an internal cavity outside the optical zone with a drug contained therein, in accordance with embodiments.

FIG. 19 shows a contact lens 100 with a cavity 110 outside the optical zone 170 configured for therapeutic agent delivery to the eye of the wearer. The cavity 110 may comprise a therapeutic agent 330. The therapeutic agent 330 may comprise any of the drugs or therapeutic agents described herein. The therapeutic agent 330 may comprise a plurality of drugs, for example a mixture or any number of drugs as desired. The therapeutic agent 330 may be introduced into the cavity 110 in any number of ways. For example, the insert which erodes to form the cavity may comprise the therapeutic agent 330. Alternatively or in combination, the therapeutic agent 330 may be a coating on the insert. The therapeutic agent 330 may remain in the cavity following dissolution of the insert. Alternatively or in combination, the therapeutic agent 330 may be introduced into the cavity 110 following erosion of the insert or via the external solution in which the lens 100 is stored. The external solution may be an aqueous solution 204 containing the therapeutic agent 330 such that as the internal cavity 110 comes to equilibrium with the external storage solution, the therapeutic agent 330 diffuses across the lens body 120 into the cavity 110. The storage solution may be of such a concentration, temperature, composition, or any comparable parameter that the rate of diffusion can be controlled to load the cavity 110 with the desired amount of therapeutic agent 330. The therapeutic agent 330 may be also be introduced into the cavity 110 through any technique known to those skilled in the art. The therapeutic agent 330 may be delivered to the eye when the lens 100 is being worn via diffusion. The therapeutic agent 330 may diffuse across a posterior side 106 of lens 100 to the eye. The posterior side 106 of the lens 100 may act as a rate control structure. For example, the posterior side 106 of the lens 100 may comprise a thickness 107. The thickness 107 may be varied in order to control the diffusion rate 332 of the therapeutic agent 330 through the posterior side 106 of the lens 100 onto the surface of the eye.

The posterior side of the lens may comprise a thickness defined between a posterior surface of the contact lens body and a posterior surface of the inner cavity within a range of about 10 microns to about 200 microns, or within a range bounded by any two thicknesses therebetween. The posterior side of the lens may comprise a thickness within a range of about 10 microns to about 150 microns, 10 microns to about 100 microns, within about 10 microns to about 50 microns, or within a range of about 10 microns to about 25 microns. The posterior side of the lens may comprise a thickness within a range of about 25 microns to about 200 microns, about 25 microns to about 150 microns, about 25 microns to about 100 microns, or within about 25 microns to about 50 microns. The posterior side of the lens may comprise a thickness within a range of about 50 microns to about 200 microns, about 50 microns to about 150 microns, about 50 microns to about 100 microns. The posterior side of the lens may comprise a thickness within a range of about 100 microns to about 200 microns, about 100 microns to about 150 microns. The posterior side of the lens may comprise a thickness within a range of about 150 microns to about 200 microns.

The anterior side of the lens may comprise a thickness defined between an anterior surface of the contact lens body and an anterior surface of the inner cavity within a range of about 10 microns to about 200 microns, or within a range bounded by any two thicknesses therebetween. The anterior side of the lens may comprise a thickness within a range of about 10 microns to about 150 microns, 10 microns to about 100 microns, within about 10 microns to about 50 microns, or within a range of about 10 microns to about 25 microns. The anterior side of the lens may comprise a thickness within a range of about 25 microns to about 200 microns, about 25 microns to about 150 microns, about 25 microns to about 100 microns, or within about 25 microns to about 50 microns. The anterior side of the lens may comprise a thickness within a range of about 50 microns to about 200 microns, about 50 microns to about 150 microns, about 50 microns to about 100 microns. The anterior side of the lens may comprise a thickness within a range of about 100 microns to about 200 microns, about 100 microns to about 150 microns. The anterior side of the lens may comprise a thickness within a range of about 150 microns to about 200 microns.

The anterior thickness of the lens may be less than the posterior thickness of the lens. The posterior thickness of the lens may be less than the anterior thickness of the lens. The anterior thickness of the lens may be substantially the same as the posterior thickness of the lens. The anterior side of the lens may have a uniform thickness or a non-uniform thickness. The posterior side of the lens may have a uniform thickness or a non-uniform thickness.

The lens may comprise a total thickness defined between an anterior surface of the contact lens body and a posterior surface of the contact lens body within a range of about 20 microns to about 400 microns, or within a range bounded by any two thicknesses therebetween. The total thickness of the lens may be within a range of about 50 microns to about 400 microns, about 80 microns to about 350 microns, about 80 microns to about 250 microns, about 100 microns to about 300 microns, about 100 microns to about 400 microns, about 200 microns to about 400 microns, about 200 microns to about 300 microns, about 300 microns to about 400 microns.

The cavity may comprise a thickness defined between an anterior surface of the internal cavity and a posterior surface of the internal cavity within a range of about 0.5 microns to about 200 microns, or within a range bounded by any two thicknesses therebetween. The cavity may comprise a thickness within a range of about 5 microns to about 150 microns, about 15 microns to about 100 microns, about 15 microns to about 50 microns, about 25 microns to about 200 microns, about 50 microns to about 100 microns.

EXPERIMENTAL

The inventors conducted bench experiments and calculations to develop an accommodating contact lens. Development of the accommodating contact lens with an embedded cavity utilized a simulation and analysis approach based on COMSOL, MATHCAD, SOLIDWORKS and MATLAB. Table 2 shows the design parameters used in Example 1.

TABLE 2

Dimensions of the accommodating contact lens (Example 1)

|  | Refractive Index | Anterior Radius of Curvature (mm) | Posterior Radius of Curvature (mm) | Center Thickness (microns) | Diameter (mm) |
|---|---|---|---|---|---|
| Lens | 1.41 | 8.85 | 8.6 | 100 | — |
| Cavity | 1.34 | 8.75 | 8.7 | 50 | 3.6 |

It was found that the cavity developed a power of −0.70 D, since the refractive index of the cavity was less than that of the substrate. The power of the overall lens was simulated to be −0.93 D.

Table 3 shows the design parameters used in Example 2.

TABLE 3

Dimensions of an accommodating contact lens (Example 2).

|  | Refractive Index | Anterior Radius of Curvature (mm) | Posterior Radius of Curvature (mm) | Center Thickness (microns) | Diameter (mm) |
|---|---|---|---|---|---|
| Lens | 1.41 | 8.85 | 8.6 | 200 | — |
| Cavity | 1.34 | 8.75 | 8.0 | 50 | 3.6 |

It was found that the cavity developed a power of 0.0 D, since the refractive index of the cavity was less than that of the substrate. The power of the overall lens was simulated to be −0.23 D.

Lens power was simulated as a function of the depth of the cavity within the lens and also as a function of the posterior radius of curvature of the cavity.

Figure 20:
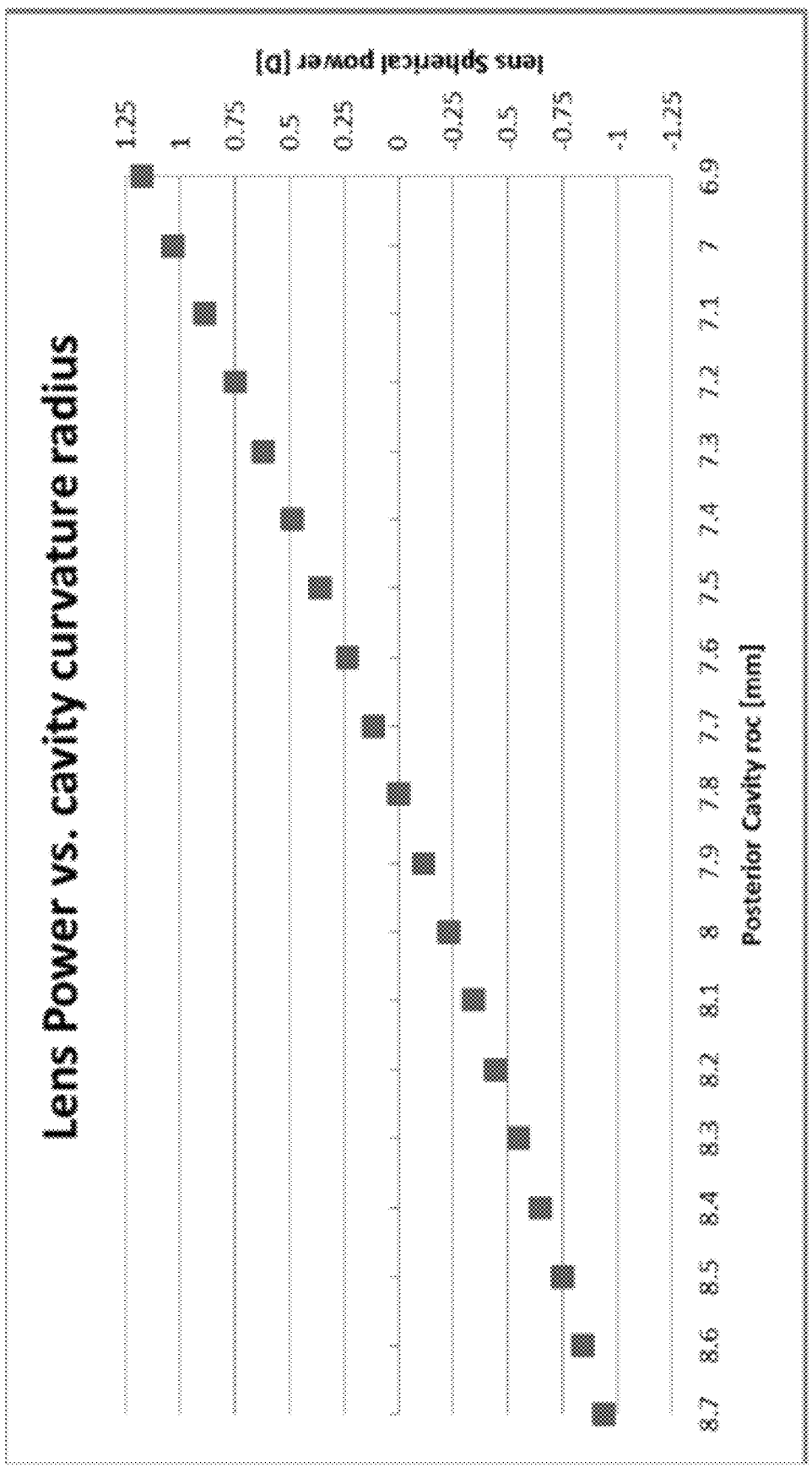
FIG. 20 shows simulated results of lens power as a function of the posterior radius of curvature of a cavity, in accordance with embodiments.

FIG. 20 shows simulated results of lens power as a function of the posterior radius of curvature of the cavity, in accordance with embodiments.

Spherical lens power (measured in D) was simulated with respect to the posterior radius of curvature (roc) of the cavity (measure in mm). Roc values from 8.7 to 6.9 mm induced spherical lens powers varying between −1 D and 1.25 D. Lens power was strongly dependent on the posterior curvature of the cavity. Curvature may be controlled by providing the insert as a curved film with a specified radius of curvature.

Figure 21:
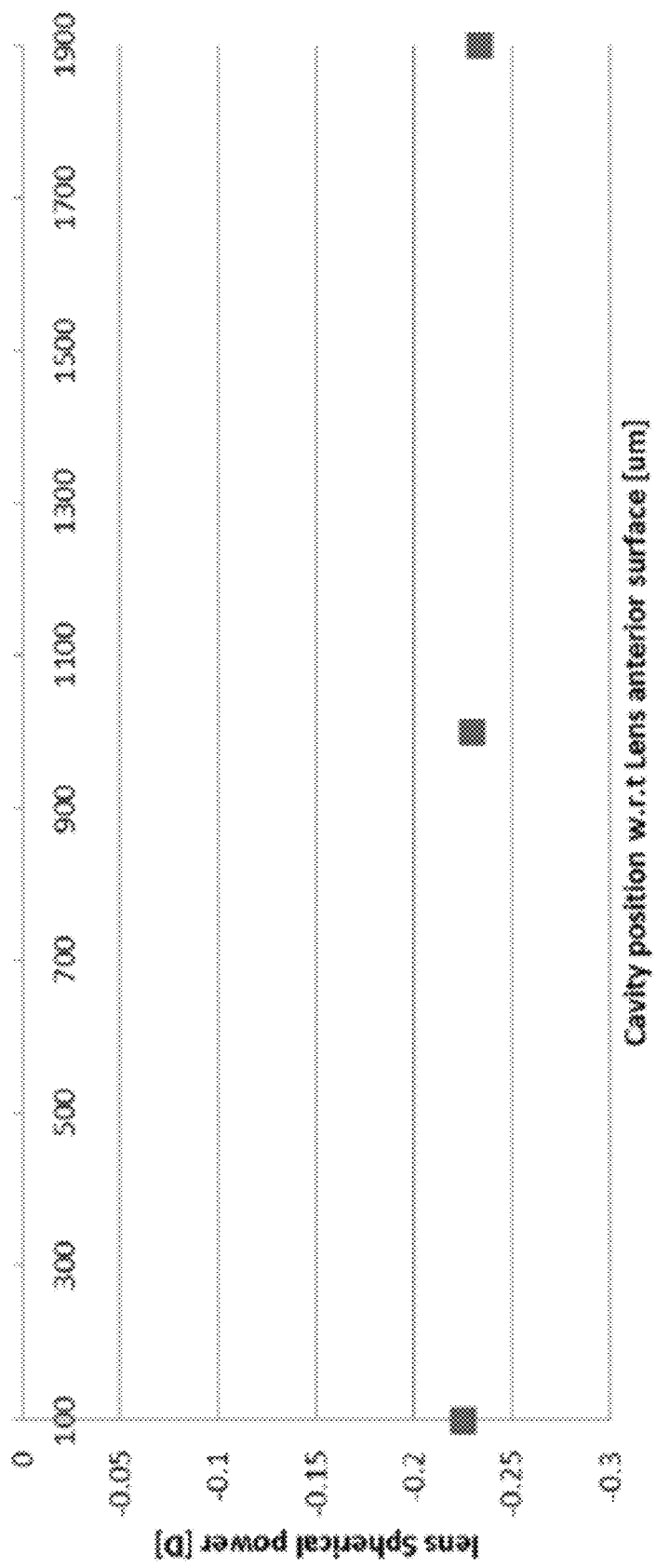
FIG. 21 shows simulated results of lens power as a function of cavity position within the lens, in accordance with embodiments.

FIG. 21 shows simulated results of lens power as a function of cavity position within the lens, in accordance with embodiments.

Spherical lens power was simulated as a function of a cavity position in the lens with respect to the lens anterior surface (distance measured in um). Cavity positions between 100 μm and 1900 μm were simulated to give spherical lens powers between −0.25 D and −0.2 D. It was found that the lens power was not very sensitive to the depth of the cavity in the lens, providing some relief on the tolerance of the z axis placement of the cavity inside the lens molding cavity.

It was further assumed that the tensile modulus of the hydrogel comprising the lens was 1 MPa, bulk modulus of saline was 2.08 GPA and density was 1000 Kg/m³. Simulations of inflation were performed for eyelid tensions from 10 Pa, 50 Pa, 250 Pa and 1000 Pa.

Table 4 provides the results of the simulations.

| Parameter | Values | | | |
|---|---|---|---|---|
| Pressure Applied by Lower Eyelid (Pa) | 10 | 50 | 250 | 1000 |
| Effective Pressure in Cavity (Pa) | 7 | 34 | 171 | 427 |
| Cavity Volume (mm³) | 1.543 | 1.543 | 1.543 | 1.543 |
| Fluid Volume Transferred (nL) | 12 | 61 | 301 | 748 |

The sag profile obtained through simulation shows that the enhanced sag profile is essentially spherical, with an add power of 3.0 D being achieved at 50 Pa of eyelid pressure.

Several lenses were cast for each of Examples 1 and 2. The insert was made of a biocompatible soluble uncrosslinked polyvinyl alcohol, called Solublon®, grade GA. This particular grade of Solublon® is soluble in cold water and studies of dissolution of Solublon® in water at room temperature showed that the polymer film dissolved without initially swelling, which is helpful because swelling of the insert prior to its dissolution may cause the cavity to expand, which may result in fracture. Other biocompatible water soluble polymers that may be used in accordance with embodiments include polyvinyl alcohol, polyvinyl acetate, polyethylene oxide, propylene oxide, copolymers of ethylene and propylene oxides (Pluronic acids), poly vinyl pyrollidone, polyethylene imines, polyacrylamides, and polysaccharides.

The insert may be made from a single material or a blend of polymers with different dissolution rates, in order to control the rate of formation of the cavity through dissolution of the material comprising the insert. Solutes may be dissolved or blended into the material comprising the insert prior to forming the insert. The solutes may have a molecular weight such that diffusion of the solutes through the boundary of the cavity and permeation through the lens body may be controlled.

The insert may be formed using methods including thermoforming, compression molding, or solution casting. The surface of the insert may be coated to alter and control the diffusion of solvent and other solutes across the boundary of the cavity. For example, the insert may be coated with a solution of cross-linking agent or a photocuring catalyst in order to develop a gradient of cross-linking densities and cure rates starting at the surface of the insert.

In one embodiment, an accommodating contact lens was cast from a hydrogel of water content 32%, formed by photo-polymerizing and cross-linking a zero expansion formulation. Alternative embodiments may include a lens cast from a hydrogel of water content within a range of about 28% to 65%. The polymerized lens material may comprise one or more of a monomer or an oligomer, a homopolymer, or a low expansion polymer. Other polymers may be used in accordance with embodiments, including a silicone hydrogel copolymer. Curing methods are not limited to photo-polymerization and may include any appropriate method for the chosen contact lens polymer and may include catalysts or reactants.

FIGS. 22A-22B show casting cups used to cast an accommodating contact lens, in accordance with embodiments. In the present embodiment, the monomer was placed in a mold cavity formed as shown in FIGS. 22A-22B. A benefit of the insert described herein is that previously known molds may also be used to cast a lens comprising an internal cavity.

The lower mold that forms the anterior surface of the lens was held by a fixture. A small amount (~10 μL) of monomer was delivered into the lower cup from a syringe that was lowered by a fixture along the center of the mold, under nitrogen gas. The resin was partially cured, then the insert, held at the tip of a vacuum forceps was vertically lowered into the resin layer in the lower cup along the center of the lower mold. The fixture was subsequently lifted up, then used to lower the syringe filled with additional monomer in order to deliver the rest of the monomer required to form the lens. The syringe was lifted back up after delivering monomer, and the same fixture was used to bring the upper mold down along the same vertical (z) axis. The two molds were gently engaged and pressed shut. The design of the mold rims and their diameters are critical in ensuring that the molds form a closed cavity through a press-fit, without disturbing the surface of the monomer or forming bubbles.

The mold assembly was then cured under long wave length UV light (390 nm), until polymerization was complete. The molds were then opened, and the lens adhering to the lower mold was then immersed in saline and sonicated to de-mold the lens. The de-molded lens was hydrated for a period between 2-6 hours, and then washed in a dilute (0.01M) NaOH in deionized water for a period ranging from 2-6 hours. The lens was then placed back into saline and hydrated by immersing in saline for a period from 6-24 hours. The saline solution was replenished at least one additional time before hydration was complete.

Figure 23A:
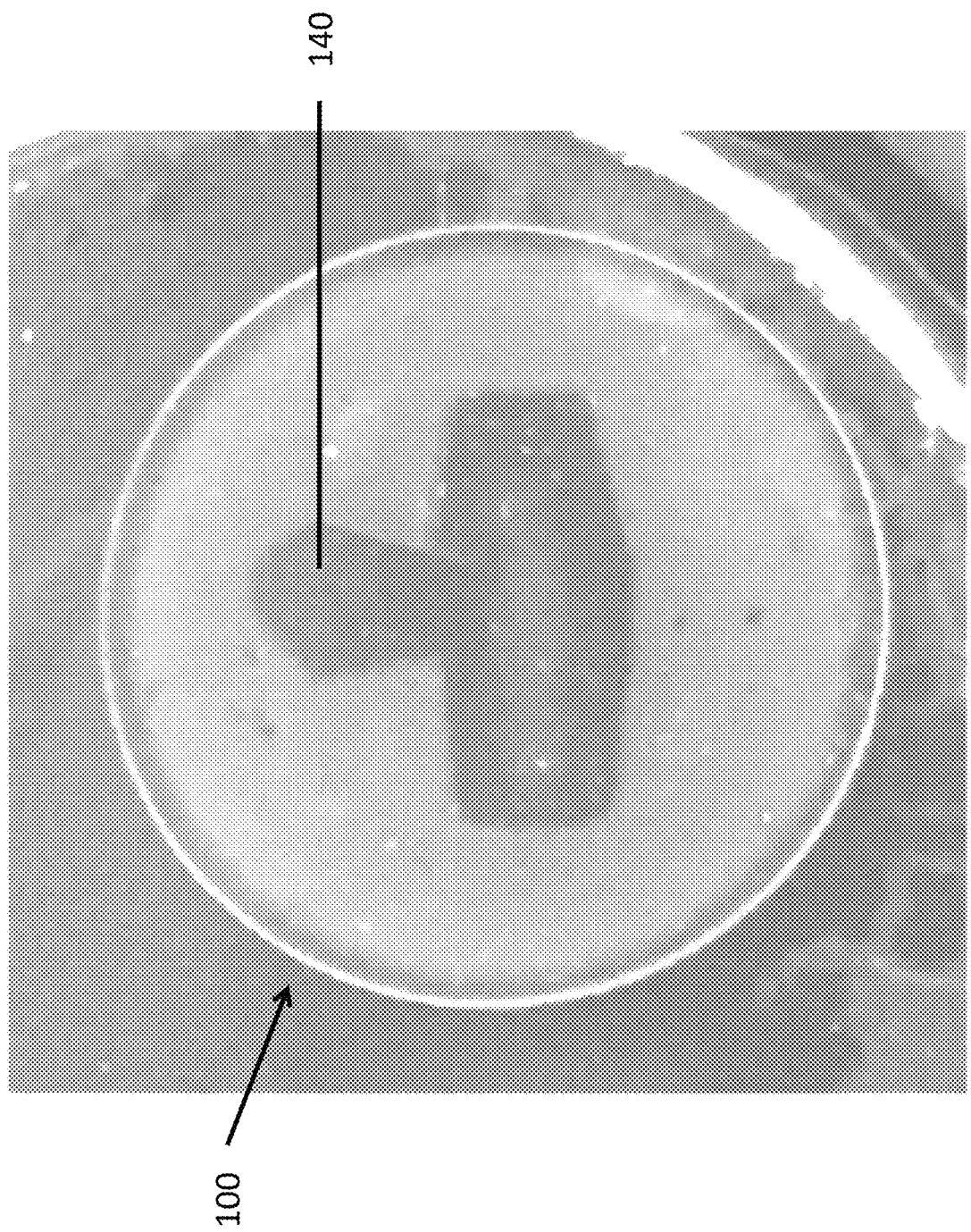
FIG. 23A shows an accommodating contact lens after 2 hours of hydration in 0.9% saline and 1.5 hours of sonication, in accordance with embodiments.
Figure 23B:
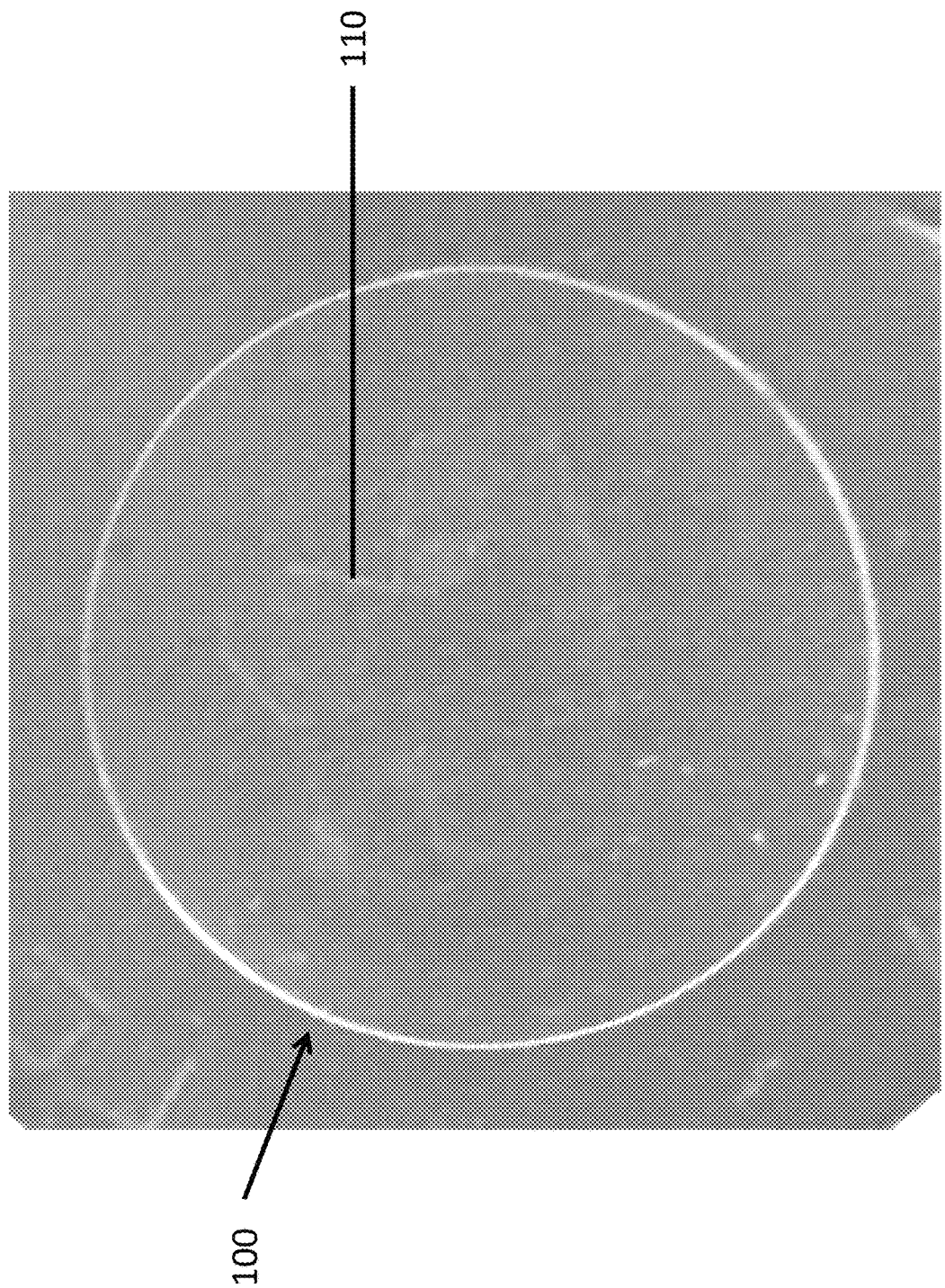
FIG. 23B shows an accommodating contact lens after hydrating overnight, in accordance with embodiments.

FIGS. 23A-23B shows progress of hydration and gradual dissolution of the insert 140 to form the cavity 110.

FIG. 23A shows a contact lens 100 after two hours of hydration in 0.9% saline and 1.5 hours of sonication. The contact lens 100 has begun to hydrate with the insert 140 still visible inside said lens.

FIG. 23B shows a contact lens 100 after overnight hydration whereby the lens 100 has become fully hydrated and the insert 140 has dissolved to form cavity 110.

Figure 24:
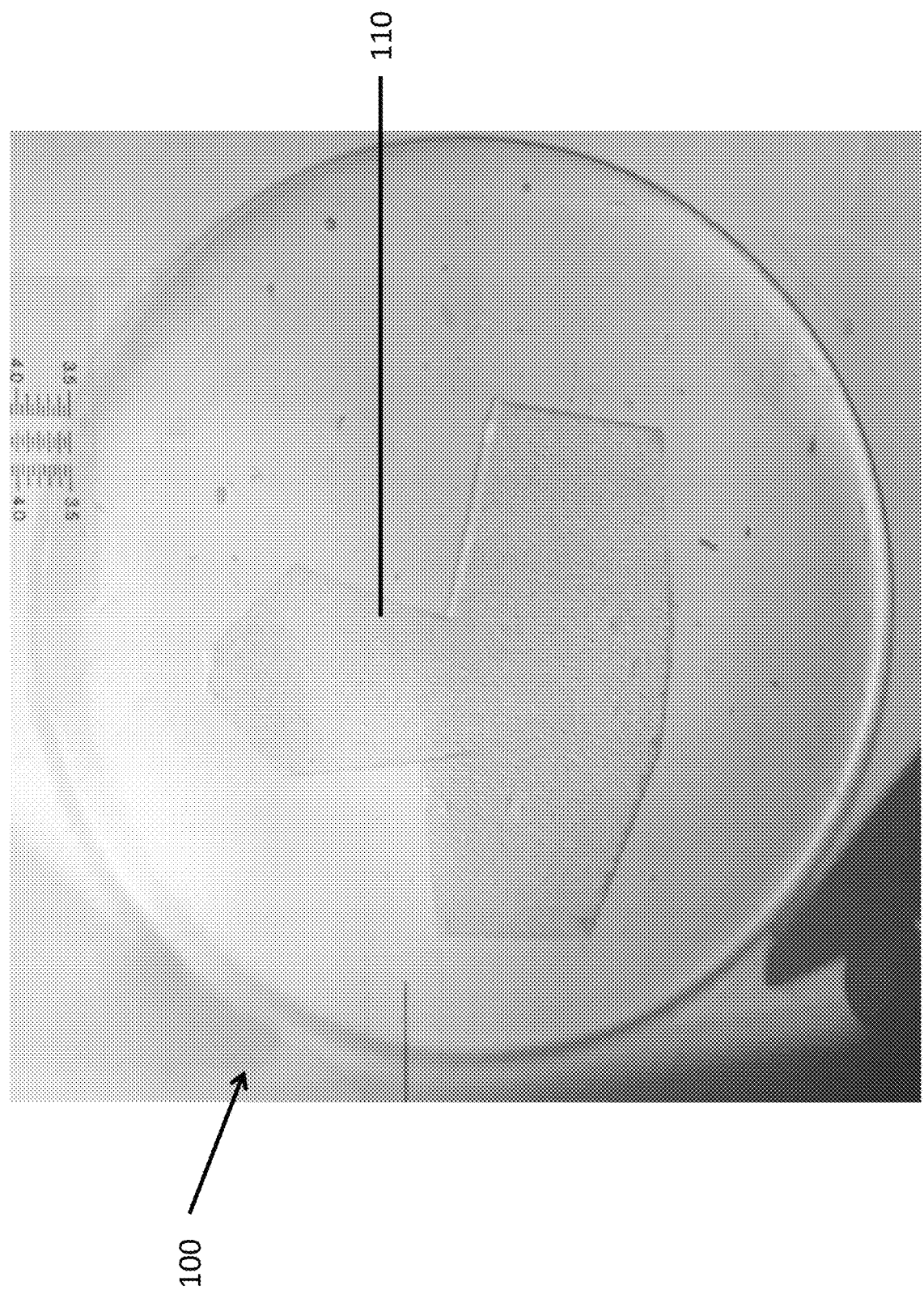
FIG. 24 shows an accommodating soft contact lens with an embedded cavity under bright-field microscopy, in accordance with embodiments.

FIG. 24 shows a fully hydrated soft contact lens 100 under bright field microscopy. The hydrated lens 100 comprises an embedded cavity 110 remaining where the insert 140 was, following gradual dissolution of the insert.

Table 5 reports data on the thickness of various layers in the accommodating contact lens with an embedded cavity.

TABLE 5

Lens thickness profiles.

| Layer | Thickness (microns) |
|---|---|
| Anterior Hydrogel Layer | 64 |
| Cavity (Insert Thickness: 75 microns) | 88 |
| Posterior Hydrogel Layer | 82 |
| Total Lens Thickness (As Sum of All Layers) | 234 |
| Total Lens Thickness (As Measured) | 215 |

The target thickness of the accommodating contact lens was 200 microns, so there is satisfactory agreement between target and actual thicknesses.

Figure 25:
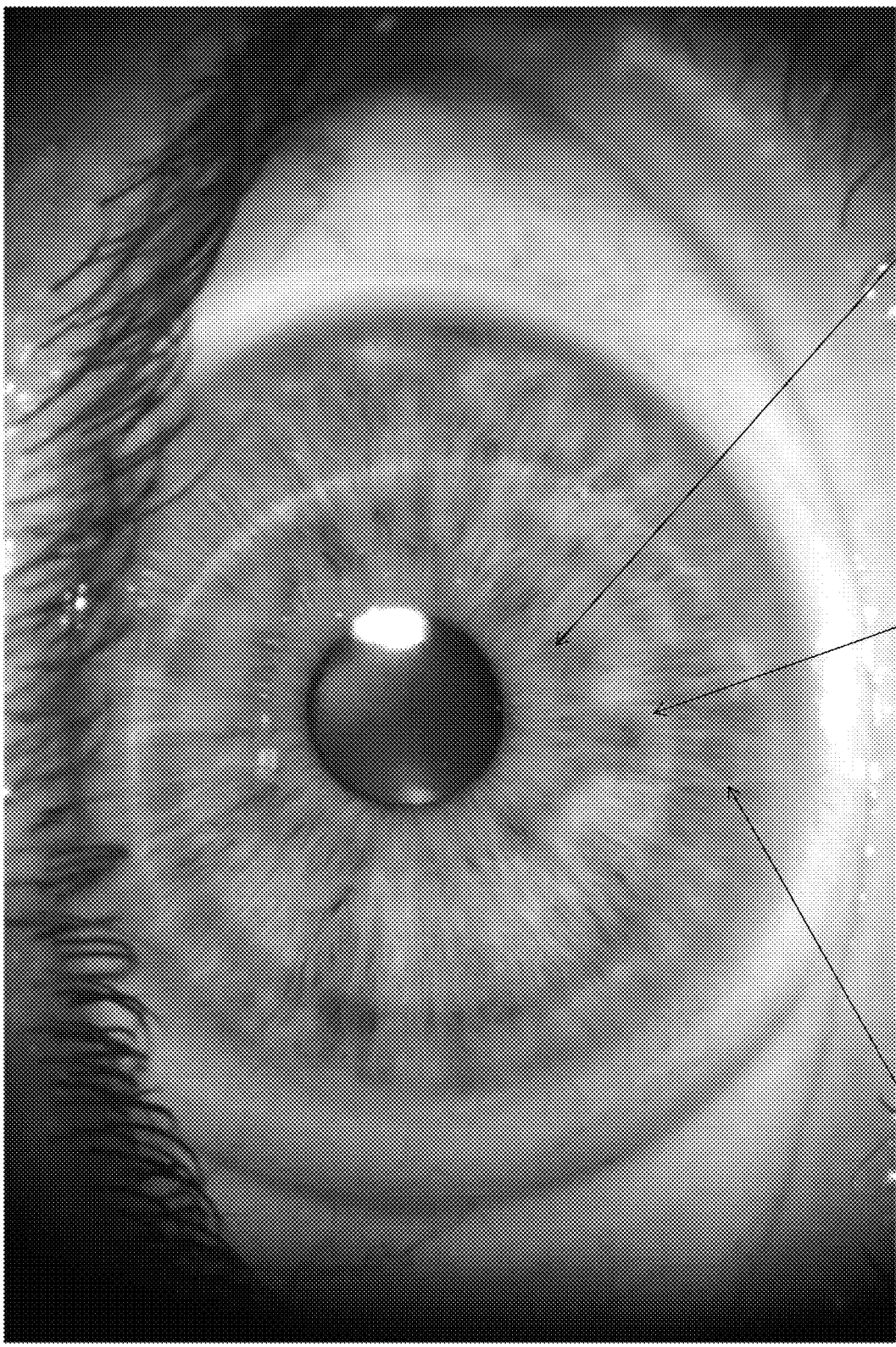
FIG. 25 shows an accommodating soft contact lens comprising a cavity on eye, in accordance with embodiments.

FIG. 25 shows an accommodating soft contact lens comprising a cavity on eye (Example 3). The cavity was formed by the dissolution and diffusion of a Solublon®, grade GA, insert through the lens body material comprising HEMA. The cavity is shaped similarly to the embodiment of FIG. 12 with an inner optical chamber 114, a first outer chamber 116a, a second outer chamber 116b, and one or more channels there between (not labeled), as shown in FIG. 12. The chambers 114, 116a, 116b boundaries of the cavity are barely visible on the eye, indicating a high level of clarity and optical quality of the lens after hydration and dissolution of the insert material.

Figure 26:
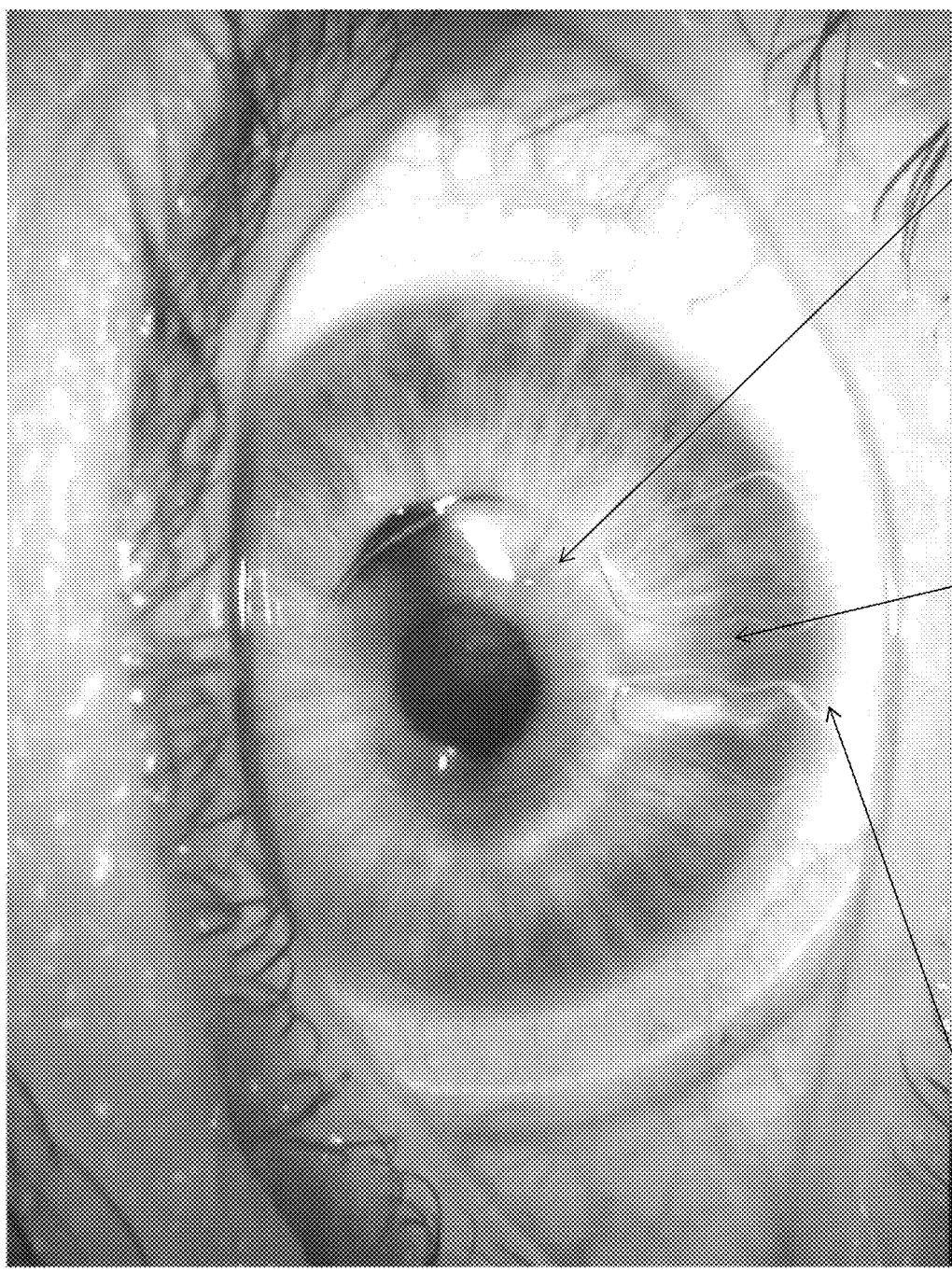
FIG. 26 shows an accommodating soft contact lens comprising an inked cavity on eye, in accordance with embodiments.

FIG. 26 shows an accommodating soft contact lens comprising an inked cavity on eye (Example 4). The lens was formed similarly to the lens in FIG. 25 but a dye has been added to the cavity to increase contrast and allow for direct visualization of the cavity on the eye. Some artifacts of the molding process can be seen (such as the bubbles near the peripheral chambers 116a, 116b). Based on the teachings provided herein, a person of ordinary skill in the art can construct lenses without such artifacts, and this image was provided to show structures of the contact lens that would not normally be visible. The central reservoir 114 and outer chambers 116a, 166b are well-situated on the eye to provide accommodation with changes in gaze. The inner (central) reservoir 114 lies over the optical center portion of the eye. Rapid, repeated blinking did not disturb the location of the cavity relative to the optical portion of the eye, indicating that the lens is stably located on the surface of the eye. The first outer (peripheral) chamber 116a and the second outer chamber (116b) are located above the lower lid of the eye and therefore does not provide any added optical power to the inner optical chamber 114 when the eye and contact lens are in a far vision configuration. Alterations of the gaze may engage the outer chambers 116a, 116b with the lower eyelid to provide intermediate and near vision correction as described herein.

Figure 27:
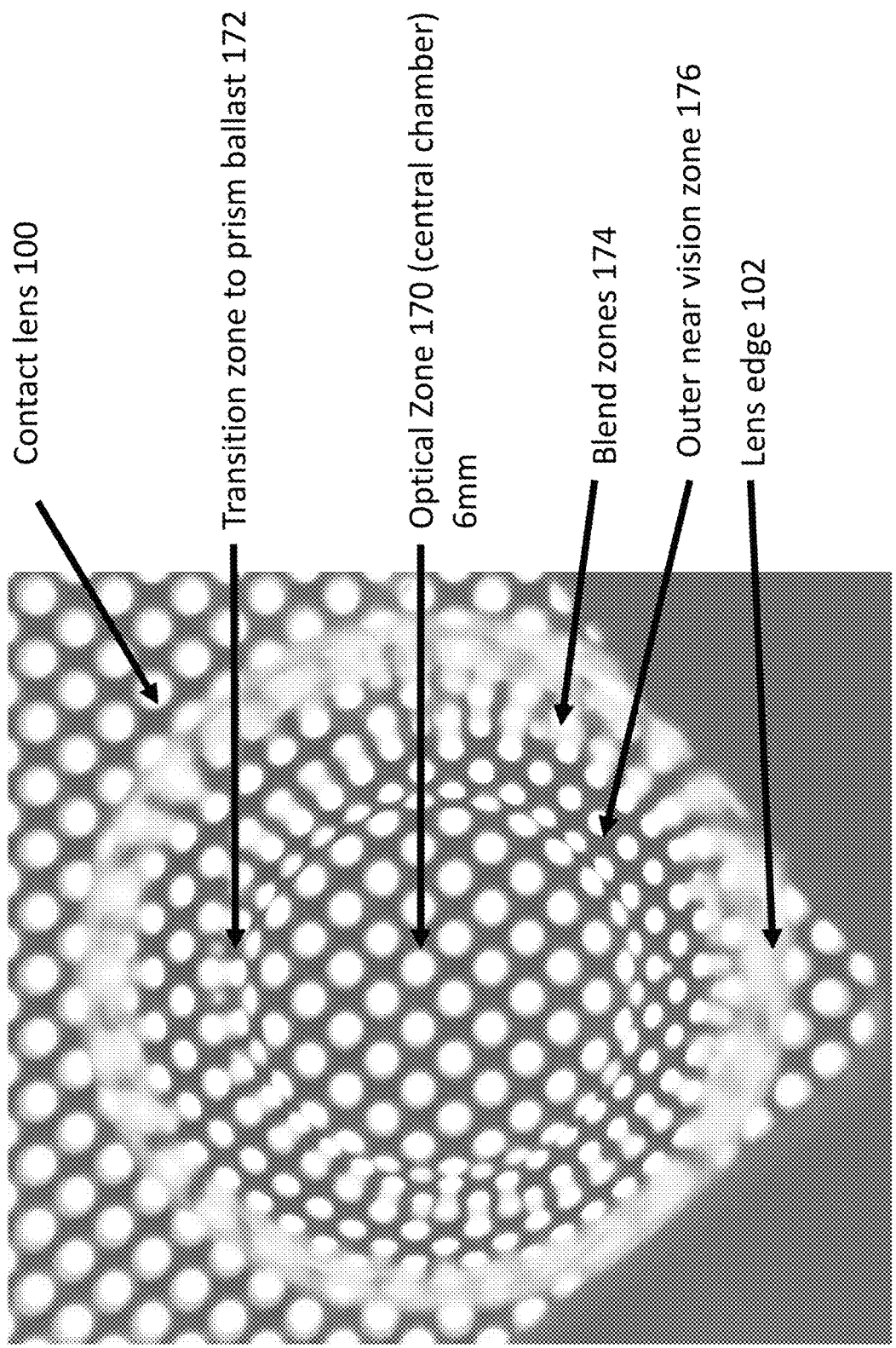
FIG. 27 shows a lens power measurement test for an accommodating soft contact lens, in accordance with embodiments.

FIG. 27 shows a lens power measurement test for an accommodating soft contact lens with an inflated inner chamber as described herein. The lens 100 was formed similarly to the lenses in examples 3 and 4 described previously. Light in the form of a grid of dots was passed through lens 100 in order to determine the power of the lens 100 at various locations within the lens body. The dot size inside the lens was compared to the dot size outside the lens in order to determine the optical power changes of the lens, with the dots size outside the lens corresponding to 0 D of optical power. The ratio of dot sizes and spacing of the dots from each other is directly related to the optical power. For example, if a dot inside the lens is twice the size of a dot outside the lens, then the power of the lens is 2 D. If a dot inside the lens is half the size of a dot outside the lens, the power of the lens is −2 D. Non-spherical dots indicate prism in the lens, which can be related to astigmatism of the lens.

The lens 100 comprises distinct zones of optical power. The center of the lens comprises an optical zone 170 as described herein. The optical zone 170 is substantially circular and has a diameter of about 6 mm. Around the optical zone 170 is a transition zone 172 which appears as squashed dots that may indicate prism. The next ring zone comprises an outer near vision zone 176 which may comprise a prism ballast to stabilize the lens, for example with reference to the rotationally stable contact lens design of FIG. 6. The outer edge of the lens 102 comprises blend zones 174 which lose focus and optical power compared to the central regions of the lens. The dot size in the outer near vision zone 176 is about half the size of the dots outside the lens, indicating that the outer near vision zone 176 has an optical power of about −2 D. The dots inside the optical zone 170 are spaced similarly to the dots outside the lens and correspond to an optical power of about 0 D, which is about +2 D as compared to the dots in the outer near vision zone 176. The optical power of about 0 D with inflation would allow a near sighted wearer to see up close. Thus the lens with the inflated inner optical chamber is a multifocal lens with both near and far vision zones with a transition zone 172 extending therebetween and a well formed central optical zone 170. When the chamber deflates, the optical power of the inner optical zone would change to about −2 D and provide far vision correction with the central optical zone 170. Although the lens is shown with reference to a spherical lens to correct −2 D of spherical refractive power, other lenses with other optical powers and astigmatism correction can be manufactured and tested as described herein.

The lens comprises a low amount of astigmatism or prism in the transition zone 172. Prism in the transition zone may be related to the rate of change in the radius of curvature (roc) of the different lens regions. A ballast lens design may provide a reduced rate of change of the roc leading to reduced differences between radial and sagittal curvature one moves radially outward from the center of the lens. The lens may be substantially radially symmetric as defined by a ballasted back curve and the insert used to form the cavity. The insert may for example have a tapered edge in order to decrease the rate of change of the roc and inhibit the formation of prism near the boundary of the cavity. Alternatively or in combination, the amount of prism in the lens may be reduced by the formation of a graded refractive index with a refractive index gradient extending between the cavity and lens body as described herein. A refractive index gradient may inhibit prism related to an abrupt change in refractive index at the boundary of the cavity.

Figure 28A:
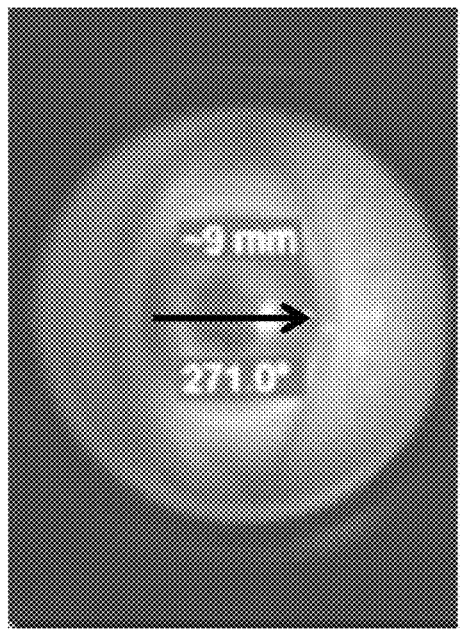
FIG. 28A shows the accommodating soft contact lens of FIG. 26 on eye, in accordance with embodiments.
Figure 28B:
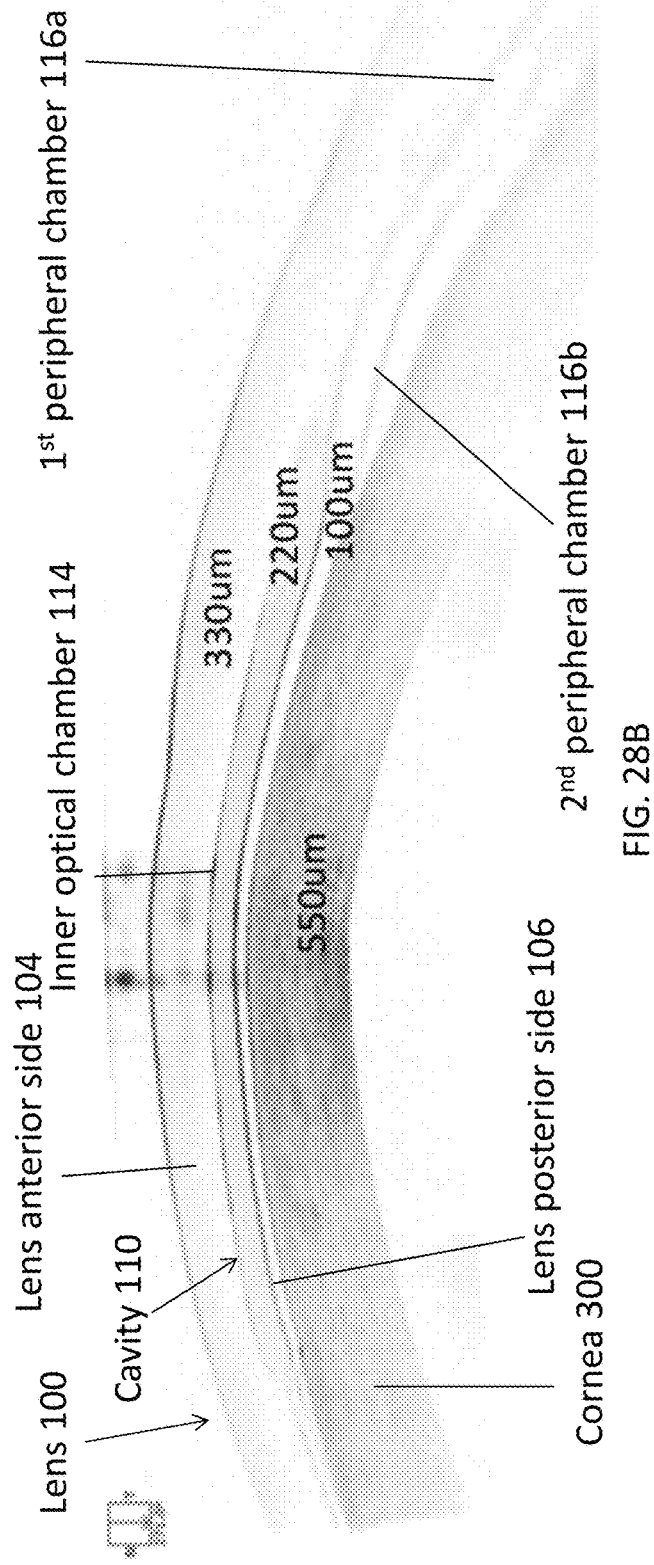
FIG. 28B shows an optical coherence tomography (OCT) cross-section of the contact lens of FIG. 28A, in accordance with embodiments.

FIGS. 28A-28B show the accommodating soft contact lens of FIG. 26 on eye. Optical coherence tomography (OCT) was used to generate a cross-sectional image of the lens and surface of the eye along the line indicated in FIG. 28A. FIG. 28B shows an OCT cross-section of the contact lens 100 with the thicknesses of various parts of the lens 100 highlighted. The cavity 110 was formed with a thickness of about 220 um, which corresponded to the thickness of the insert used to form the cavity 110. The cavity 110 is defined as the space between a posterior side 106 of the lens 100 and an anterior side 104 of the lens 100. In this embodiment, the thickness of the anterior side 104 of the lens 100 is about 330 μm and the thickness of the posterior side 106 of the lens 100 is about 100 μm. The lens 100 sits atop the cornea of the eye 290 which has a thickness of about 550 μm. In many embodiments, the thickness of the anterior hydrogel layer 104 may be different from the thickness of the posterior hydrogel layer 106 of the lens 100. The thickness of the anterior surface 104 of the lens may be more than the thickness of the posterior surface 106 of the lens, as shown in FIG. 28B, for example to inhibit distortion of the anterior surface of the lens when the contact lens is in a presbyopia-correcting near vision configuration and the inner optical chamber of the cavity is inflated to increase optical power.

The thickness of the anterior surface 104 of the lens may be less than the thickness of the posterior surface 106 of the lens, for example to facilitate deflection of the anterior surface 104 of the lens when the contact lens is in a presbyopia-correcting near vision configuration and the inner optical chamber of the cavity 110 is inflated to increase optical power. The thickness of the anterior surface 104 of the lens may be less than the thickness of the posterior surface 106 of the lens such that inflation of the inner optical chamber of the cavity 110 leads to deflection of the anterior and posterior surfaces 104, 106, wherein the anterior surface 104 deflects more than the posterior surface 106 with inflation to correct presbyopia. In many embodiments, the thickness of the anterior side 104 of the lens is at least about 50 microns. In many embodiments, the thickness of the anterior side 104 of the lens is no more than about 100 microns. In many embodiments, the thickness of the posterior side 106 of the lens is at least about 100 microns. In many embodiments, the thickness of the posterior side 106 of the lens is no more than about 200 microns.

Figure 29:
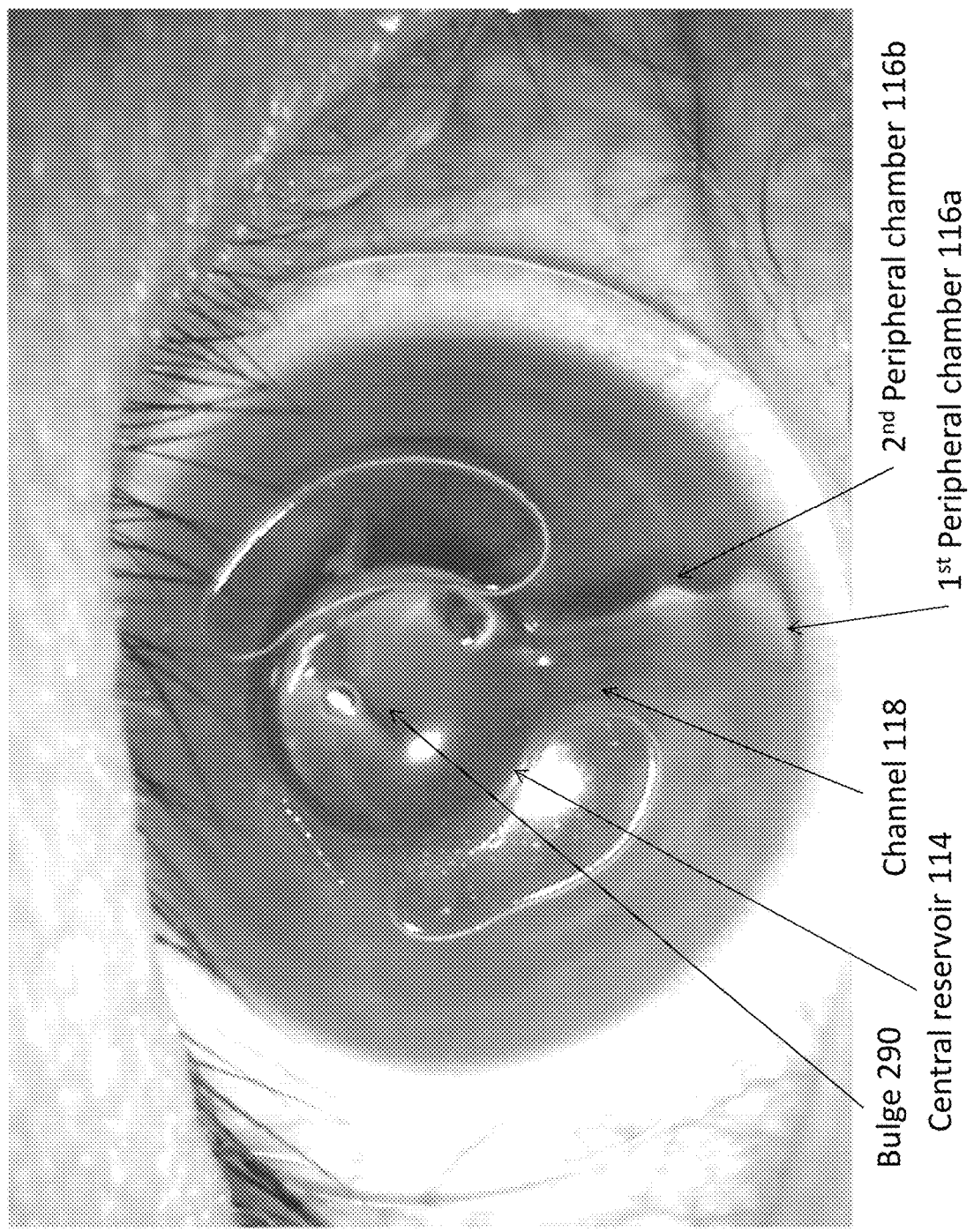
FIG. 29 shows an accommodating soft contact lens comprising a cavity with central bulging on eye, in accordance with embodiments.

FIG. 29 shows an accommodating soft contact lens comprising a cavity with central bulging on eye (Example 5). The lens was formed similarly to the lenses in examples 3 and 4. A Solublon® was used to form a cavity inside a lens material comprising HEMA. Upon hydration of the lens, the Solublon® insert was degraded and the soluble components were allowed to diffuse out of the lens body to form the cavity. Solublon® comprises a copolymer of PVA. As described herein, PVA polymer chains may retain some amount of residual acetate, for example within a range from about 1% to about 20% depending of the extent and efficiency of hydrolysis of PVAc. At least a portion of the solubilized Solublon® material may comprise vinyl groups comprising acetate which is only partially soluble or insoluble and unable to diffuse through the pores of the HEMA lens body as described herein. The residual insert material may lead to changes in osmotic pressure in the cavity and expansion of the cavity as water flows into the cavity during hydration to create a bulge 290 as shown in example 5. The extent of bulging and the osmotic pressure of the cavity may be adjusted by changing the acetate content in the PVA insert material. The pressure of the cavity was relieved after about 1 to 2 days and may have contributed to a refractive index gradient within the cavity, which may in turn contribute to the low prism in the optical zone observed in FIG. 27, as described herein. The insert material can be configured in many ways as described herein in order to provide limited amounts of swelling that inhibit distension of the contact lens body defining the cavity during hydration, and which provide suitable osmolality of the cavity as described herein.

Figure 30A:
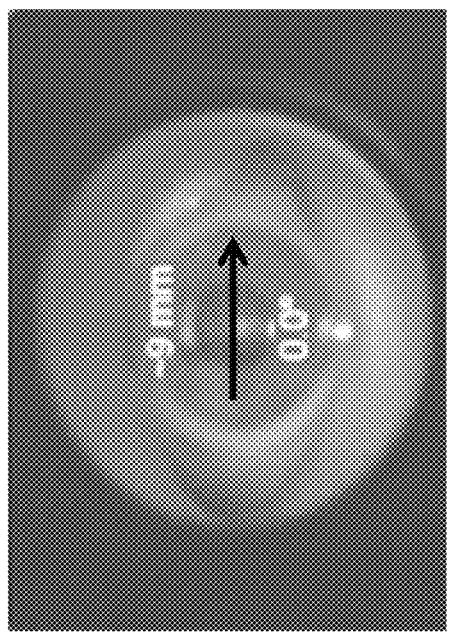
FIG. 30A shows the accommodating soft contact lens of FIG. 29 on eye, in accordance with embodiments.
Figure 30B:
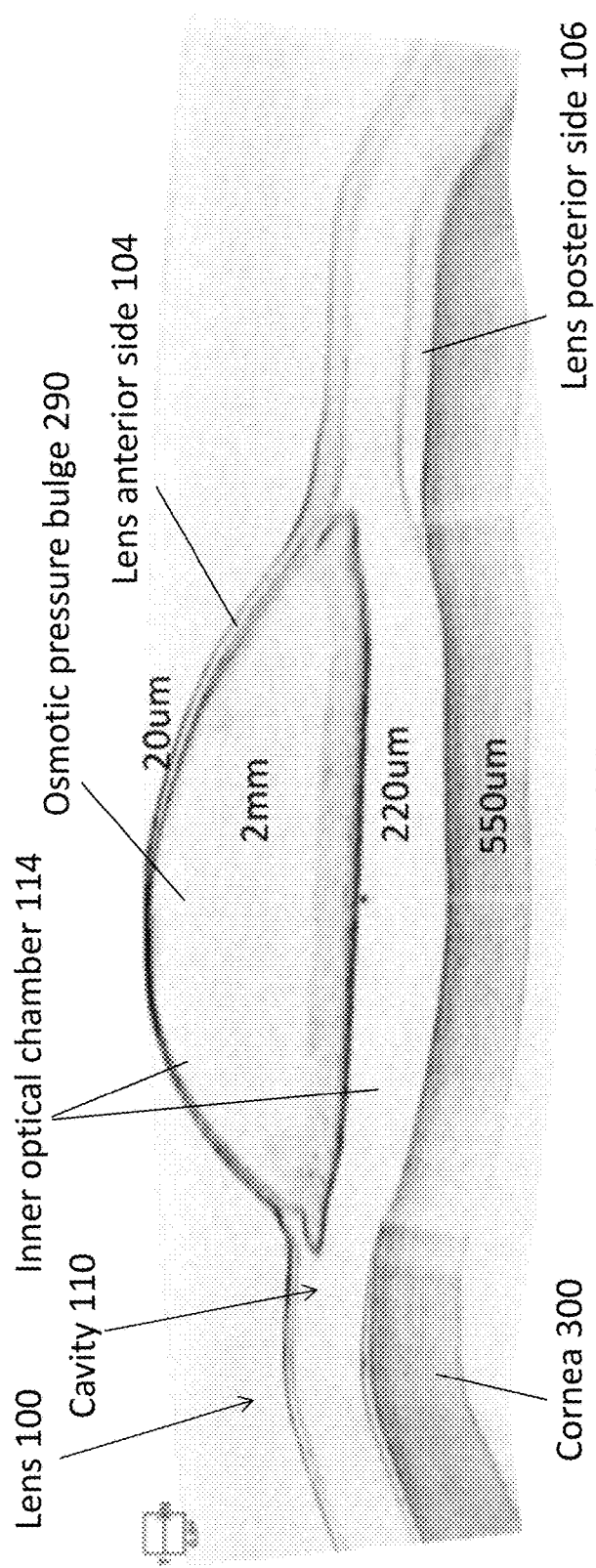
FIG. 30B shows an OCT cross-section of the contact lens of FIG. 30A, in accordance with embodiments.

FIGS. 30A-30B show the accommodating soft contact lens of FIG. 29 on eye. OCT was used to generate a cross-sectional image of the lens and surface of the eye along the line indicated in FIG. 30A. FIG. 30B shows an OCT cross-section of the contact lens 100 with the thicknesses of various parts of the lens 100 highlighted. The cavity 110 was formed with a thickness of about 220 um, which corresponded to the thickness of the insert used to form the cavity 110. In this embodiment, degradation of the Solublon® within the cavity during hydration increased the osmotic pressure of the inner optical chamber 114, as described herein, and resulted in an osmotic pressure bulge with a thickness of about 2 mm between inner anterior and posterior surfaces 104, 106 of the lens defining the cavity. The bulge 290 stretched the lens anterior side 104 to about 20 μm thick near the thickest part of the bulge 290. The osmotic pressure relieved itself after 1-2 days and the bulge 290 receded to form the cavity 110 comprising a refractive index gradient with low prism in the optical zone as described herein.

Several lenses were cast for each of Examples 3, 4, and 5. An insert for each lens was made of a biocompatible soluble uncross-linked polyvinyl alcohol, called Solublon®, grade GA, as described herein. Solublon® grade GA is a copolymer of vinyl alcohol and vinyl acetate and dissolves rapidly in cold water. Other biocompatible water soluble polymers that may be used in accordance with embodiments include polyvinyl alcohol, polyvinyl acetate, copolymers of vinyl acetate and vinyl alcohol (e.g. poly[(vinyl alcohol)-co-(vinyl acetate)] or PVA/Ac), polyethylene oxide, propylene oxide, polyethylene glycols (PEGs) in the molecular weight range of about 600 g/mol to about 6000 g/mol, copolymers of ethylene and propylene oxides (Pluronic acids), poly vinyl pyrollidone, polyethylene imines, polyacrylamides, and polysaccharides. The water soluble insert may comprise hydrophilic ionic polyacrylates or polymethacrylates or copolymers thereof. The carboxylate groups pendant on the polymer can be ionized, binding to divalent or trivalent metal ions as counter-ions, and these carboxylate groups may also be used to form water soluble polymer films. Metal ions may form ionic cross-links that are water sensitive, and are opened in water of a particular pH, depending on the ionization constants of the polymer bound carboxylate groups, for example. The insert was shaped to create a cavity with an inner optical chamber, a first outer chamber, a second outer chamber, and one or more channels there between, as shown in FIG. 12.

Figure 31:
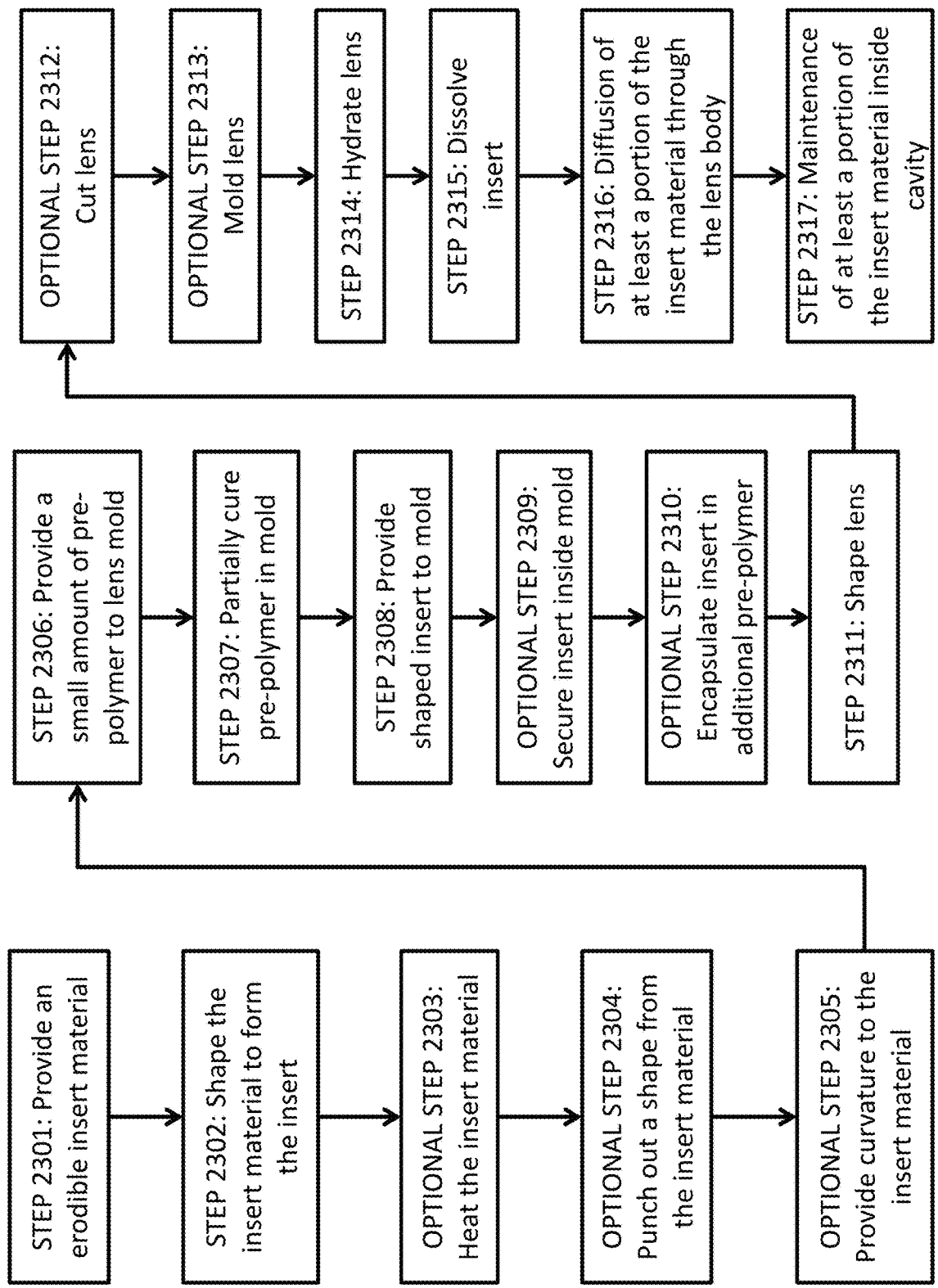
FIG. 31 shows a method of manufacturing a contact lens comprising a cavity, in accordance with embodiments.

FIG. 31 shows a method of manufacturing a contact lens comprising a cavity, in accordance with embodiments.

At Step 2301, an erodible insert material may be provided. The erodible insert material may be any of the insert materials described previously herein. The insert material may be formulated such that the insert can survive heat or UV curing processes.

At Step 2302, the insert material may be shaped to form the insert. Shaping may comprise one or more optional steps which may include heating (Step 2303), punching out a shape from the insert material (Step 2304), or providing a curvature to the insert material (Step 2305). For example, a desired shape may be punched out of a solid insert material then heated while laying on a sphere with the desired lens base curve.

At Step 2306, a small amount of lens pre-polymer may be provided to a mold.

At Step 2307, the pre-polymer may be partially cured to form a bed for the insert.

At Step 2308, the shaped, solid, erodible insert may be provided to the partially-cure polymer.

At Step 2309, the insert may be optionally secured to the partially-cured polymer base by providing a drop of polymer to the insert and flash curing it into position.

At Step 2310, additional pre-polymer may be added to the mold to encapsulate the insert.

At Step 2311, the lens may be shaped. Shaping the lens may comprise one or more steps including cutting (Step 2312) or molding (Step 2313).

At Step 2314, the lens may be hydrated.

At Step 2315, the insert may dissolve.

Hydration of the lens and degradation of the insert material may occur at different rates. For example, the lens material may hydrate faster than the insert material dissolves and thereby restrict the expansion of the lens material, for example HEMA, into the cavity. The lens material may instead expand outward to form a full-sized contact lens with little to no aberrations or disruptions to the cavity.

At Step 2316, at least a portion of the insert material may diffuse through the lens body.

At Step 2317, at least a portion of the insert material may remain inside the cavity.

The insert material may for example comprise Solublon® as described herein. Degradation of the Solublon® material into its components may generate a plurality of polymer chains. At least a portion of the polymer chains may comprise acetate which is hydrophobic and does not dissolve in water. At least a portion of the polymer chains may comprise alcohol which is hydrophilic and does dissolve in water. The dissolved components may diffuse through the hydrophilic lens material, for example HEMA, and be released from the cavity. When the concentration of acetate on each polymer chain is high enough, for example more than about 3% or 4% of pendant groups, the hydrophobic moieties on the polymer chains may be repelled by the HEMA, resulting in a residual amount of insert material inside the cavity after hydration of the lens. The residual insert material may lead to changes in osmotic pressure in the cavity and expansion of the cavity as water flows into the cavity during hydration. The pressure of the cavity may be relieved when the cavity is in balance with the HEMA. The composition of the insert material may be modified to adjust the amount of osmotic pressure and/or residual material of the cavity, for example by modifying the ratio of hydrophobic pendant groups to hydrophilic pendant groups of the polymer.

The insert may for example comprise a substance, for example a cross-linking agent, which may be used to modify the characteristics of the cavity. The density of the lens material may be modified depending on the desired lens characteristics. The cross-link density of the lens material may be modified depending on the desired lens characteristics, for example to alter pore size of the lens.

Although the steps above show a method of providing a contact lens with a cavity using an erodible insert in accordance with embodiments, a person of ordinary skill in the art will recognize many variations based on the teachings described herein. The steps may be completed in a different order. Steps may be added or deleted. Some of the steps may comprise sub-steps. The steps may be repeated to provide a contact lens or an insert as described herein.

FIGS. 33A-33B show diffusion of a low molecular weight dye out of the lens cavity. A lens 100 comprising a cavity 110 was formed as described herein and a low molecular weight dye was added to the cavity 110 to act as a surrogate for the insert material in order to monitor the effect of molecular size of the insert material on the rate of diffusion/extraction out of the lens body. The dye had a molecular weight of 242 g/mol and was water soluble. The lens comprising the dye was immersed in a PBS hydrating solution 340 and diffusion from the cavity was monitored by observing the change in the color of the solution surrounding the lens. FIG. 33A shows the lens 100 prior to immersion in the extraction or hydrating solution 340 (e.g. at 0 hours). The cavity 110 appears dark due to the presence of the dye. FIG. 33B shows the lens 100 after 24 hours incubation in the extraction solution 340. The dye diffused out of the cavity 110 into the extraction solution 340, thus the extraction solution 340 appears darker in FIG. 33B than in FIG. 33A due to the presence of the dye.

FIGS. 34A-34F show diffusion of two different molecular weight dyes out of lens cavities. Lenses 100a and 100b were imbued with low molecular weight dyes within their cavities 110a and 110b, respectively, and the rate of diffusion was qualitatively assessed by monitoring the color of the extraction solution 340 as described in FIGS. 33A-33B. FIGS. 34A-34C show a lens 100a comprising a dye with a molecular weight of 242 g/mol within cavity 110a. FIG. 34A shows the lens prior to incubation in the PBS extraction solution 340. FIGS. 34B and 34C show the lens 100a and extraction solution 340 after 5 hours incubation. The extraction solution 340 as well as the lens body have begun to darken as the dye has diffused through the lens body and into the extraction solution. FIGS. 34D-34F show a lens 100b comprising a dye with a molecular weight of 872 g/mol within cavity 110b. FIG. 34D shows the lens prior to incubation in the PBS extraction solution 340. FIGS. 34E and 34F show the lens 100b and extraction solution 340 after 5 hours incubation. Most of the dye remained in the cavity 110b after 5 hours, thus the extraction solution 340 had little color change. The results of FIGS. 34A-34F show that the size of the insert material may affect the rate at which the insert material is able to diffuse out of the lens body to form the cavity. Extraction of the insert material from the lens may alternatively or in combination depend on the permeability of the lens material, the polarity of the lens material, and/or the polarity of the insert material.

Extraction of insert material may be aided by altering the composition, temperature, and/or movement of the extraction solution 340. Some of the possible combinations of these parameters were tested. Saline concentrations between about 0.9% and about 25% were tested, as well as temperatures between about 25 C to about 65 C. Saline was tested in combination with isopropanol ad other organic solvents. In some experiments, the extraction was carried out by alternating saline and saline with organic solvents at different time intervals to generate a chemical pump effect to extract the insert material from the cavity. A medium-pressure circulating machine was used in multiple experiments with different solvents and different temperatures to further aid in extraction of the insert material. It was found that organic solvents in combination with saline could accelerate the extraction process of the insert materials compared to saline alone. The use of solvent circulation was able to improve the extraction process. Extraction at elevated temperatures in combination with solvent circulation provided accelerated extraction.

A number of potential insert materials were tested for their ability to readily diffuse out of the lens body including PEG (at multiple different molecular weights), Methocel™ E6 (a cellulose-like material) at 50,000 g/mol, poly sodium methacrylate (at multiple different molecular weights), PVA/Ac (at multiple different molecular weights), sugars (including isomalt, sucrose, and glucose), and salts (including sodium chloride). The insert materials were tested for the ability to form a thin film-like insert (for example by spreading a thin layer of a hydrated insert material and allowing it to form a dry film through evaporation), the ability to diffuse through the lens (by measuring the concentration of the insert material in the extraction solution), and/or flexibility. The lenses were monitored for cavity formation with or without the formation of a bulge. In some instances, an insert material which forms thin, flexible film-like inserts that readily diffuse out of the lens body without forming a bulge may be desirable.

FIGS. 35A-35C show sucrose films generated using a cast-free melting method. Heated liquid sucrose was spread on a flexible surface, such as a silicone sheet, using an applicator blade at elevated temperature. The sucrose was cooled to form a 22 μm thick film-like sheet which could be used to form inserts of a desired shape and size. The sucrose film was removed from the silicone sheet by bending the sheet to release the film and allow it to be removed. FIG. 35A shows a sucrose insert film 140a on a silicone sheet. FIG. 35B shows the sucrose film 140a of FIG. 35A being removed from the silicone sheet with the aid of a thin removal tool 350. FIG. 35C shows the sucrose film 140a of FIG. 35A after removal from the silicone sheet to form a free-standing sucrose film 140a. Experiments using solvent film casting were not successful in forming films.

FIGS. 36A-36C show the flexibility of various sugar-based insert films. FIG. 36A shows the flexibility of a 22 μm sucrose film. FIG. 36B shows the flexibility of a 55 μm glucose film. FIG. 36C shows the flexibility of a 50 μm isomalt film. Each of the sugar films were relatively flexible and were able to be curved or bent. The flexibility of the sugar films may depend on the moisture and relative humidity of the surroundings. The flexibility of the sugar films may be altered to provide processible inserts such that the inserts may be sized and shaped as desired.

FIGS. 36D-36F show the results of cavity formation of lenses comprising various sugar-based inserts. Backlighting was applied for better visualization of the cavity 110 within the lens 100. Each of the lenses 100 were hydrated to dissolve the inserts and form cavities 110. FIG. 36D shows a cavity 110 formed by a 22 μm sucrose insert after 24 hours of hydration with an extraction solution as described herein. The cavity 110 was formed without noticeable swelling or bulge formation. FIG. 36E shows a cavity 110 formed by a 55 μm glucose insert after 24 hours of hydration. The cavity 110 was formed with a slight amount of noticeable swelling. FIG. 36F shows a cavity 110 formed by a 50 μm isomalt insert after 24 hours of hydration. The cavity 110 was formed with a slight amount of noticeable and acceptable swelling. The concentration of material in the extraction material can be measured in many ways, for example with liquid chromatography-mass spectroscopy (LC-MS), gas chromatograph-mass spectroscopy (GC-MS), gas chromatography-flame ionization detection (GC-FID) and other methods of detecting material known to one of ordinary skill in the art.

Figure 37A:
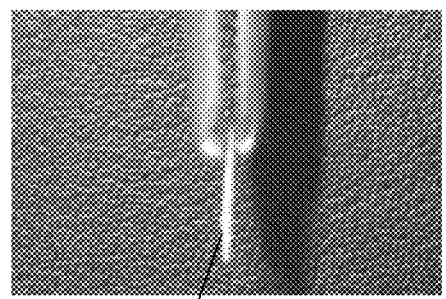
FIG. 37A shows an insert made of sodium chloride, in accordance with embodiments.
Figure 37D:
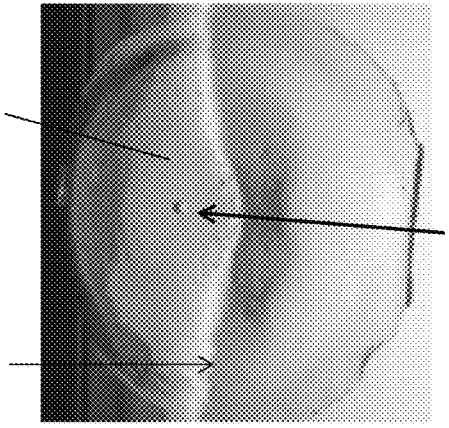
FIG. 37D shows the results of cavity formation after diffusion of a sodium chloride insert, in accordance with embodiments.
Figure 37C:
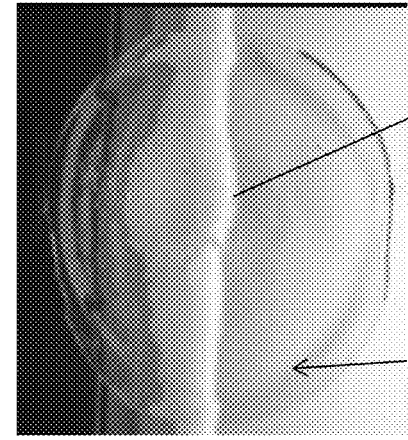
FIG. 37C shows the results of cavity formation after diffusion of a sodium chloride insert, in accordance with embodiments.
Figure 37B:
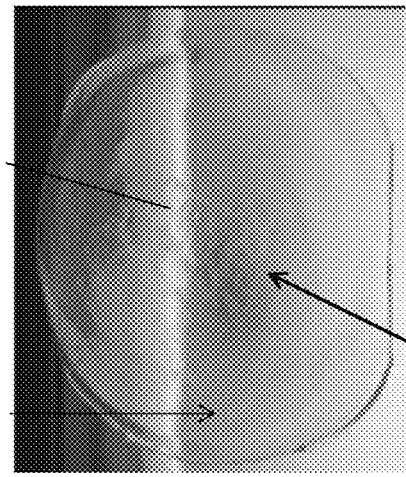
FIG. 37B shows the results of cavity formation after diffusion of a sodium chloride insert, in accordance with embodiments.

FIG. 37A shows a 200 μm thick insert 140 made of sodium chloride. The insert 140 was formed by compressing a fine sodium chloride solid under a high load using a 2 ton press. In early experiments, the salt wafers were formed with a tool with a patterned surface which left imprinted patterns 360 on the inner walls of the lens cavity 110 as shown in FIG. 37B. A piece of stainless steel with a mirrored surface was used to overcome the issue of lens patterning. FIGS. 37B-37D show the results of cavity 110 formation of three different lenses 100 comprising 200 μm sodium chloride inserts. Backlighting was applied for better visualization of the cavity 110 within the lens 100. The cavities 110 were formed after 24 hours of hydration without noticeable bulge formation. FIG. 37C shows a lens 100 with a cavity 110 without bulging. FIG. 37D shows a lens 100 with a cavity 110 comprising an entrapped air bubble 370 imperfection. Other salts, for example less crystalline salts, may also be used as an insert material.

Experiments with Methocel™ E6 showed that Methocel™ E6 was able to form thin film-like inserts. Lenses cast around the insert were hydrated and large bulges were observed upon hydration. The insert material did not diffuse out the cavity effectively, perhaps because of its high molecular weight of 50,000 g/mol.

Experiments with poly sodium methacrylates showed varying abilities to form thin film-like inserts. Higher molecular weight poly sodium methacrylate at 12,000 g/mol formed good films while lower molecular weight poly sodium methacrylate at 1,200 g/mol crystalized during the evaporation process and did not form film-like inserts. Lens cast around the 12,000 g/mol poly sodium methacrylate formed large bulges upon hydration within a short period of about 1-2 hours. The affinity of the poly sodium methacrylate to water may have led to the formation of bulges, suggesting that insert materials with high water content may be avoided if bulging is not desired.

Experiments with PVA/Ac at 12,000 g/mol and 6,000 g/mol were tested and formed good film-like inserts. Lenses cast around the 12,000 g/mol inserts formed bulges after 24 hours of hydration and no PVA/Ac material was detected in the extraction solutions, saline or isopropanol, tested. Lenses cast around the 6,000 g/mol inserts had minimal to no bulge formation.

In another experiment, a mixture of 70% PVA/Ac at 6000 g/mol and 30% polyethylene glycol was dissolved in water and spread on a flexible surface to dry. The PEG was added to act as a plasticizer. The water was evaporated to form a thin film-like insert material. The insert material was highly flexible, not sticky, and strong. The insert was not brittle and had good tensile strength. The insert was capable of being picked up without breaking, supporting its own weight as a free-standing insert. The insert was flexible with a bend radius of curvature of about 7 mm.

Additional experiments can be conducted with dark field microscopy to detect an interface between a first portion of the contact lens formed with partial polymerization bonded to a second portion of the of the contact lens formed by additional polymerization of the first portion in the presence of the precursor material which is polymerized to form the second portion. For example, the insert as described herein can be placed on the first portion after the first portion has been partially polymerized such that the first portion is sufficiently viscous to support the insert. Additional precursor material can be placed in the mold with the first portion supporting the insert as described herein, and cured to form second portion of the contact lens bonded to the first portion of the contact lens away from the insert. The first portion and the second portion can be formed from the same type of precursor material, for example. The insert can then be eroded as described herein. The hydrated contact lens can be viewed with dark field microscopy as is known in the art, and the interface where the first portion is bonded to the second portion detected. Although detectable by dark field microscopy in many instances, the interface does not produce artifacts that are perceptible to the user and the lens appears transparent under normal bright field microscopy. The structure imparted on the inner surfaces of the contact lens body by the insert may also be detected by dark field microscopy in at least some instances. The contact lens can be sectioned optically, or the contact lens can be sectioned by mechanical cutting, and the interface may be observed with dark field microscopy.

As described herein (see for example FIG. 32), the insert may for example comprise a photo-cleavable material. The insert material may comprise a polymer comprising one or more photo-cleavable group. The insert material may comprise a plurality of photo-cleavable groups. The insert may comprise one or more photo-cleavable linker groups configured to cleave upon exposure to radiation of a predetermined wavelength. The photo-cleavable linker group may be configured such that it does not decompose upon exposure to radiation that is not the pre-determined wavelength. For example, the photo-cleavable linker group may be configured such that it does not decompose upon exposure to visible light such that the insert does not need to be formed and/or stored in the dark. Alternatively or in combination, in some instances the photo-cleavable linker group may be configured such that it does not decompose upon exposure to the radiation used to polymerize the lens body material. In some instances, the photo-cleavable linker group may be configured to decompose upon exposure to the radiation used to polymerize the lens body material. Cleavage of the insert material comprising one or more photo-cleavable linker group may cleave, degrade, decompose, lyse, dissociate, or otherwise break down the insert material into smaller polymer fragments or particles. The photo-cleavable linker may be cleaved by light comprising ultraviolet light, near-ultraviolet light, visible light, near infrared light, or infrared light.

In some instances, the small polymer fragments may be polar. The small polymer fragments may for example comprise one or more of a di-carboxylic acid, a di-amine, a diol, or any combination thereof. The small polymer fragments may swell the hydrogen when hydrated which may in turn increase the pore size of the lens body, thereby facilitating their own diffusion therethrough.

The wavelength of the light may comprise a wavelength in the ultraviolet range, for example within a range of about 10 nm to about 400 nm, for example within a range of about 250 nm to about 400 nm. The wavelength may for example comprise a wavelength in the near ultraviolet range, for example within a range of about 300 nm to about 400 nm. The wavelength may comprise a wavelength within a range bounded by an two of the following wavelengths: about 250 nm, about 255 nm, about 260 nm, about 265 nm, about 270 nm, about 275 nm, about 280 nm, about 285 nm, about 290 nm, about 295 nm, about 300 nm, about 305 nm, about 310 nm, about 315 nm, about 320 nm, about 325 nm, about 330 nm, about 335 nm, about 340 nm, about 345 nm, about 350 nm, about 355 nm, about 360 nm, about 365 nm, about 370 nm, about 375 nm, about 380 nm, about 385 nm, about 390 nm, about 395 nm, about 400 nm, about 405 nm, and about 410 nm.

The wavelength of the light may comprise a wavelength in the visible range, for example within a range of about 390 nm to about 700 nm. The wavelength of light may for example comprise a wavelength in the violet range, for example within a range of about 380 nm to about 450 nm. The wavelength of light may for example comprise a wavelength in the blue range, for example within a range of about 450 nm to about 495 nm. The wavelength of light may for example comprise a wavelength in the green range, for example within a range of about 495 nm to about 570 nm. The wavelength of light may for example comprise a wavelength in the yellow range, for example within a range of about 570 nm to about 590 nm. The wavelength of light may for example comprise a wavelength in the orange range, for example within a range of about 590 nm to about 620 nm. The wavelength of light may for example comprise a wavelength in the red range, for example within a range of about 620 nm to about 750 nm.

The wavelength of the light may comprise a wavelength in the near infrared range, for example within a range of about 750 nm to about 1400 nm.

The wavelength of the light may comprise a wavelength in the infrared range, for example within a range of about 1400 nm to about 1 mm. The wavelength of light may for example comprise a wavelength in the short-wavelength infrared range, for example within a range of about 1400 nm to about 3000 nm. The wavelength of light may for example comprise a wavelength in the mid-wavelength infrared range, for example within a range of about 3000 nm to about 8000 nm.

The intensity of the light may be within a range of about 1 mW to about 100 mW, for example within a range bounded by any two of the following intensities: 1 mW, 5 mW, 10 mW, 15 mW, 20 mW, 25 mW, 30 mW, 35 mW, 40 mW, 45 mW, 50 mW, 55 mW, 60 mW, 65 mW, 70 mW, 75 mW, 80 mW, 85 mW, 90 mW, 95 mW, and 100 mW. The intensity of the light may for example be within a range of about 5 mW to about 25 mW.

The photo-cleavable insert material may be exposed to the light for a predetermined amount of irradiation time in order to decompose the insert polymer into small polymer fragments. The irradiation time may be within a range bounded by any two of the following values: 5 seconds, 10 seconds, 20 seconds, 30 seconds, 40 seconds, 50 seconds, 60 seconds, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, and 90 minutes.

The photo-cleavable insert material may be fully decomposed by irradiation with light of a pre-determined wavelength. Alternatively, the photo-cleavable insert material may be partially decomposed by irradiation with light of a pre-determined wavelength. The extent of decomposition may be controlled by one or more of the wavelength of the light, the intensity of the light, the exposure time of the insert to the light, or the like. The extent of decomposition may be determined by one of ordinary skill in the art by altering one or more parameter of the light or the insert material composition as desired. The extent of decomposition (i.e. the amount of polymer cleaved into small polymer fragments) may be within a range bounded by any two of the following values: 1%, 5%, 10%, 15%, 20%, 25%, 30%, 35%, 40%, 45%, 50%, 55%, 60%, 65%, 70%, 75%, 80%, 85%, 90%, 95%, and 100%.

The photo-cleavable insert may be formed of any material suitably dissolvable, erodible, degradable, decomposable, dissociable, solubilizable, or able to be lysed by an aqueous solution, an alcohol, or other solvent, or any combination thereof. The photo-cleavable insert material may dissociate into small polymer fragments. The small polymer fragments may comprise one or more low molecular weight components capable of diffusing through the lens body material upon hydration, exposure to an aqueous solution, exposure to an alcohol-based solution, exposure to an organic solvent, or any combination thereof. The small polymer fragments may be soluble in an organic solvent such as a polar protic solvent such as an alcohol such as methanol, ethanol, or butanol. The small polymer fragments may comprise one or more components with a reduced capacity for diffusion through the lens body as described herein. The small polymer fragments may for example be water soluble. The smaller polymer fragments may comprise a low molecular weight such that they are readily capable of diffusing out of the lens body and forming the cavity. The photo-cleavable insert material may be moldable. The photo-cleavable insert material may be extrudable.

The photo-cleavable insert may be formed of a photo-decomposable material comprising a first material and a second material. In some instances, the first material and the second material may comprise the small polymer fragments of photo-decomposition of the insert material. The first and second materials may have different material compositions. In some instances, both of the first and second material may be capable of diffusing out of the lens body. Alternatively, the first material may be capable of diffusing out the lens body while the second material may be configured with one or more of particle size, molecular weight, or solubility such that it remains within the cavity formed by diffusion of the first material out of the lens body. The second material may comprise an amount sufficient to provide an osmolality of the cavity within a range from about 200 milliosmoles to about 290 milliosmoles when the first material has passed through the channels.

The photo-cleavable insert may be formed of a photo-decomposable first material and a second material. The first material may photo-decompose as described herein into small polymer fragments which are able to pass through channels of the lens body. The second material may be configured with or more of particle size, molecular weight, or solubility as described herein such that it remains within a cavity formed by photo-decomposition of the first material. The second material may comprise an amount sufficient to provide an osmolality of the cavity within a range from about 200 milliosmoles to about 290 milliosmoles when the first material has passed through the channels.

The insert may comprise a polymer material. The insert material may comprise a linear polymer, a branched polymer, a homopolymer, a copolymer, an alternating copolymer, a block copolymer, a periodic copolymer, a statistical copolymer, a graft copolymer, or any combination thereof. The polymer material may comprise a plurality of repeating groups or monomer residues. The polymer may comprise a repeating group selected from 10 to 200 atoms, for example 20 to 100 atoms. The polymer may comprise about 100 to about 10,000 repeating groups. The polymer may comprise about 4 to about 10,000 repeating groups, for example within a range bounded by any two of the following values: 4, 5, 10, 15, 20, 25, 30, 40, 50, 75, 100, 125, 150, 200, 300, 400, 500, 600, 700, 800, 900, 1000, 2000, 3000, 4000, 5000, 6000, 7000, 8000, 9000, and 10,000. The polymer may comprise about 4 to about 30 repeating groups, for example about 20 to about 30 repeating groups. The polymer may comprise a total molecular weight of about 6000 g/mol to about 12,000 g/mol, for example about 6000 g/mol to about 8000 g/mol or about 8000 g/mol to about 12000 g/mol.

The polymer may comprise a repeating group comprising one or more cleavable linkers. The polymer may comprise a repeating group comprising one or more linker groups. The polymer may comprise a repeating group comprising two linker groups. They polymer may comprise two linker groups which cleave when exposed to radiation at the same wavelength. The polymer may comprise two linker groups which cleave when exposed to radiation of different wavelengths. For example, the polymer may comprise a first linker group which cleaves when exposed to radiation at a first wavelength and a second linker group which cleaves when exposed to radiation at a second wavelength. In this way, the rate and/or extent of cleavage and decomposition of the linker material may be controlled.

Figure 38:
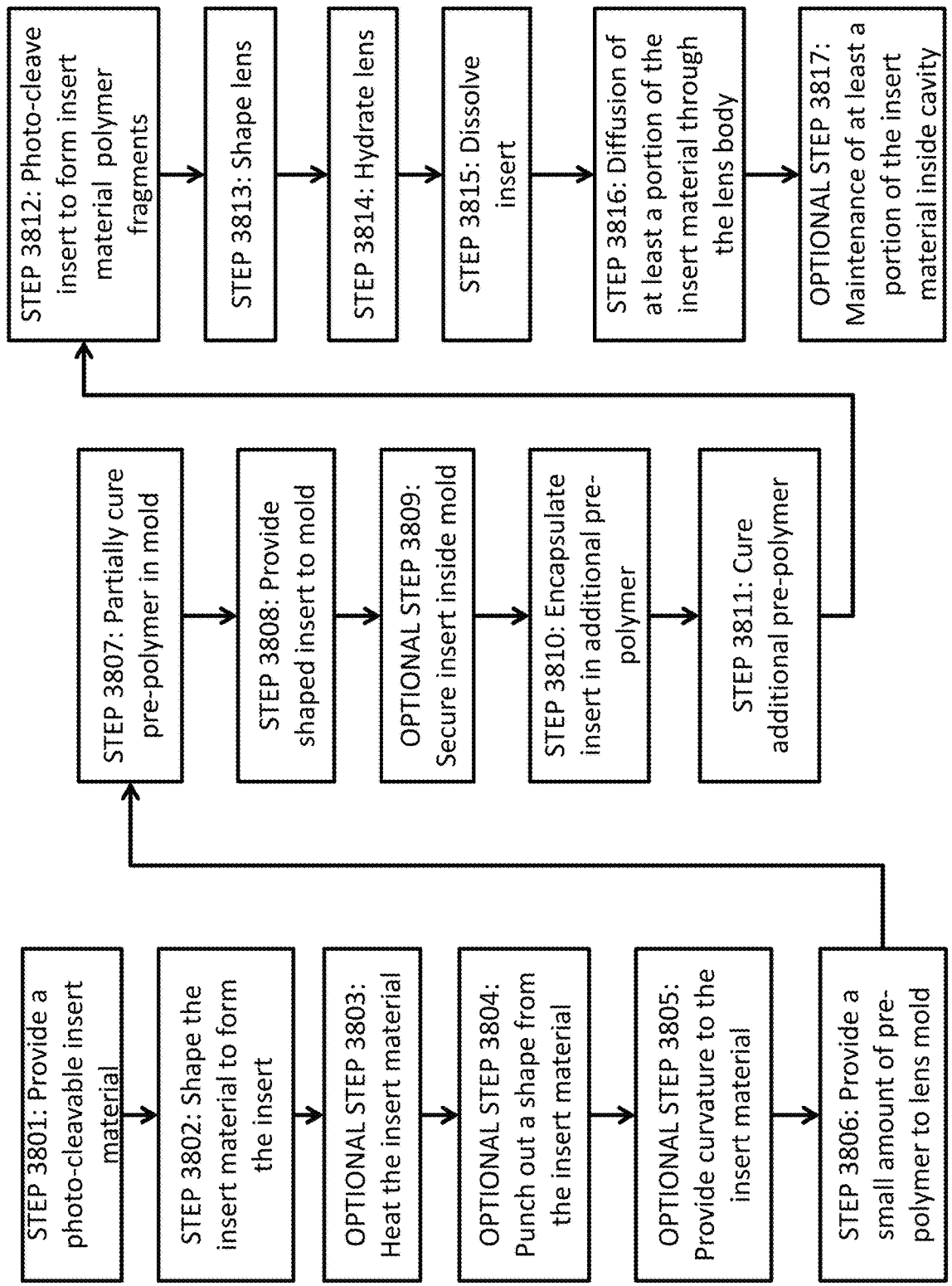
FIG. 38 shows a method of manufacturing a contact lens comprising a cavity, in accordance with embodiments.

FIG. 38 shows a method of manufacturing a contact lens comprising a cavity, in accordance with embodiments.

At Step 3801, an photo-cleavable insert material may be provided. The photo-cleavable insert material may be any of the photo-cleavable insert materials described herein. The insert material may be formulated such that the insert can survive heat or UV curing processes. The insert material may be formulated such that it cleaves into small polymer fragments during the UV curing process.

At Step 3802, the insert material may be shaped to form the insert. Shaping may comprise one or more optional steps which may include heating (Step 3803), punching out a shape from the insert material (Step 3804), or providing a curvature to the insert material (Step 3805). For example, a desired shape may be punched out of a solid insert material then heated while laying on a sphere with the desired lens base curve.

At Step 3806, a small amount of lens pre-polymer may be provided to a mold.

At Step 3807, the pre-polymer may be partially cured to form a bed for the insert.

At Step 3808, the shaped, solid, photo-cleavable insert may be provided to the partially-cured polymer.

At Step 3809, the insert may be optionally secured to the partially-cured polymer base by providing a drop of polymer to the insert and flash curing it into position.

At Step 3810, additional pre-polymer may be added to the mold to encapsulate the insert.

At Step 3811, the additional pre-polymer may be cured, for example by exposure to UV light as described herein.

At Step 3812, the insert material may be photo-cleaved by irradiation with light at a predetermined wavelength in order to form insert material polymer fragments as described herein. Photo-cleavage of the insert may occur prior to, simultaneously with, or after curing of the pre-polymer lens material. For example, the insert material may comprise a photo-cleavable linker configured to cleave upon exposure to UV light such that the insert material is cleaved while the lens polymerizes. Alternatively or in combination, the insert material may cleave at a different rate than the lens polymerizes such that polymerization of the lens may be completed prior to complete cleavage of the insert material into small polymer fragments. In some cases, the insert material may be fully cleaved upon a second exposure to UV light, for example during hydration of the lens (Step 3814). Alternatively or in combination, the insert material may comprise a photo-cleavable linker configured not to cleave upon exposure to UV light such that the insert material may be cleaved after the lens polymerizes.

At Step 3813, the lens may be shaped. Shaping the lens may comprise one or more steps including cutting or molding as described herein.

At Step 3814, the lens may be hydrated.

At Step 3815, the insert may dissolve or go into solution.

Hydration of the lens and the insert material may occur at different rates. For example, the lens material may hydrate faster than the insert material dissolves and thereby restrict the expansion of the lens material, for example HEMA, into the cavity.

The lens material may instead expand outward to form a full-sized contact lens with little to no aberrations or disruptions to the cavity.

At Step 3816, at least a portion of the photo-decomposed insert material (i.e. polymer fragments) may diffuse through the lens body. The photo-decomposed insert material may for example comprise an aromatic ring. The photo-decomposed insert material may for example comprise a residual of a nitrobenzyl material.

At Step 3817, at least a portion of the photo-decomposed insert material may remain inside the cavity.

Although the steps above show a method of providing a contact lens with a cavity using an erodible insert in accordance with embodiments, a person of ordinary skill in the art will recognize many variations based on the teachings described herein. The steps may be completed in a different order. Steps may be added or deleted. Some of the steps may comprise sub-steps. The steps may be repeated to provide a contact lens or an insert as described herein.

Photocleavable Linker Groups

"Alkyl" refers to a straight or branched hydrocarbon chain radical consisting solely of carbon and hydrogen atoms, containing no unsaturation, and preferably having from one to fifteen carbon atoms (i.e., $C_1$-$C_{15}$ alkyl). In certain embodiments, an alkyl comprises one to thirteen carbon atoms (i.e., $C_1$-$C_{13}$ alkyl). In certain embodiments, an alkyl comprises one to eight carbon atoms (i.e., $C_1$-$C_8$ alkyl). In other embodiments, an alkyl comprises one to five carbon atoms (i.e., $C_1$-$C_5$ alkyl). In other embodiments, an alkyl comprises one to four carbon atoms (i.e., $C_1$-$C_4$ alkyl). In other embodiments, an alkyl comprises one to three carbon atoms (i.e., $C_1$-$C_3$ alkyl). In other embodiments, an alkyl comprises one to two carbon atoms (i.e., $C_1$-$C_2$ alkyl). In other embodiments, an alkyl comprises one carbon atom (i.e., $C_1$ alkyl). In other embodiments, an alkyl comprises five to fifteen carbon atoms (i.e., $C_5$-$C_{15}$ alkyl). In other embodiments, an alkyl comprises five to eight carbon atoms (i.e., $C_5$-$C_8$ alkyl). In other embodiments, an alkyl comprises two to five carbon atoms (i.e., $C_2$-$C_5$ alkyl). In other embodiments, an alkyl comprises three to five carbon atoms (i.e., $C_3$-$C_5$ alkyl). In certain embodiments, the alkyl group is selected from methyl, ethyl, 1-propyl (n-propyl), 1-methylethyl (iso-propyl), 1-butyl (n-butyl), 1-methylpropyl (sec-butyl), 2-methylpropyl (iso-butyl), 1,1-dimethylethyl (tert-butyl), 1-pentyl (n-pentyl). The alkyl is attached to the rest of the molecule by a single bond. Unless stated otherwise specifically in the specification, an alkyl group is optionally substituted by one or more substituents such as those substituents described herein.

"Alkoxy" refers to a radical bonded through an oxygen atom of the formula —O-alkyl, where alkyl is an alkyl chain as defined above.

"Aryl" refers to a radical derived from an aromatic monocyclic or aromatic multicyclic hydrocarbon ring system by removing a hydrogen atom from a ring carbon atom. The aromatic monocyclic or aromatic multicyclic hydrocarbon ring system contains only hydrogen and carbon and from five to eighteen carbon atoms, where at least one of the rings in the ring system is aromatic, i.e., it contains a cyclic, delocalized (4n+2) π-electron system in accordance with the Hückel theory. The ring system from which aryl groups are derived include, but are not limited to, groups such as benzene, fluorene, indane, indene, tetralin and naphthalene. Unless stated otherwise specifically in the specification, the term "aryl" or the prefix "ar-" (such as in "aralkyl") is meant to include aryl radicals optionally substituted by one or more substituents such as those substituents described herein.

"Cyano" refers to a radical bonded through an carbon atom of the formula —CN.

"Halo" or "halogen" refers to halogen substituents such as bromo, chloro, fluoro and iodo substituents.

"Haloalkyl" refers to an alkyl radical, as defined above, that is substituted by one or more halogen radicals, for example, trifluoromethyl, dichloromethyl, bromomethyl, 2,2,2-trifluoroethyl, 1-fluoromethyl-2-chloroethyl, and the like. In some embodiments, the alkyl part of the haloalkyl radical is optionally substituted as described herein.

"Heteroaryl" refers to a radical derived from a 3- to 12-membered aromatic ring radical that comprises two to eleven carbon atoms and at least one heteroatom wherein each heteroatom may be selected from N, O, and S. As used herein, the heteroaryl ring may be selected from monocyclic or bicyclic and fused or bridged ring systems rings wherein at least one of the rings in the ring system is aromatic, i.e., it contains a cyclic, delocalized (4n+2) π-electron system in accordance with the Hückel theory. The heteroatom(s) in the heteroaryl radical may be optionally oxidized. One or more nitrogen atoms, if present, are optionally quaternized. The heteroaryl may be attached to the rest of the molecule through any atom of the heteroaryl, valence permitting, such as a carbon or nitrogen atom of the heteroaryl. Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]

thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl). Unless stated otherwise specifically in the specification, the term "heteroaryl" is meant to include heteroaryl radicals as defined above which are optionally substituted by one or more substituents such as those substituents described herein.

"Hydroxy" refers to a radical bonded through a carbon atom of the formula —OH radical.

"Nitro" refers to a radical bonded through a nitrogen atom of the formula —$NO_2$.

The term "substituted" refers to moieties having substituents replacing a hydrogen on one or more carbons or substitutable heteroatoms, e.g., NH, of the structure. It will be understood that "substitution" or "substituted with" includes the implicit proviso that such substitution is in accordance with permitted valence of the substituted atom and the substituent, and that the substitution results in a stable compound, i.e., a compound which does not spontaneously undergo transformation such as by rearrangement, cyclization, elimination, etc. In certain embodiments, substituted refers to moieties having substituents replacing two hydrogen atoms on the same carbon atom, such as substituting the two hydrogen atoms on a single carbon with an oxo, imino or thioxo group. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valences of the heteroatoms.

In some embodiments, substituents may include any substituents described herein, for example: halogen, hydroxy, oxo (=O), thioxo (=S), cyano (—CN), nitro (—$NO_2$), imino (=N—H), oximo (=N—OH), hydrazino (=N—$NH_2$), —$R^b$—$OR^a$, —$R^b$—OC(O)—$R^a$, —$R^b$—OC(O)—$OR^a$, $R^b$—OC(O)—N($R^a$)$_2$, $R^b$—N($R^a$)$_2$, —$R^b$—C(O)$R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)C(O)$R^a$, —$R^b$—N($R^a$)S(O)$_t$$R^a$ (where t is 1 or 2), —$R^b$—S(O)$_t$$R^a$ (where t is 1 or 2), —$R^b$—S(O)$_t$$OR^a$ (where t is 1 or 2), and —$R^b$—S(O)$_t$N($R^a$)$_2$ (where t is 1 or 2); and alkyl, alkenyl, alkynyl, aryl, aralkyl, aralkenyl, aralkynyl, cycloalkyl, cycloalkylalkyl, heterocycloalkyl, heterocycloalkylalkyl, heteroaryl, and heteroarylalkyl any of which may be optionally substituted by alkyl, alkenyl, alkynyl, halogen, haloalkyl, haloalkenyl, haloalkynyl, oxo (=O), thioxo (=S), cyano (—CN), nitro (—$NO_2$), imino (=N—H), oximo (=N—OH), hydrazine (=N—$NH_2$), —$R^b$—$OR^a$, —$R^b$—OC(O)—$R^a$, —$R^b$—OC(O)—$OR^a$, —$R^b$—OC(O)—N($R^a$)$_2$, —$R^b$—N($R^a$)$_2$, —$R^b$—C(O)$R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_t$$R^a$ (where t is 1 or 2), —$R^b$—S(O)$_t$$R^a$ (where t is 1 or 2), —$R^b$—S(O)$_t$$OR^a$ (where t is 1 or 2), and —$R^b$—S(O)$_t$N($R^a$)$_2$ (where t is 1 or 2); wherein each $R^a$ is independently selected from hydrogen, alkyl, cycloalkyl, cycloalkylalkyl, aryl, aralkyl, heterocycloalkyl, heterocycloalkylalkyl, heteroaryl, or heteroarylalkyl, wherein each $R^a$, valence permitting, may be optionally substituted with alkyl, alkenyl, alkynyl, halogen, haloalkyl, haloalkenyl, haloalkynyl, oxo (=O), thioxo (=S), cyano (—CN), nitro (—$NO_2$), imino (=N—H), oximo (=N—OH), hydrazine (=N—$NH_2$), —$R^b$—$OR^a$, —$R^b$—OC(O)—$R^a$, —$R^b$—OC(O)—$OR^a$, —$R^b$—OC(O)—N($R^a$)$_2$, —$R^b$—N($R^a$)$_2$, —$R^b$—C(O)$R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_t$$R^a$ (where t is 1 or 2), —$R^b$—S(O)$_t$$R^a$ (where t is 1 or 2), —$R^b$—S(O)$_t$$OR_a$ (where t is 1 or 2), and —$R^b$—S(O)$_t$N($R^a$)$_2$ (where t is 1 or 2); and wherein each $R^b$ is independently selected from a direct bond or a straight or branched alkylene, alkenylene, or alkynylene chain, and each $R^c$ is a straight or branched alkylene, alkenylene or alkynylene chain.

It will be understood by those skilled in the art that substituents can themselves be substituted, if appropriate. Unless specifically stated as "unsubstituted," references to chemical moieties herein are understood to include substituted variants. For example, reference to a "heteroaryl" group or moiety implicitly includes both substituted and unsubstituted variants.

The linker may comprise one or more photocleavable moieties. The one or more photocleavable moieties may be used as, or modified to be used as, a linker group for the photo-cleavable insert material described herein. The one or more photocleavable moieties may be optionally substituted. The one or more photocleavable moieties may for example comprise one or more of the following: an arylcarbonylmethyl group (e.g. a phenacyl group, an o-alkylphenacyl group, a p-hydroxyphenacyl group, or a benzoin group), a nitroaryl group (e.g. an o-nitrobenzyl group, an o-nitro-2-phenethyloxycarbonyl group, or an o-nitroanilide), a coumarin-4-ylmethyl group, an arylmethyl group (e.g. a simple arylmethyl group or a hydroxyarylmethyl group), an arylsulfonyl group, a pivaloyl group, 2-benzylbenzoic acid group, a sisyl group, a silicon-based group, a 2-hydroxycinnamyl group, a metal-containing ruthenium-bipyridine group (e.g. [$Ru^{2+}$(bpy)$_2$]$^{2+}$, [Ru-(bpy)$_2$(nic)$_2$]$^{2+}$, or [Ru(bpy)(4AP)$_4$]$^{2+}$), a ketone group, carbanion-mediated groups, an α-keto amide group, an α,β-unsaturated anilide group, a methlyl(phenyl)thiocarbamic acid group, a thiochromone s,s-dioxide group, a 2-pyrrolidino-1,4-benzoquinone group, a triazine group, an arylmethyleneimino group, a xanthene group, a phyronin group, a 7-hydroxy-1,1-dimethylnaphthalenone group, a benzyl group (e.g. a benzyl group, a naphthalene group, an anthracene group, a phenantrene group, a phyrene group, or a perylene group), or any combination thereof.

The insert material may for example comprise one or more of the following photocleavable groups including but not limited to: a p-methoxyphenacyl group, a 2-nitrobenzyl group, a 2-nitrobenzyloxycarbonyl group, a 2-nitrophenylethylene glycol group, a benzyloxycarbonyl group, a 3,5-dimethoxybenzyloxycarbonyl group, a α,α-dimethyl-3,5-dimethoxybenzyloxycarbonyl group, a 3-nitrophenyl group, 3-a nitrophenoxy group, a 3,5-dinitrophenoxy group, a 3-nitrophenoxycarbonyl group, a phenacyl group, a 4-methoxyphenacyl group, a α-methylphenacyl group, a 3,5-dimethoxybenzoinyl group, a 2,4-dinitrobenzenesulphenyl group, or any combination thereof.

The insert material may comprise a polymer comprising one or more linker group selected from an optionally substituted nitrobenzyl group, an optionally substituted nitrophenyl group, an optionally substituted bromoquinoline group, an optionally substituted bromohydroxyquinoline group, an optionally substituted nitrobenzofuran group, an optionally substituted bromohydrozycoumarin group, an optionally substituted methoxyphenyl group, an optionally substituted phenacyl group, an optionally substituted benzyl group, an optionally substituted aromatic ring, or any combination thereof.

The insert material may for example comprise a photocleavable linker comprising an optionally substituted nitrobenzyl group. The optionally substituted nitrobenzyl group may undergo photochemical chain scission when exposed to light with a wavelength within a range of about 350 nm to about 500 nm, for example within a range of about 350 nm to about 450 nm. A similar range of wavelengths may be used to initiate polymerization of the pre-polymer lens material during casting of the lens as described herein. As such, the polymer insert material may be configured to cleave into small polymer fragments simultaneous with polymerization and cross-linking of the lens body material when the lens is being cast with near ultraviolet light. As such, a second exposure to near ultraviolet and/or visible light may not be required after polymerization of the lens in order to decompose the insert polymer material. In some instances, the initial exposure of the insert to near ultraviolet light during lens polymerization may not fully degrade the insert polymer material and a second exposure to near ultraviolet and/or visible light may be desired in order to ensure that photo-degradation of the insert is completed to the extent desired by one of ordinary skill in the art.

In some instances, the optionally substituted nitrobenzyl group may be represented by Formula (I):

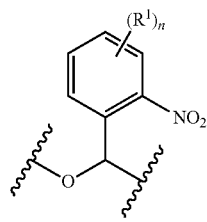

Formula (I)

wherein $R^1$ may be independently selected at each occurrence from alkyl, alkoxy, aryl, halo, heteroaryl, nitro, cyano, haloalkyl, and hydroxyl; and wherein n may be selected from 0 to 4. For a linker of Formula (I), n may for example be 0. For a linker of Formula (I), $R^1$ may for example be alkoxy and n may be 1.

In some embodiments, the linker of Formula (I) may be represented by Formula (Ia):

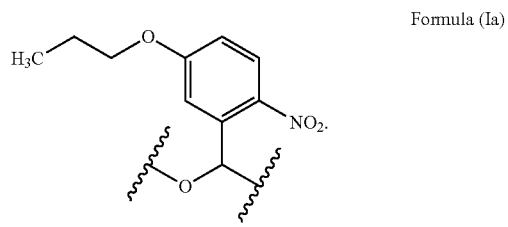 [SMILES: *OC(*)c1cc(OCCC)ccc1[N+](=O)[O-]]

Formula (Ia)

In some embodiments, the linker of Formula (I) may be represented by Formula (Ib):

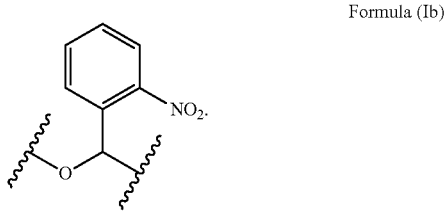 [SMILES: *OC(*)c1ccccc1[N+](=O)[O-]]

Formula (Ib)

In some instances, the optionally substituted nitrobenzyl group may be represented by Formula (II):

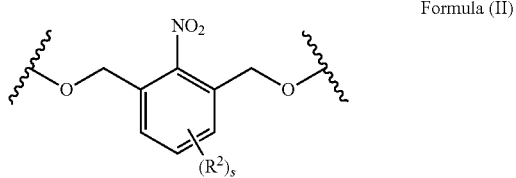

Formula (II)

wherein $R^2$ may be independently selected at each occurrence from alkyl, alkoxy, aryl, halo, heteroaryl, nitro, cyano, haloalkyl, and hydroxyl; and wherein s may be selected from 0 to 3. For a linker of Formula (II), s may for example be 0.

The insert may comprise a polymer comprising a repeating group selected from 20 to 100 atoms. The polymer may comprise about 20 to about 30 repeating groups. The repeating group may comprise one or more cleavable linkers. The repeating group may comprise one or more linker groups. The repeating group may comprise two linker groups. The repeating group may comprise one or more chains selected from: optionally substituted heteroalkylene chain, optionally substituted alkylene chain, heteroarylene, and arylene.

The repeating group may comprise two linker groups. The repeating group of the insert polymer may for example be represented by Formula (III):

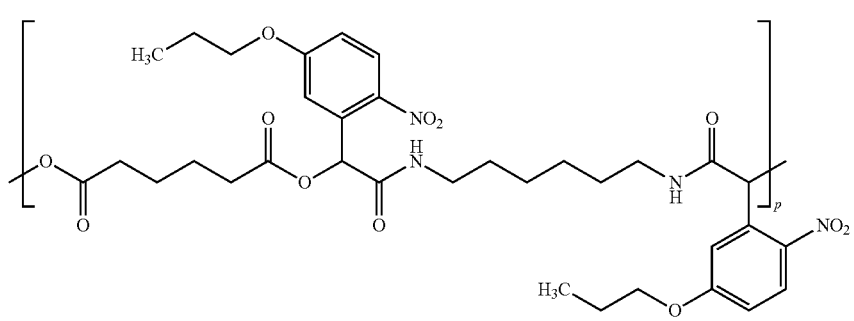

Formula (III)

wherein p may be selected from 4 to 30.

The repeating group may comprise one linker group. The repeating group of the insert polymer may for example be represented by Formula (IV):

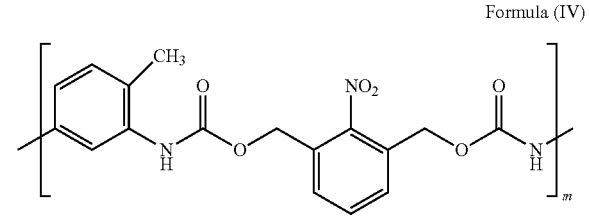

Formula (IV)

wherein m may be selected from 4 to 30.

The repeating group may comprise one linker group. The repeating group of the insert polymer may for example be represented by Formula (V):

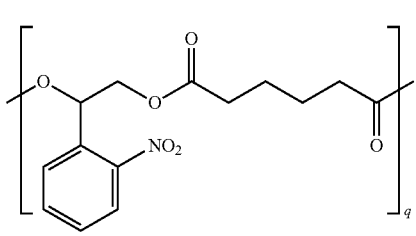

Formula (V)

wherein q may be selected from 4 to 30.

Exemplary Photocleavable Insert Polymers
Synthesis of Photo-Cleavable Polymer 1.

Scheme 1. Overall synthesis of Polymer 1.

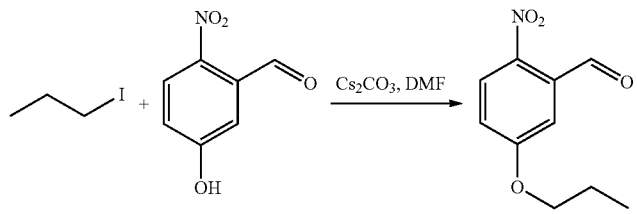

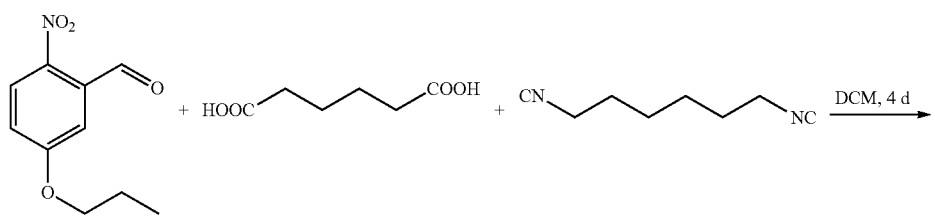

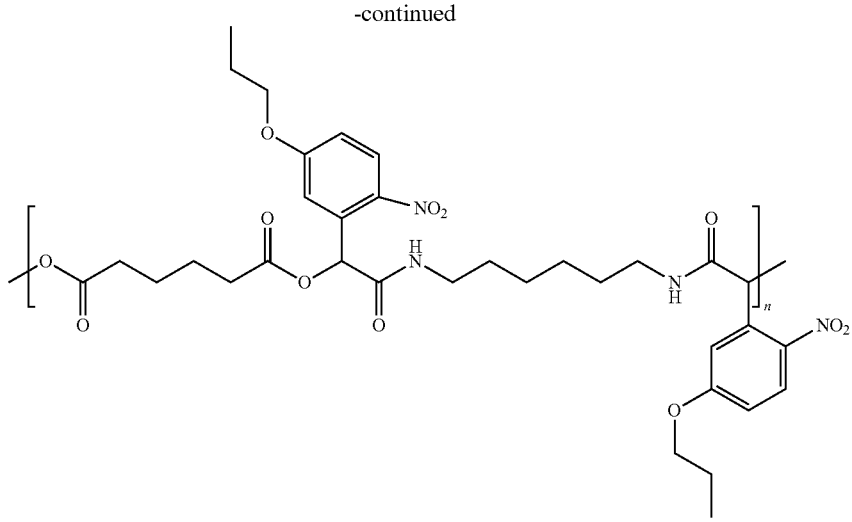

Scheme 2. Synthesis of monomer.

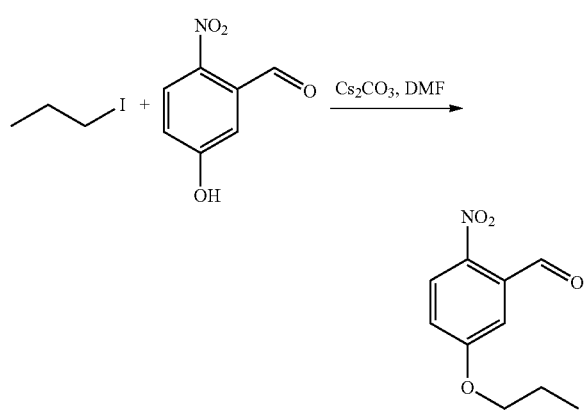

Figure 39A:
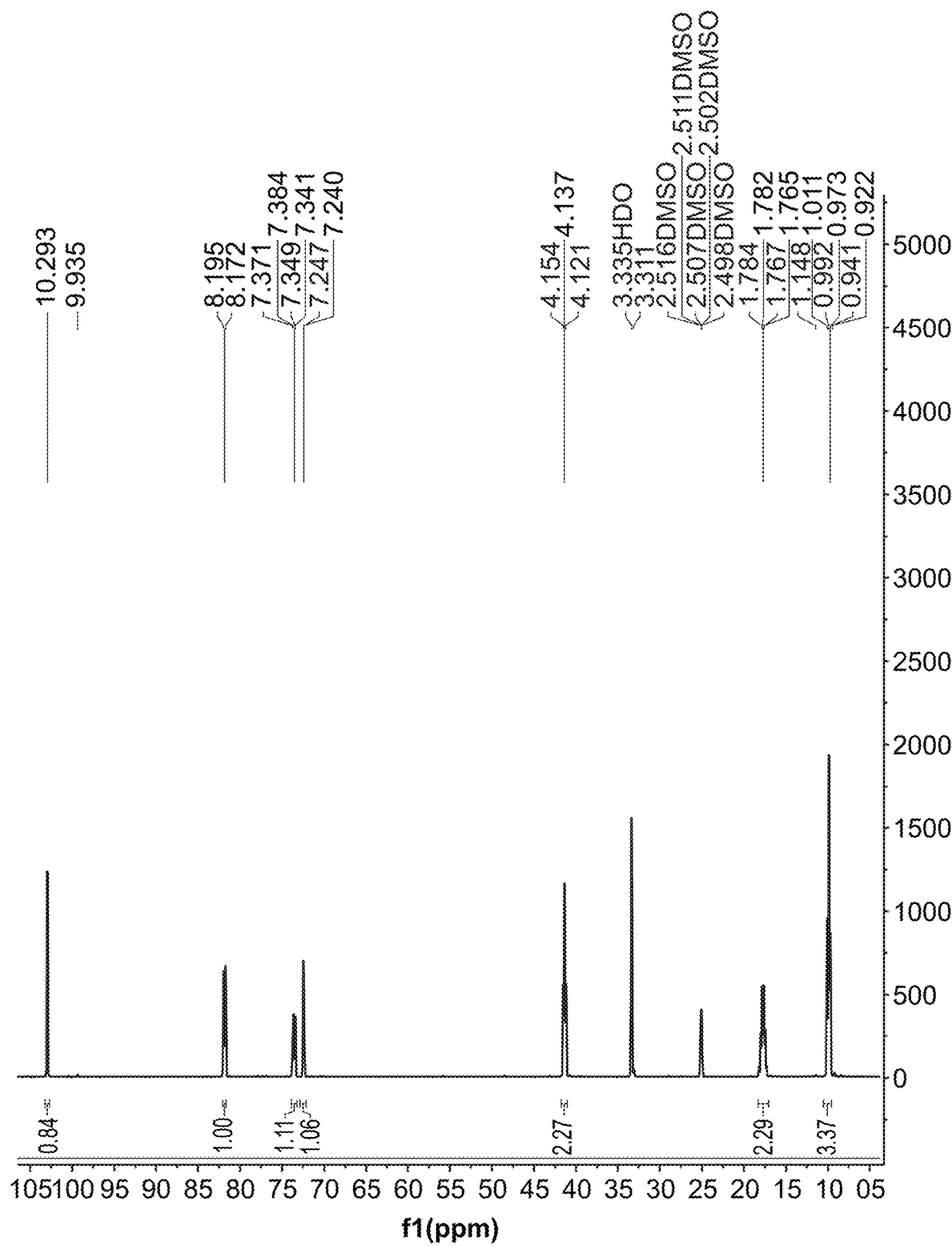
FIG. 39A shows a proton nuclear magnetic resonance spectrum of a photo-cleavable monomer unit, in accordance with embodiments.

In a flame-dried, nitrogen-purged, 500 mL round bottom flask equipped with, a magnet stir bar and a nitrogen balloon were added 1-iodopropane (20.4 g, 120 mmol, 2 eq. Aldrich), dimethylformamide ("DMF", 60 mL, Aldrich), caesium carbonate ("$Cs_2CO_3$", 19.55 g, 60 mmol, 1 eq. AK Scientific), and 5-hydroxy-2-nitrobenzaldehyde (10 g, 60 mmol, 1 eq. Oakwood). The mixture was stirred at room temperature overnight. Thin-layer chromatography ("TLC") showed complete consumption of 5-hydroxy-2-nitrobenzaldehyde. The reaction mixture was diluted with water (100 ml), extracted with ethyl acetate ("EtOAc", 100 mL×3). The combined organic layers were dried over sodium sulfate ("$Na_2SO_4$") and concentrated to give an orange oil that solidified after treat with hexanes. The solid was rinsed with hexanes (50 ml) and column with hexanes and EtOAc to give a yellow solid 11.63 g (93% yield). FIG. 39A shows a proton nuclear magnetic resonance ($^1$H-NMR) spectrum of the monomer.

Scheme 3. Synthesis of Polymer 1 from monomer.

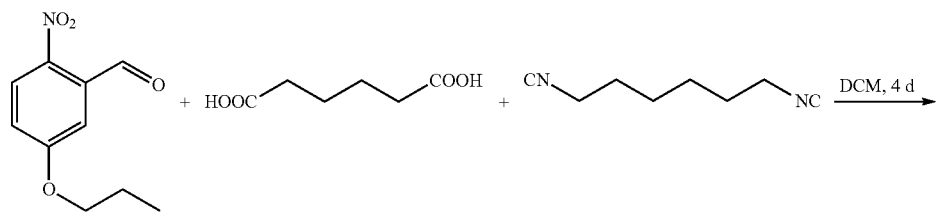

-continued

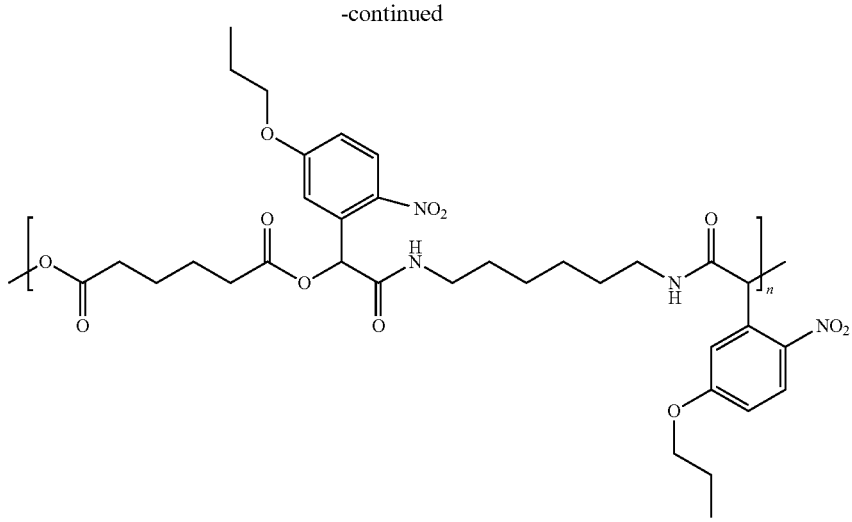

Figure 39B:
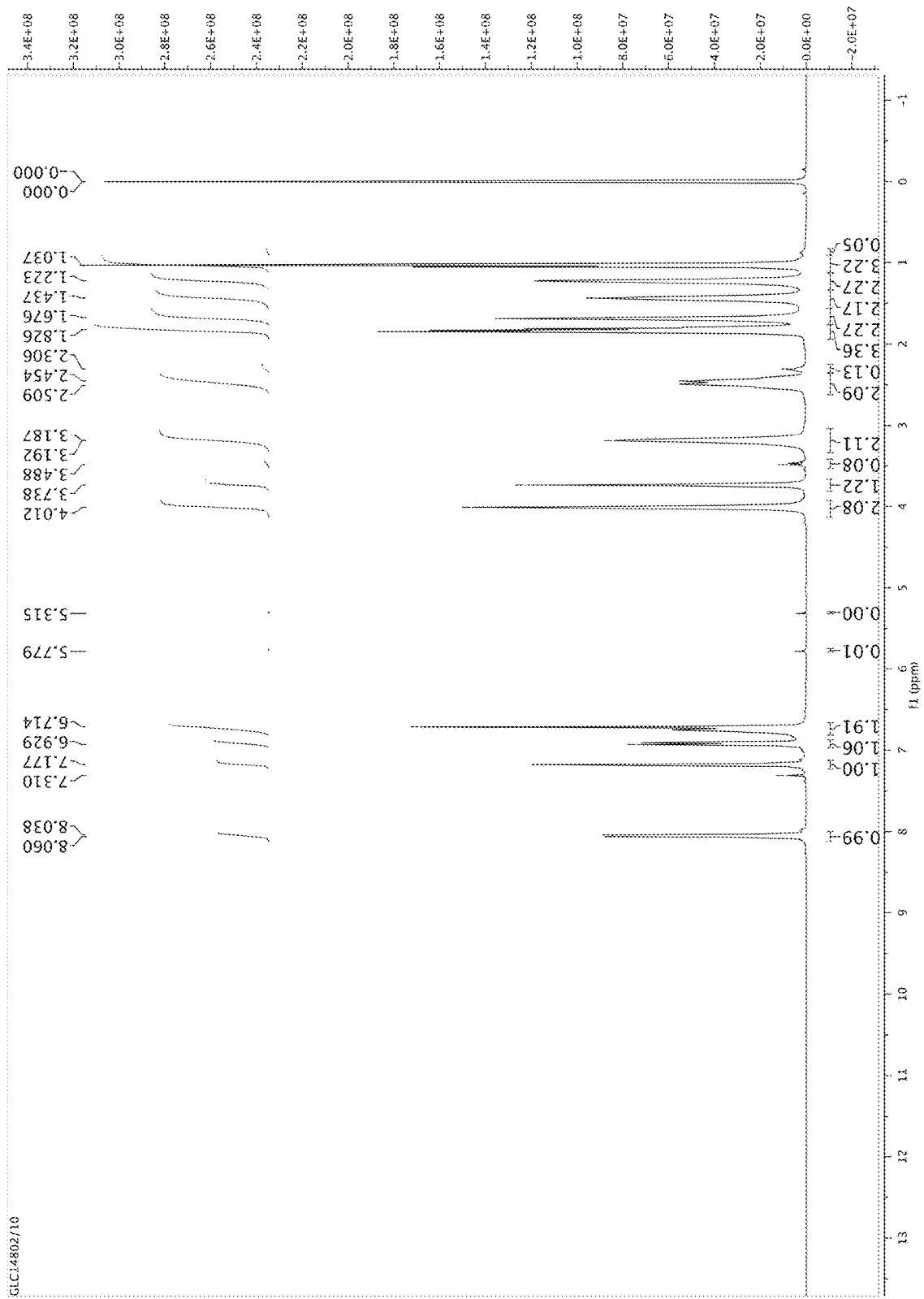
FIG. 39B shows a proton nuclear magnetic resonance spectrum of a photo-cleavable polymer, in accordance with embodiments.

In a flame-dried, nitrogen-purged, 100 mL round bottom flask equipped with a magnet stir bar and a nitrogen balloon were added 2-nitro-5-proxybenzaldehedyde (5 g, 23.9 mmol, 3 eq. fh-001-002-pdt), DCM (8 mL, Aldrich), adipic acid (1.16 g, 7.97 mmol, 1 eq. TCI) and 1,6-diisocyanohexane (1.09 g, 7.97 mmol, 1 eq. Aldrich). The reaction flask was quickly covered with aluminum foil to avoid exposure to ambient light. The mixture was stirred at room temperature for 3 days and 37° C. for 1 day. The reaction mixture was precipitated into ether (300 mL×3) to give a light yellow solid 2.68 g (46% yield). The molecular weight of polymer 1 was within a range of about 6000 g/mol to about 8000 g/mol. FIG. 39B shows a $^1$H-NMR spectrum of polymer 1.

Synthesis of Photo-Cleavable Polymer 2.

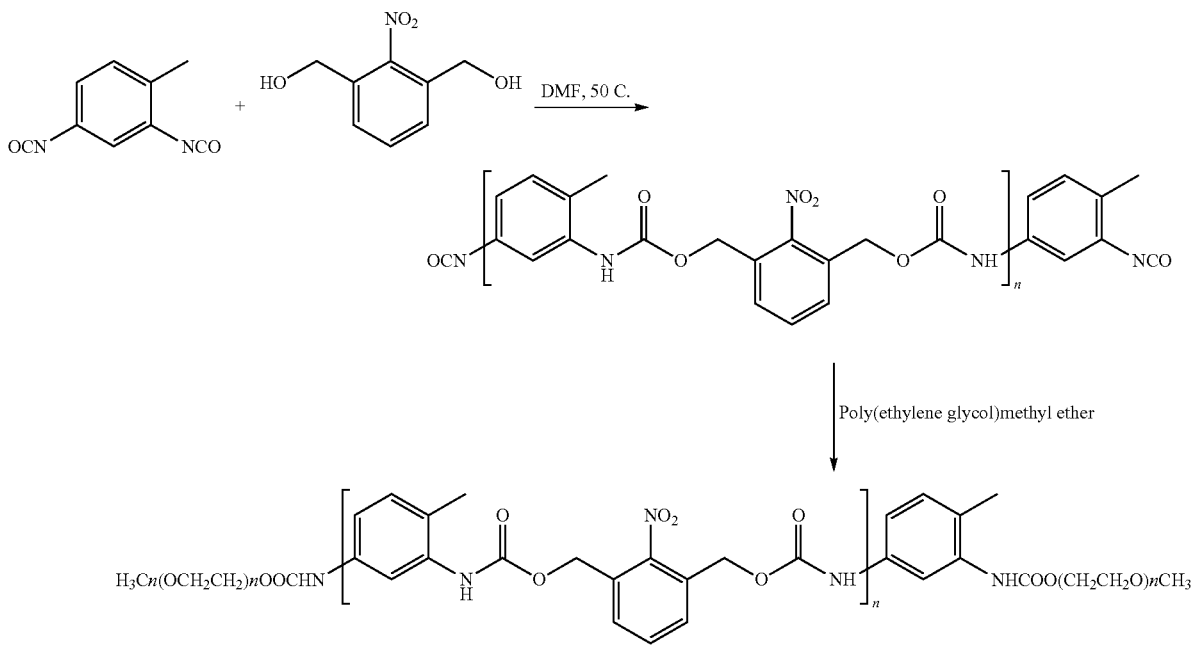

Figure 40:
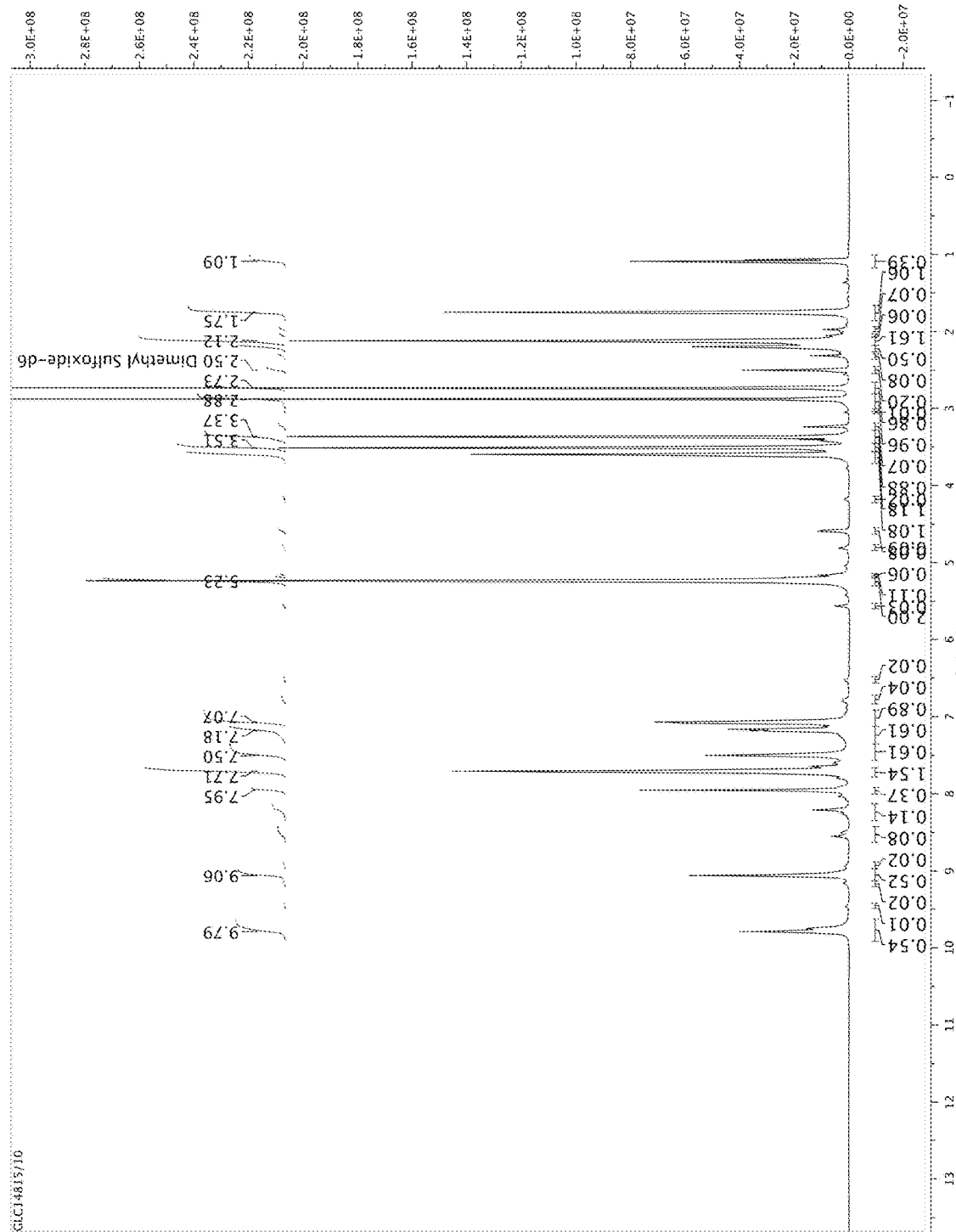
FIG. 40 shows a proton nuclear magnetic resonance spectrum of another photo-cleavable polymer, in accordance with embodiments.

In a flame-dried, nitrogen-purged, 25 mL round bottom flask equipped with a magnet stir bar and a nitrogen balloon were added 2-nitro-1, 3-benzenedimethanol (0.38 g, 2.08 mmol, 1 eq. Chemshuttle), anhydrous DMF (4 mL, Aldrich). The reaction flask was quickly covered with aluminum foil to avoid exposure to ambient light. Tolylene-2, 4-diisocyanate (0.39 g, 2.25 mmol, 1.08 eq. Aldrich) was dissolved into anhydrous DMF (1 mL, Aldrich) and added into the reaction mixture by syringe in the presence of nitrogen. The reaction mixture was stirred at 50° C. for 12 hours. Poly (ethylene oxide) monomethyl ether (0.26 g, Mn=500, Aldrich) was dissolved into anhydrous DMF (2 mL, Aldrich) and injected into the reaction flask under nitrogen. The reaction continued for another 24 hours. Reaction mixture was precipitated into ether (50 mL×3) to give a light yellow solid 0.56 g (54% yield). The molecular weight of polymer 2 was within a range of about 8000 g/mol to about 12000 g/mol. FIG. 40 shows a $^1$H-NMR spectrum of polymer 2.

Synthesis of Photo-Cleavable Polymer 3.

Scheme 5. Overall synthesis of Polymer 3.

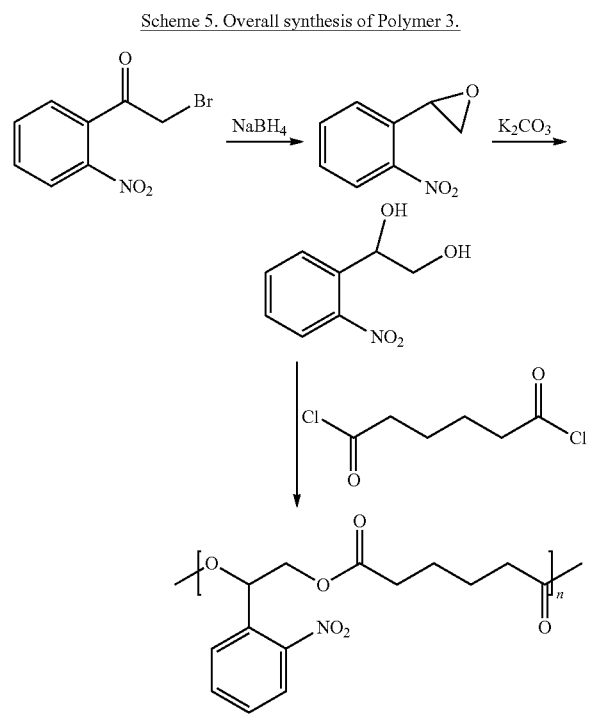

Scheme 6. Synthesis of 2-(2-nitrophenyl) oxirane.

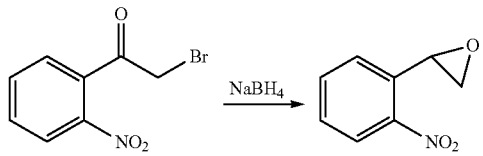

Figure 41A:
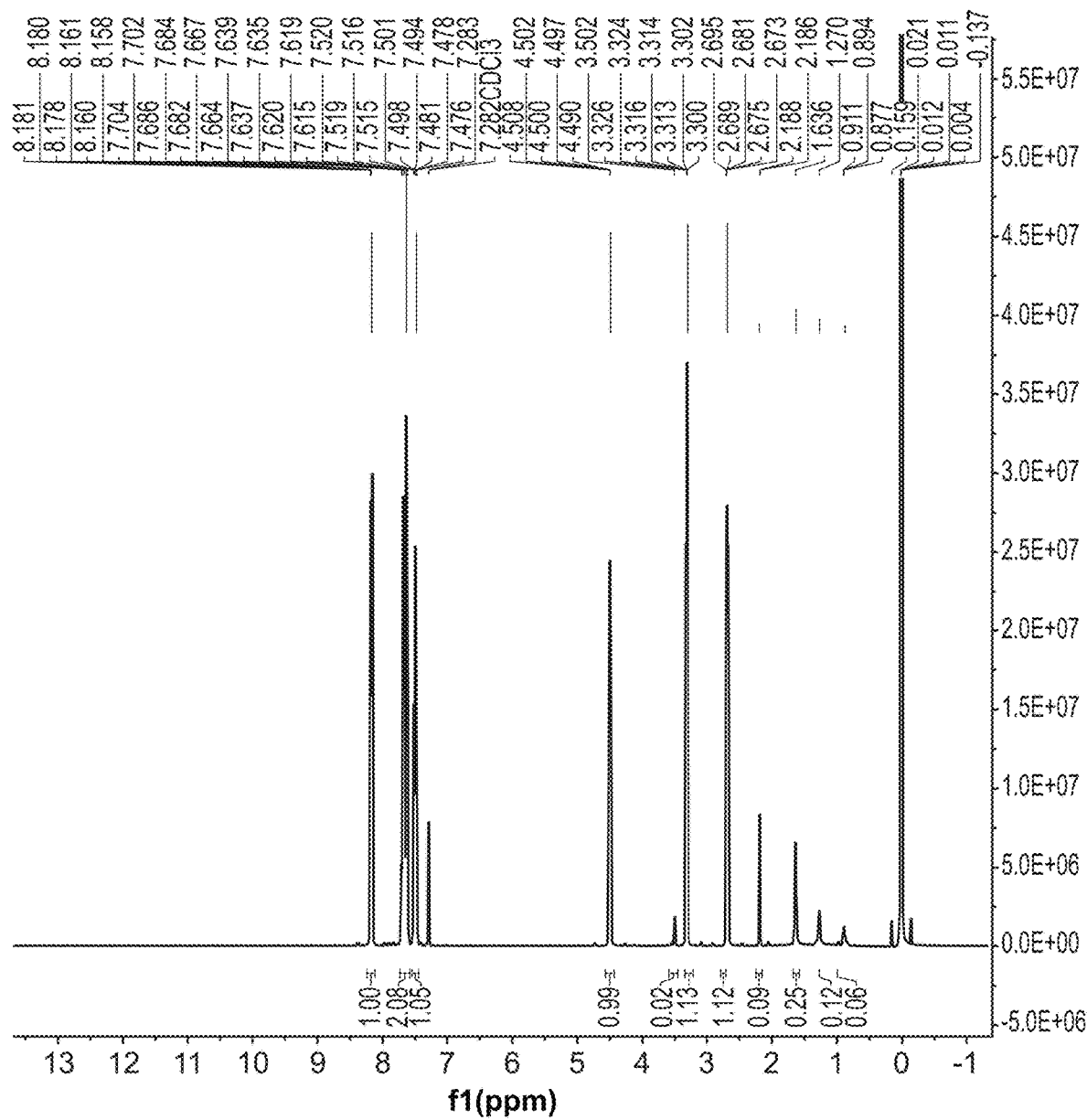
FIG. 41A shows a proton nuclear magnetic resonance spectrum of 2-(2-nitrophenyl) oxirane, in accordance with embodiments.

In a flame-dried, nitrogen-purged, 15 mL round bottom flask equipped with, a magnet stir bar and a nitrogen balloon were added o-nitrophenacyl bromide (1.39 g, 5.67 mmol, 1 eq. AK Scientific) and dioxane (2 mL, Aldrich). The reaction mixture was cooled by ice bath. A solution of sodium borohydride (0.22 g, 5.8 mmol, 1.02 eq. Aldrich) and water (2 mL) was added to the reaction mixture dropwise. The mixture was then stirred at room temperature for 30 minutes, after which an aqueous solution NaOH (2 mL, 0.15 g/mL) was added. After a stirring period of 15 minutes, TLC showed complete consumption of o-nitrophenacyl bromide. The reaction mixture was extracted with EtOAc (4 mL×4). The combined organic layers were washed with brine, dried over Na$_2$SO$_4$, concentrated and column with hexanes and EtOAc to give a light yellow solid 0.76 g (81% yield). FIG. 41A shows a $^1$H-NMR spectrum of 2-(2-nitrophenyl) oxirane.

Scheme 7. Synthesis of 1-(2-nitrophenyl) ethane-1,2-diol.

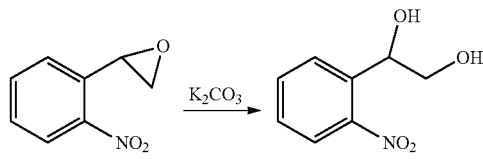

Figure 41B:
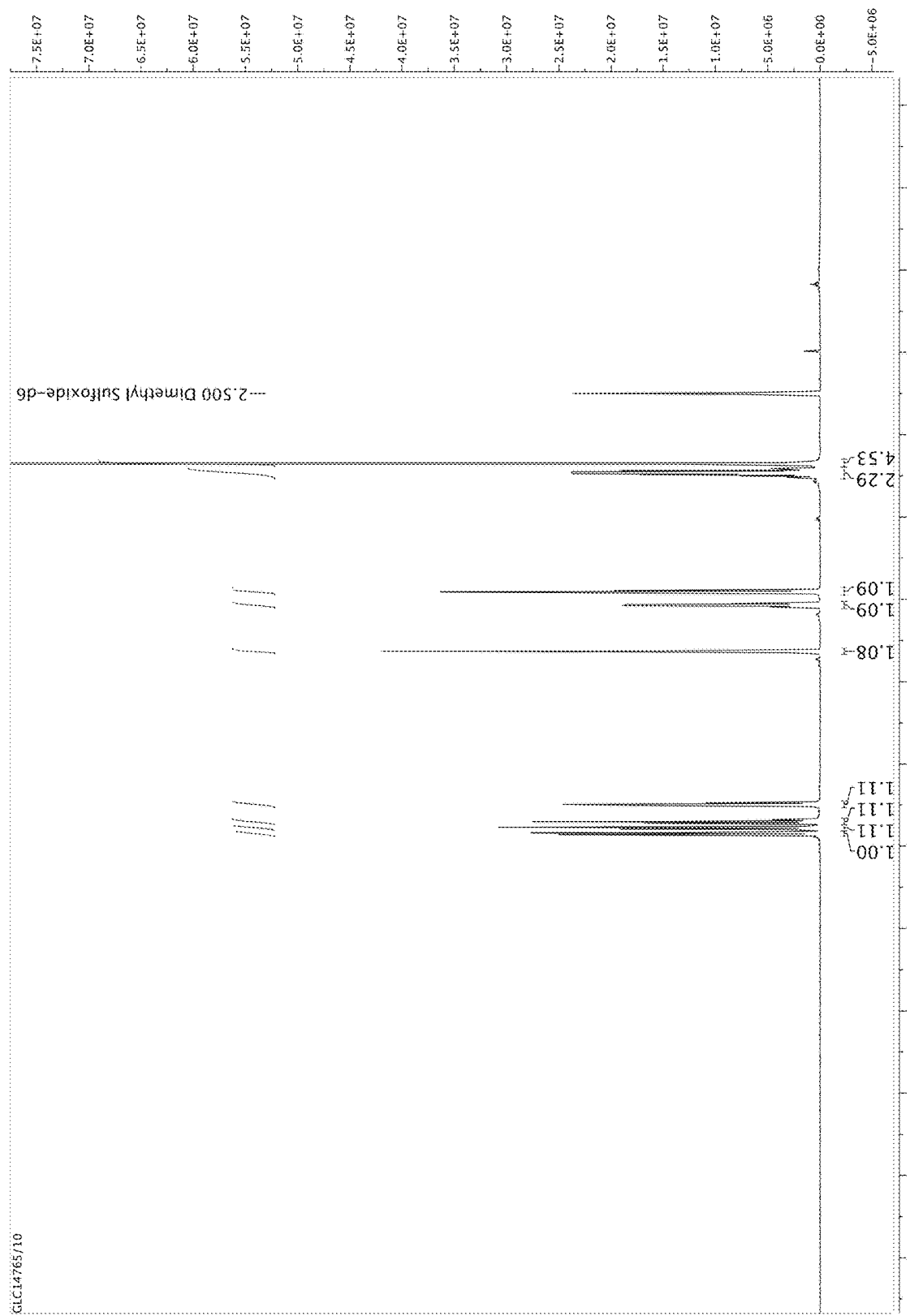
FIG. 41B shows a proton nuclear magnetic resonance spectrum of 1-(2-nitrophenyl) ethane-1,2-diol, in accordance with embodiments.

In a flame-dried, nitrogen-purged, 15 mL round bottom flask equipped with, a magnet stir bar and a nitrogen balloon were added 2-(2-nitrophenyl) oxirane (0.5, 3 mmol, 1 eq. fh-001-007-pdt), dioxane (0.5 mL) and 10% aqueous solution of K2CO3 (5 mL). The reaction flask was quickly covered with aluminum foil to avoid exposure to ambient light. The reaction mixture was heated up to reflux overnight. TLC showed complete consumption of 2-(2-nitrophenyl) oxirane. The reaction mixture was saturated with sodium chloride and extracted with EtOAc (5 mL×3). The combined organic layers were washed with brine, dried over Na$_2$SO$_4$, concentrated and column with hexanes and EtOAc to give a white solid 0.54 g (98% yield). FIG. 41B shows a $^1$H-NMR spectrum of 1-(2-nitrophenyl) ethane-1,2-diol.

Scheme 8. Synthesis of Polymer 3.

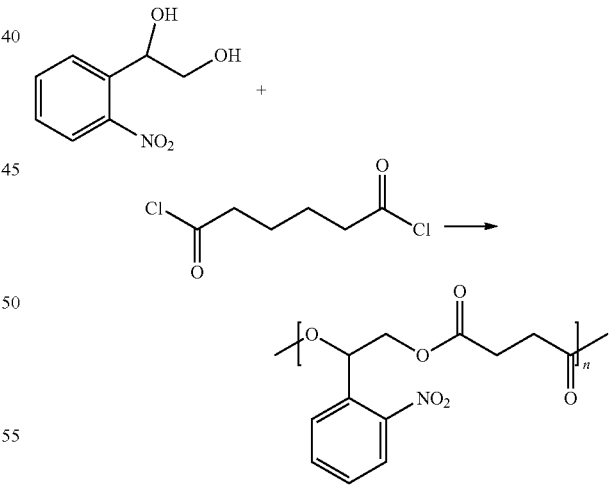

Figure 41C:
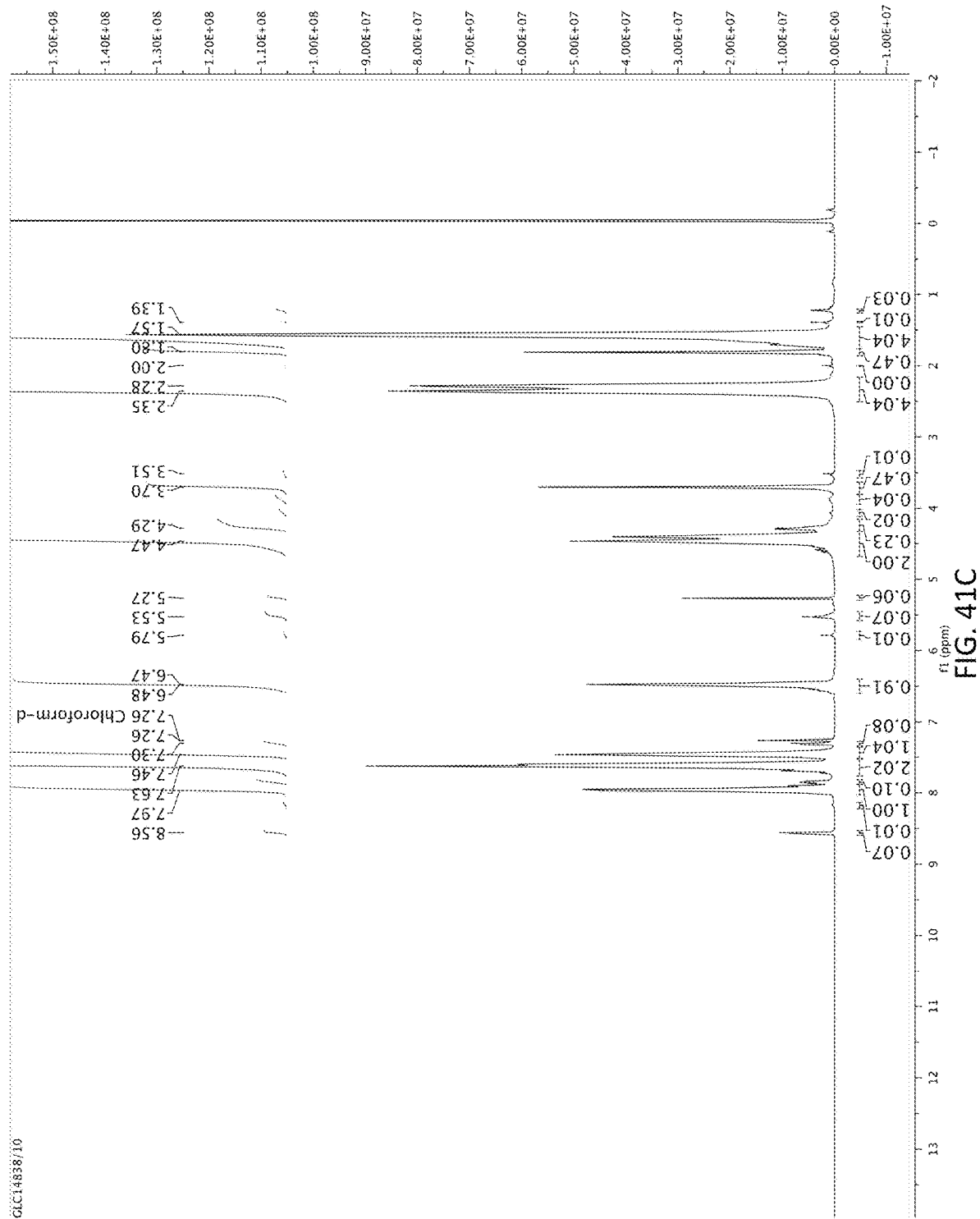
FIG. 41C shows a proton nuclear magnetic resonance spectrum of another photo-cleavable polymer, in accordance with embodiments.

In a flame-dried, nitrogen-purged, 250 mL round bottom flask equipped with a magnet stir bar and a nitrogen balloon were added 1-(2-nitrophenyl) ethane-1,2-diol (4.5 g, 25 mmol, 1 eq. fh-001-013-pdt), THF (75 mL, Aldrich) and adipoyl dichloride (4.55 g, 25 mmol, 1 eq. Aldrich). The reaction mixture was cooled to 0° C. and pyridine (10 mL, 125 mmol, 5 eq. Aldrich) was added dropwise. White solid formed. The reaction flask was quickly covered with aluminum foil to avoid exposure to ambient light and stirred at room temperature for 3 days. The reaction mixture was extracted with DCM, The combined organic layers were washed with brine, dried over $Na_2SO_4$, concentrated and precipitated into ether (300 mL×3) to give a light brown semi solid 5.65 g (70.6% yield). The molecular weight of polymer 3 was within a range of about 6000 g/mol to about 12000 g/mol. FIG. 41C shows a $^1$H-NMR spectrum of polymer 3.

Insert Formation

In some instances, the photo-cleavable lens material may be cast as a film which may be cut to any shape desired by one of ordinary skill in the art. An exemplary film of polymer 1 was formed by adding 1 gram of polymer 1 to a glass/paraformaldehyde (PFA) substrate with a 10 μm Teflon spacer. The glass/PFA substrate was then clamped and sealed and placed in a 50° C. oven under vacuum for 12 hours. The glass substrates were then removed and the PFA/insert film stack was peeled apart in order to leave the insert film adhered to the PFA film. Such films may be stored and transported as a sandwich between two glass plates. Laser cutting may be used to precisely cut the insert shape desired.

The insert film was measured using an Optimec to perform metrology. The thickness of the insert film was within a range of 15±5 μm. The total area of the insert was 4.5±1 mm. The volume of the film was therefore 0.07±0.02 mm$^3$. Multiple inserts were made within an average weight within a range of about 7 mg to about 8 mg.

Cavity Formation with Photo-Cleavable Insert

Soft contact lenses were formed around a photo-cleavable insert as described herein. The soft contact lenses were formed from a pre-polymer material comprising various mixtures of 2-hydroxyethyl methacrylate ("HEMA"), N-vinyl-2-pyrrolidinone ("NVP"), ethylene glycol dimethacrylate ("EGDMA"), ethyl (2,4,6-trimehylbenzoyl) phenyl phosphinate ("TPO-L"), and 2-(methacryloyloxy) ethyl 2-oxo-1-vinylpyrrolidine-3-carboxylate ("NVP-cross linker"). A first formulation, GLC-1, of the soft contact lens material comprised 68.45% by weight HEMA, 30% by weight NVP, 0.5% by weight EGDMA, 0.55% by weight TPO-L, and 0.5% NVP-cross linker. A second formulation, GLC-1A, of the soft contact lens material comprised 66.45% by weight HEMA, 32% by weight NVP, 0.5% by weight EGDMA, 0.55% by weight TPO-L, and 0.5% NVP-cross linker.

Each lens was formed by photo-curing with an ultraviolet lamp comprising maximum wavelength peaks within a range of about 395 m nm to about 405 nm and about 250 nm to about 260 nm. Each lens was cured for about 20 to about 90 minutes (typically about 30 minutes). It will be understood by one or ordinary skill in the art that other lens material, wavelengths, and cure times may be used as desired as described herein.

FIGS. 42A-42C show the results of cavity formation with a photo-cleavable insert material comprising polymer 1 described herein. Backlighting was applied for better visualization of the cavity 110 within the lens 100. The UV-cured double cast lens of GLC-1 lens material was formed around an insert comprising a film of polymer 1. Exposure to UV light during casting and polymerization of the lens caused chain scission in the polymer via photo-dissociation subsequent to lens casting as described herein. Photo-cleavage occurred. Each of the lenses 100 were incubated in solution for 24 hours to hydrate the inserts and form cavities 110 via diffusion of the small polymer fragments of the photo-decomposed insert material out of the cavities 110 through the lens body. FIG. 42A shows a cavity 110 formed by a polymer 1 insert after 24 hours of hydration with an extraction solution comprising 0.3% NaOH and 30% MeOH in 0.9% saline. The insert material was partially extracted from the lens (as evidenced by the cavity 110 retaining a yellow color from residual insert material and the lens itself taking on a yellow color from the diffusing insert material) and the cavity 110 was formed with swelling. FIG. 42B shows a cavity 110 formed by a polymer 1 insert after 24 hours of hydration with an extraction solution comprising 0.5% NaOH and 30% MeOH in 0.9% saline. The insert material was partially extracted from the lens and the cavity 110 was formed with swelling. FIG. 42C shows a cavity 110 formed by a polymer 1 insert after 24 hours of hydration with an extraction solution comprising 0.7% NaOH and 30% MeOH in 0.9% saline. The insert material was partially extracted from the lens and the cavity 110 was formed with swelling.

FIGS. 43A-43C show the results of cavity formation with a photo-cleavable insert material comprising polymer 1. Backlighting was applied for better visualization of the cavity 110 within the lens 100. The UV-cured double cast lens of GLC-1 lens material was formed around an insert comprising a film of polymer 1. Exposure to UV light during casting and polymerization of the lens cleaved the photo-cleavable insert material as described herein. Each of the lenses 100 were incubated in solution for 24 hours to hydrate the inserts and form cavities 110 via diffusion of the small polymer fragments of the photo-decomposed insert material out of the cavities 110 through the lens body. FIG. 43A shows a cavity 110 formed by a polymer 1-2d insert after 24 hours of hydration with an extraction solution comprising 0.3% NaOH and 30% MeOH in 0.9% saline. The insert material was partially extracted from the lens and the cavity 110 was formed with swelling. FIG. 43B shows a cavity 110 formed by a polymer 1-2d insert after 24 hours of hydration with an extraction solution comprising 0.5% NaOH and 30% MeOH in 0.9% saline. The insert material was partially extracted from the lens and the cavity 110 was formed with swelling. FIG. 43C shows a cavity 110 formed by a polymer 1-2d insert after 24 hours of hydration with an extraction solution comprising 0.7% NaOH and 30% MeOH in 0.9% saline. The insert material was partially extracted from the lens and the cavity 110 was formed with swelling.

In another example, an accommodating lens comprising an insert of polymer 1 was placed in 1 ml of deionized water at 37° C. and agitated on a shaker for 3 hours. The lens was then placed in 15% saline for 1 hour. The insert material was then extracted with 10% isopropanol (HPLC grade, Aldrich Chemicals) in deionized water for 3 hours. The extracting solution was then replaced with fresh extraction medium every 3 hours for a total extraction period of 9 hours. The lenses were then immersed in deionized water for 15 hours before being transferred to a disinfecting medium (OptiFree from Alcon). The deionized water in which the lens was stored for 15 hours prior to being transferred to the disinfecting solution was retained for analysis of residuals using HPLC of LC-MS without additional dilution. Little of the insert material was extracted into the deionized water and the cavity and lens remained yellow (indicating retention of the insert material within the lens).

Tables 6 and 7 show additional results of cavity formation with a photo-cleavable insert material. Each UV-cast lens was formed around an insert comprising a photo-cleavable polymer as described herein. The lens body was a HEMA-comprising material such as GLC-1 or GLC-1A which are combinations of the lens body polymers described herein. The lenses were incubated in various 0.9% saline-based extraction solutions at different temperatures and for different lengths of time in order to determine what combination of parameters resulted in good extraction of the insert material and whether or not the extraction process produced any swelling or bulging of the lens and/or cavity as the insert material was extracted. Following extraction of the insert material, the lens was stored in a hydrating medium of 0.9% saline. In all cases where swelling occurred, hydration with 0.9% saline reduced the swelling and returned the lens to approximately its original size and within acceptable use ranges.

TABLE 6

Insert composition and extraction parameters for experimental cavity formation.

| Experiment No. | Insert Polymer and Lens Material | Solvent (in 0.9% saline) | Temp | Time |
|---|---|---|---|---|
| 1 | Polymer 1 double cast with GLC-1 | 50% MeOH | 65° C. | 10 hrs |
| 2 | Polymer 1 double cast with GLC-1 | 50% EtOH | 65° C. | 10 hrs |
| 3 | Polymer 1 double cast with GLC-1 | 50% $^i$PrOH | 65° C. | 10 hrs |
| 4 | Polymer 1 double cast with GLC-1 | 50% MeOH | 45° C. | 10 hrs |
| 5 | Polymer 1 double cast with GLC-1 | 50% EtOH | 45° C. | 10 hrs |
| 6 | Polymer 1 double cast with GLC-1 | 50% $^i$PrOH | 45° C. | 10 hrs |
| 7 | Polymer 1 double cast with GLC-1A | 0.9% Saline | 45° C. | 7 days |
| 8 | Polymer 1 double cast with GLC-1A | 10% MeOH | 45° C. | 24 hrs |
| 9 | Polymer 1 double cast with GLC-1A | 5% $Na_2CO_3$ | 45° C. | 7 days |
| 10 | Polymer 1 double cast with GLC-1A | 5% $Na_2CO_3$, 10% MeOH | 45° C. | 24 hrs |
| 11 | Polymer 1 double cast with GLC-1A | 0.1% NaOH | 45° C. | 7 days |
| 12 | Polymer 1 double cast with GLC-1A | 0.1% NaOH, 10% MeOH | 45° C. | 24 hrs |
| 13 | Polymer 1 double cast with GLC-1A | 0.3% NaOH, 30% MeOH | 45° C. | 24 hrs |
| 14 | Polymer 1 double cast with GLC-1A | 0.5% NaOH, 30% MeOH | 45° C. | 24 hrs |
| 15 | Polymer 1 double cast with GLC-1A | 0.7% NaOH, 30% MeOH | 45° C. | 24 hrs |
| 16 | Polymer 1 double cast with GLC-1A | 0.3% NaOH, 30% MeOH | 45° C. | 24 hrs |
| 17 | Polymer 1 double cast with GLC-1A | 0.5% NaOH, 30% MeOH | 45° C. | 24 hrs |
| 18 | Polymer 1 double cast with GLC-1A | 0.7% NaOH, 30% MeOH | 45° C. | 24 hrs |
| 19 | Polymer 1 | 0.3% NaOH, 30% MeOH | 45° C. | 24 hrs |
| 20 | Polymer 1 | 0.5% NaOH, 30% MeOH | 45° C. | 24 hrs |
| 21 | Polymer 1 | 0.7% NaOH, 30% MeOH | 45° C. | 24 hrs |

TABLE 7

Results of cavity formation with photo-cleavable linker with varied extraction parameters.

| Experiment No. | Results |
|---|---|
| 1 | Partial extraction (yellow removed); Lens swelled; Swelling relieved with 0.9% saline |
| 2 | Partial extraction (yellow removed); Lens swelled; Swelling relieved with 0.9% saline |
| 3 | Partial extraction (yellow removed); Lens swelled; Swelling relieved with 0.9% saline |
| 4 | Lens swelled; Swelling relieved with 0.9% saline |
| 5 | Lens swelled; Swelling relieved with 0.9% saline |
| 6 | Lens swelled; Swelling relieved with 0.9% saline |
| 7 | No extraction |
| 8 | No extraction |
| 9 | Yellow remained in cavity, whole lens stained yellow |
| 10 | Yellow remained in cavity, whole lens stained yellow |
| 11 | Yellow remained in cavity, whole lens stained yellow |
| 12 | Yellow remained in cavity, whole lens stained yellow |
| 13 | Complete extraction; Lens swelled; Swelling relieved with 0.9% saline |
| 14 | Complete extraction; Lens swelled; Swelling relieved with 0.9% saline |
| 15 | Complete extraction; Lens swelled; Swelling relieved with 0.9% saline |
| 16 | Complete extraction; Lens swelled; Swelling relieved with 0.9% saline |
| 17 | Complete extraction; Lens swelled; Swelling relieved with 0.9% saline |
| 18 | Complete extraction; Lens swelled; Swelling relieved with 0.9% saline |
| 19 | Complete extraction; Lens swelled; Swelling relieved with 0.9% saline |
| 20 | Complete extraction; Lens swelled; Swelling relieved with 0.9% saline |
| 21 | Complete extraction; Lens swelled; Swelling relieved with 0.9% saline |

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A soft contact lens for correcting vision of an eye, comprising:
a hydrogel contact lens body comprising water and cross-linked polymer, wherein said hydrogel contact lens body defines an internal cavity shaped with a photo-decomposable material and comprising a fluid, wherein said internal cavity comprises a dissolved material having a molecular weight within a range from about 3 to 7 kDaltons, and wherein said dissolved material is capable of diffusing through said cross-linked polymer of said hydrogel contact lens body.

2. The soft contact lens of claim 1, wherein said cross-linked polymer allows water to diffuse in and out of the hydrogel contact lens body to the internal cavity from an external surface of the hydrogel contact lens body, and wherein said internal cavity is shaped to correct vision when in equilibrium with tear fluid of the eye.

3. The soft contact lens of claim 1, wherein said hydrogel contact lens body and said internal cavity are configured together to increase optical power by at least 2D with an increase in internal pressure within a range from about 20 Pascals (Pa) to about 50 Pa and wherein the internal cavity comprises a volume containing the fluid within a range from about 0.5 mm3 to about 5 mm3 and wherein the hydrogel contact lens body comprises a modulus within a range from about 0.25 MPa to about 2 MPa and wherein a hydrogel material of the hydrogel contact lens body comprises an equilibrium water content within a range from about 30% to about 70%.

4. The soft contact lens of claim 1, wherein said hydrogel contact lens body comprises internal surfaces defining the internal cavity, said internal surfaces comprising internal surface structures defined with erosion of a material from within the internal cavity.

5. The soft contact lens of claim 1, wherein said hydrogel contact lens body comprises a first portion on a first side of the internal cavity and a second portion on a second side of the internal cavity with the internal cavity extending therebetween, the first portion bonded to the second portion away from the internal cavity to contain fluid within the internal cavity.

6. The soft contact lens of claim 1, wherein said cross-linked polymer directly contacts liquid of the internal cavity.

7. The soft contact lens of claim 1, wherein said cross-linked polymer comprises sufficient stiffness to retain a shape of an insert dissolved from within the hydrogel contact lens body to form the internal cavity.

8. The soft contact lens of claim 1, wherein said dissolved material comprises a material of an insert dissolved to form the internal cavity.

9. The soft contact lens of claim 1, wherein said dissolved material comprises a material of an insert photo-decomposed to form the internal cavity.

10. The soft contact lens of claim 8, wherein said internal cavity comprises a shape profile corresponding to the dissolved insert.

11. The soft contact lens of claim 1, wherein said internal cavity comprises an optical portion configured to correct vision of the eye and a lower portion fluidically coupled to the optical portion, and wherein the optical portion is configured to provide near vision correction when an eyelid engages the lower portion.

12. The soft contact lens of claim 11, wherein said cross-linked polymer comprises a sufficient amount of cross-linking to retain fluid in the optical portion when the lower portion engages the eyelid to correct near vision of the eye.

13. The soft contact lens of claim 11, wherein said hydrogel contact lens body comprises one or more hinges coupled to said optical portion and said lower portion.

14. The soft contact lens of claim 1, wherein said internal cavity comprises one or more internal structures shaped with an erodible material.

15. The soft contact lens of claim 1, wherein said cross-linked polymer comprises hydrogel.

16. The soft contact lens of claim 1, wherein said internal cavity is filled with a liquid, not hermetically sealed, wherein said hydrogel contact lens body is permeable to a fluid in which the lens is packaged, the internal cavity in equilibrium with the fluid.

17. The soft contact lens of claim 1, wherein said cross-linked polymer comprises a homogeneous polymer.

18. The soft contact lens of claim 1, wherein said cross-linked polymer comprises a homopolymer.

* * * * *